(12) United States Patent
Lin et al.

(10) Patent No.: US 11,469,845 B2
(45) Date of Patent: Oct. 11, 2022

(54) DATA TRANSMISSION METHOD, APPARATUS, AND SYSTEM

(71) Applicant: HUAWEI TECHNOLOGIES CO., LTD., Shenzhen (CN)

(72) Inventors: Wei Lin, Shenzhen (CN); Yang Yang, Chengdu (CN); Min Yan, Shenzhen (CN); Qian Wang, Shenzhen (CN); Xiaohu Tang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/333,835

(22) Filed: May 28, 2021

(65) Prior Publication Data

US 2021/0288741 A1 Sep. 16, 2021

Related U.S. Application Data

(63) Continuation of application No. PCT/CN2019/121681, filed on Nov. 28, 2019.

(30) Foreign Application Priority Data

Nov. 30, 2018 (CN) .......................... 201811458287.7

(51) Int. Cl.
 *H04J 13/00* (2011.01)
 *H04L 27/26* (2006.01)
(52) U.S. Cl.
 CPC ...... *H04J 13/0014* (2013.01); *H04L 27/2605* (2013.01); *H04L 27/2613* (2013.01)
(58) Field of Classification Search
 CPC ............. H04J 13/0014; H04L 27/2605; H04L 27/2613
 See application file for complete search history.

(56) References Cited

U.S. PATENT DOCUMENTS

2014/0044045 A1  2/2014  Shin
2017/0257201 A1* 9/2017  Eitan .................... H04L 27/265
(Continued)

FOREIGN PATENT DOCUMENTS

CN   105245484 A   1/2016
CN   106712917 A   5/2017
(Continued)

OTHER PUBLICATIONS

IEEE 802.11-16/00994r0, "EDMG STF and CEF Design for SC PHY in 1 lay", Jul. 2016, pp. 1-40. Refer to at least pp. 5-6. (Year: 2016).*

(Continued)

*Primary Examiner* — Sophia Vlahos
(74) *Attorney, Agent, or Firm* — Hauptman Ham, LLP

(57) ABSTRACT

In this application, a manner of generating a modulated field STF is enriched, so that a manner of generating a PPDU is enriched, thereby improving data transmission flexibility. The method includes: After generating a PPDU, a transmit end sends the PPDU to at least one receive end, where the PPDU includes at least one modulated field STF, the modulated field STF includes a plurality of zero elements and a plurality of non-zero elements, m1 zero elements are included before a first non-zero element, m2 zero elements are included after a last non-zero element, m1+m2 zero elements are included between any two adjacent non-zero elements, m1 and m2 both are positive integers, and the modulated field STF is mapped to a plurality of consecutive subcarriers for transmission. This application is used for data transmission.

13 Claims, 27 Drawing Sheets

(56) References Cited

U.S. PATENT DOCUMENTS

2019/0190754 A1* 6/2019 Kim .................. H04L 5/0048
2019/0260446 A1* 8/2019 Oteri ................. H04L 5/0053

FOREIGN PATENT DOCUMENTS

| CN | 106797278 A | 5/2017 | |
|----|----|----|----|
| WO | 2018034701 A1 | 2/2018 | |
| WO | 2018076144 A1 | 5/2018 | |
| WO | 2018131800 A1 | 7/2018 | |
| WO | 2018194233 A1 | 10/2018 | |
| WO | WO-2019035961 A * | 2/2019 | ........... H04L 1/1692 |

OTHER PUBLICATIONS

IEEE Std 802.11-2016, IEEE Standard for Information technology—Telecommunications and information exchange between systems Local and metropolitan area networks—Specific requirements, Part 11: Wireless LAN Medium Access Control (MAC) and Physical Layer (PHY) Specifications, Approved Dec. 7, 2016, total 3534 pages.

International Search Report issued in corresponding International Application No. PCT/CN2019/121681, dated Feb. 26, 2020, pp. 1-9.

Chinese Office Action issued in corresponding Chinese Application No. 201811458287.7, dated May 24, 2022, pp. 1-14.

* cited by examiner

| RB in a spectrum resource: | RB | RB | RB | RB |
|---|---|---|---|---|
| First allocation case: | User 1 | User 2 | User 3 | User 4 |
| Second allocation case: | User 1 || User 2 ||
| Third allocation case: | User 1 | User 2 || User 3 |
| Fourth allocation case: | User 1 ||| User 2 |
| Fifth allocation case: | User 1 | User 2 |||
| Sixth allocation case: | User 1 ||||

| 3.0103 | 3.0103 | 3.0103 | 3.0103 |
|--------|--------|--------|--------|
| 3.0026 | | | 3.0026 |
| 3.0103 | 2.9020 | | 3.0103 |
| 5.2096 | | 4.2174 | 3.0103 |
| 3.0103 | | | |
| | | 3.0103 | |

G512 (2, :)

| 3.0103 | 3.0103 | 3.0103 | 3.0103 |
|--------|--------|--------|--------|
| | 3.0026 | 3.0026 | |
| 3.0103 | 2.9020 | | 3.0103 |
| | 4.2174 | 5.2096 | 3.0103 |
| 3.0103 | | | |
| | | 3.0103 | |

G512 (3, :)

| 3.0103 | 3.0103 | 3.0103 | 3.0103 |
|--------|--------|--------|--------|
| | 2.9020 | 2.9020 | |
| 3.0103 | 3.0026 | | 3.0103 |
| | 5.2069 | 4.2312 | 3.0103 |
| 3.0103 | | | |
| | | 3.0103 | |

G512 (4, :)

| 3.0103 | 3.0103 | 3.0103 | 3.0103 |
|--------|--------|--------|--------|
| 2.9020 | | | 2.9020 |
| 3.0103 | 2.9020 | | 3.0103 |
| 5.1087 | | 4.2174 | 3.0103 |
| 3.0103 | | | |
| | | 3.0103 | |

G512 (5, :)

| 3.0103 | 3.0103 | 3.0103 | 3.0103 |
|--------|--------|--------|--------|
| | 2.9020 | 2.9020 | |
| 3.0103 | 3.0026 | | 3.0103 |
| | 4.2174 | 5.1087 | 3.0103 |
| 3.0103 | | | |
| | | 3.0103 | |

G512 (6, :)

| 3.0103 | 3.0103 | 3.0103 | 3.0103 |
|--------|--------|--------|--------|
| | 2.9020 | 2.9020 | |
| 3.0103 | 2.9020 | | 3.0103 |
| | 4.2312 | 5.2096 | 3.0103 |
| 3.0103 | | | |
| | | 3.0103 | |

G512 (7, :)

| 3.0103 | 3.0103 | 3.0103 | 3.0103 |
|--------|--------|--------|--------|
| 2.9020 | | | 2.9020 |
| 3.0103 | 2.9020 | | 3.0103 |
| 5.1087 | | 4.2312 | 3.0103 |
| 3.0103 | | | |
| | | 3.0103 | |

G512 (8, :)

| 3.0103 | 3.0103 | 3.0103 | 3.0103 |
|--------|--------|--------|--------|
| | 2.9020 | 2.9020 | |
| 3.0103 | 2.9020 | | 3.0103 |
| | 4.2312 | 5.1087 | 3.0103 |
| 3.0103 | | | |
| | | 3.0103 | |

FIG. 10

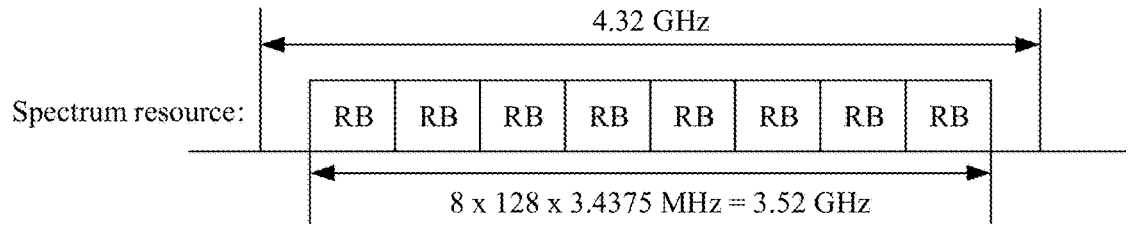

FIG. 11

| RB in a spectrum resource: | RB | RB | RB | RB | RB | RB | RB | RB |
|---|---|---|---|---|---|---|---|---|
| First allocation case: | User 1 | User 2 | User 3 | User 4 | User 5 | User 6 | User 7 | User 8 |
| Second allocation case: | User 1 | | User 2 | | User 3 | | User 4 | |
| Third allocation case: | User 1 | | | | User 2 | | | |
| Fourth allocation case: | User 1 | | User 2 | | | | | |
| Fifth allocation case: | User 1 | | | | | | User 2 | |
| Sixth allocation case: | User 1 | User 2 | | User 3 | | User 4 | | User 5 |
| Seventh allocation case: | User 1 | | User 2 | | | User 3 | | |
| Eighth allocation case: | User 1 | User 2 | | | User 3 | | | User 4 |
| Ninth allocation case: | User 1 | | User 2 | | | User 3 | | |
| Tenth allocation case: | User 1 | User 2 | | | User 3 | | | |
| Eleventh allocation case: | User 1 | | User 2 | | | User 3 | | |
| Twelfth allocation case: | User 1 | | | User 2 | | | | User 3 |
| Thirteenth allocation case: | User 1 | | | | User 2 | | | |
| Fourteenth allocation case: | User 1 | | | | | | | User 2 |
| Fifteenth allocation case: | User 1 | User 2 | | | | | | |
| Sixteenth allocation case: | User 1 | | | | | | | |

| 3.0103 | 3.0103 | 3.0103 | 3.0103 | 3.0103 | 3.0103 | 3.0103 |
|---|---|---|---|---|---|---|
| 3.0026 | | 3.0026 | | 3.0026 | | 3.0026 |
| | 3.0103 | | | 3.0103 | | |
| 3.0026 | | | 5.2227 | | | 3.0026 |
| | | 4.2111 | | | | |
| 3.0103 | 2.9618 | | 2.9618 | | 2.9618 | 3.0103 |
| | 5.2069 | | | 5.1672 | | 3.0026 |
| 3.0103 | | 5.2259 | | | 5.2259 | |
| | 3.0026 | | 5.1087 | | | 5.2069 |
| 3.0103 | | 5.9574 | | | 3.0103 | |
| | 3.0026 | | | 3.0103 | | 3.0026 |
| | 5.2069 | | | 5.9574 | | |
| | | 4.4114 | | 5.2069 | | 3.0103 |
| | | | 4.8174 | | | |
| | | 5.4674 | | | | |
| 3.0103 | | | | | | |
| | | 3.0008 | | | | |

G1024 (2, :)

| 3.0103 | 3.0103 | 3.0103 | 3.0103 | 3.0103 | 3.0103 | 3.0103 |
|---|---|---|---|---|---|---|
| 3.0026 | | 3.0026 | | 3.0026 | | 3.0026 |
| | | 3.0103 | | | 3.0103 | |
| 3.0026 | | | 5.2227 | | | 3.0026 |
| | | | 4.2111 | | | |
| 3.0103 | 2.9618 | | 2.9618 | | 2.9618 | 3.0103 |
| | 5.2069 | | | 5.1672 | | 3.0026 |
| 3.0103 | | 5.2259 | | | 5.2259 | |
| | 3.0026 | | 5.1087 | | | 5.2069 |
| 3.0103 | | 3.0103 | | | 5.9574 | |
| | 3.0026 | | | 3.0103 | | 3.0026 |
| | 5.2069 | | | 5.9574 | | |
| | | | 5.5630 | | | 3.0103 |
| | | 5.4674 | | 4.8174 | | |
| 3.0103 | | | | | | |
| | | | 3.0008 | | | |

FIG. 13

| RB in a spectrum resource: | RB | RB | RB | RB | RB | RB | RB | RB | RB | RB | RB | RB |
|---|---|---|---|---|---|---|---|---|---|---|---|---|
| First allocation case: | User 1 | User 2 | User 3 | User 4 | User 5 | User 6 | User 7 | User 8 | User 9 | User 10 | User 11 | User 12 |
| Second allocation case: | User 1 | | User 2 | | User 3 | | User 4 | | User 5 | | User 6 | |
| Third allocation case: | User 1 | | | | User 2 | | | | User 3 | | User 4 | |
| Fourth allocation case: | User 1 | | | | | | User 2 | | | | User 3 | |
| Fifth allocation case: | User 1 | | | | | | | | User 2 | | | |
| Sixth allocation case: | User 1 | | | | | | | | | | User 2 | |
| Seventh allocation case: | User 1 | | | | | | User 2 | | | | | |
| Eighth allocation case: | User 1 | | | | | | | | | | | |

| 3.0103 | 3.0103 | 3.0103 | 3.0103 | 3.0103 | 3.0103 | 3.0103 | 3.0103 | 3.0103 | 3.0103 | 3.0103 | 3.0103 |
|---|---|---|---|---|---|---|---|---|---|---|---|
| 3.0026 || 3.0026 || 3.0026 || 3.0026 || 3.0026 || 3.0026 ||
| 5.1672 ||| 5.1087 ||| 5.2259 ||| 5.2069 |||
| 3.0103 |||| 5.5782 |||| 3.0103 ||||
| 3.0103 |||||| 5.5782 ||||||
| 6.8696 ||||||||| 3.0103 |||
| 3.0103 |||| 3.9221 ||||||||
| 4.0646 ||||||||||||

G1536 (2, :)

| 3.0103 | 3.0103 | 3.0103 | 3.0103 | 3.0103 | 3.0103 | 3.0103 | 3.0103 | 3.0103 | 3.0103 | 3.0103 | 3.0103 |
|---|---|---|---|---|---|---|---|---|---|---|---|
| 3.0026 || 3.0026 || 3.0026 || 3.0026 || 3.0026 || 3.0026 ||
| 5.1672 ||| 5.1087 ||| 5.2259 ||| 5.2069 |||
| 3.0103 |||| 5.5782 |||| 3.0103 ||||
| 3.0103 |||||| 5.5782 ||||||
| 6.8696 ||||||||| 3.0103 |||
| 3.0103 |||| 3.9221 ||||||||
| 4.0646 ||||||||||||

| RB in a spectrum resource: | RB | RB | RB | RB | RB | RB | RB | RB | RB | RB | RB | RB | RB | RB | RB | RB |
|---|---|---|---|---|---|---|---|---|---|---|---|---|---|---|---|---|
| First allocation case: | User 1 | User 2 | User 3 | User 4 | User 5 | User 6 | User 7 | User 8 | User 9 | User 10 | User 11 | User 12 | User 13 | User 14 | User 15 | User 16 |
| Second allocation case: | User 1 | | User 2 | | User 3 | | User 4 | | User 5 | | User 6 | | User 7 | | User 8 | |
| Third allocation case: | User 1 | | | | User 2 | | | | User 3 | | | | User 4 | | | |
| Fourth allocation case: | User 1 | | | | | | | | User 2 | | | | | | | |
| Fifth allocation case: | User 1 | | | | | | | | | | | | | | | |

| 3.0103 | 3.0103 | 3.0103 | 3.0103 | 3.0103 | 3.0103 | 3.0103 | 3.0103 | 3.0103 | 3.0103 | 3.0103 | 3.0103 | 3.0103 | 3.0103 | 3.0103 | 3.0103 |
|---|---|---|---|---|---|---|---|---|---|---|---|---|---|---|---|
| 3.0103 || 3.0103 || 3.0103 || 3.0103 || 3.0103 || 3.0103 || 3.0103 || 3.0103 ||
| 3.0103 |||| 3.0101 |||| 3.0103 |||| 3.0103 ||||
| 3.0101 |||||||| 3.2923 ||||||||
| 3.0103 ||||||||||||||||

G2048(2, :)

| 3.0103 | 3.0103 | 3.0103 | 3.0103 | 3.0103 | 3.0103 | 3.0103 | 3.0103 | 3.0103 | 3.0103 | 3.0103 | 3.0103 | 3.0103 | 3.0103 | 3.0103 | 3.0103 |
|---|---|---|---|---|---|---|---|---|---|---|---|---|---|---|---|
| 3.0042 || 3.0042 || 3.0042 || 3.0042 || 3.0042 || 3.0042 || 3.0042 || 3.0042 ||
| 3.0103 |||| 3.0103 |||| 3.0103 |||| 3.0103 ||||
| 3.0042 |||||||| 3.2942 ||||||||
| 3.0103 ||||||||||||||||

FIG. 19

First modulated field STF

| 3.0103 | 3.0103 | 3.0103 | 3.0103 |
|---|---|---|---|
| 2.9886 | | 2.9986 | |
| | 3.0103 | | 3.0103 |
| | 5.1603 | | 4.2276 | |
| 3.0103 | | | |
| 3.0103 | 2.9762 | | 3.0103 |

Second modulated field STF

| 3.0103 | 3.0103 | 3.0103 | 3.0103 |
|---|---|---|---|
| 2.9886 | | 2.9986 | |
| | 3.0103 | | |
| | 5.1603 | | 4.2276 | 3.0103 |
| 3.0103 | | | |
| 3.0103 | 2.9762 | | 3.0103 |

Third modulated field STF

| 3.0103 | 3.0103 | 3.0103 | 3.0103 |
|---|---|---|---|
| 2.9839 | | 2.9839 | |
| | 3.0103 | | |
| 3.0103 | 4.0902 | | 5.1607 | 3.0103 |
| 3.0103 | 2.9581 | | 3.0103 |

Fourth modulated field STF

| 3.0103 | 3.0103 | 3.0103 | 3.0103 |
|---|---|---|---|
| 2.9839 | | 2.9839 | |
| | 3.0103 | | |
| 3.0103 | 4.0902 | | 5.1607 | 3.0103 |
| 3.0103 | 2.9581 | | 3.0103 |

Fifth modulated field STF

| 3.0103 | 3.0103 | 3.0103 | 3.0103 |
|---|---|---|---|
| 2.9839 | | 2.9839 | |
| | 3.0103 | | |
| 3.0103 | 4.2525 | | 5.0959 | 3.0103 |
| 3.0103 | 2.9581 | | 3.0103 |

Sixth modulated field STF

| 3.0103 | 3.0103 | 3.0103 | 3.0103 |
|---|---|---|---|
| 2.9839 | | 2.9839 | |
| | 3.0103 | | |
| 3.0103 | 4.2525 | | 5.0959 | 3.0103 |
| 3.0103 | 2.9581 | | 3.0103 |

Seventh modulated field STF

| 3.0103 | 3.0103 | 3.0103 | 3.0103 |
|---|---|---|---|
| 2.9581 | | 2.9581 | |
| | 3.0103 | | |
| | 5.1607 | | 4.2525 | 3.0103 |
| 3.0103 | | | |
| 3.0103 | 2.9839 | | 3.0103 |

Eighth modulated field STF

| 3.0103 | 3.0103 | 3.0103 | 3.0103 |
|---|---|---|---|
| 2.9581 | | 2.9581 | |
| | 3.0103 | | |
| | 5.1607 | | 4.2525 | 3.0103 |
| 3.0103 | | | |
| 3.0103 | 2.9839 | | 3.0103 |

FIG. 21

| First modulated field STF | | | | | | | | Second modulated field STF | | | | | | | |
|---|---|---|---|---|---|---|---|---|---|---|---|---|---|---|---|
| 3.0103 | 3.0103 | 3.0103 | 3.0103 | 3.0103 | 3.0103 | 3.0103 | 3.0103 | 3.0103 | 3.0103 | 3.0103 | 3.0103 | 3.0103 | 3.0103 | 3.0103 | 3.0103 |
| 2.9896 | 2.9896 | 2.9896 | 2.9896 | 2.9896 | 2.9896 | 2.9896 | 2.9896 | 2.9581 | 2.9581 | 2.9581 | 2.9581 | 2.9581 | 2.9581 | 2.9581 | 2.9581 |
| 3.0103 | | | | | | | | 3.0103 | | | | | | | |
| 2.9894 | | | | | | | | 2.9581 | | | | | | | |
| 2.9896 | | | | 5.1603 | | | | 2.9581 | | | | 4.2333 | | | |
| 4.2256 | | | | | | | | 5.1886 | | | | | | | |
| 3.0103 | 2.9762 | 2.9762 | 2.9762 | 2.9762 | 2.9762 | 2.9762 | 3.0103 | 3.0103 | 3.0095 | 3.0095 | 3.0095 | 3.0095 | 3.0095 | 3.0095 | 3.0103 |
| 5.0283 | | | 5.1886 | | | 2.9686 | | 5.2183 | | | 5.0959 | | | 2.9581 | |
| 3.0103 | 5.1603 | 5.1603 | 5.1603 | 5.1603 | 5.1603 | 5.1603 | 3.0103 | 3.0103 | 5.1607 | 5.1607 | 5.1607 | 5.1607 | 5.1607 | 5.1607 | 3.0103 |
| 2.9886 | | | 5.1607 | | | 5.0283 | | 2.9581 | | | 4.8111 | | | 5.2183 | |
| 3.0103 | | | 5.9684 | | | 5.0283 | | 3.0103 | | | 3.0103 | | | 5.2183 | |
| 2.9886 | | | 3.0103 | | | 2.9886 | | 2.9581 | | | 3.0103 | | | 2.9581 | |
| 5.0283 | | | 3.0103 | | | 5.0283 | | 5.2183 | | | 5.3542 | | | 5.2183 | |
| | 5.1607 | | | 4.9544 | | 3.0103 | | | 5.9684 | | | 4.9544 | | 3.0103 | |
| 3.0103 | | | | 5.6969 | | | | 3.0103 | | | | 5.6969 | | | |

FIG. 22

| 2.9945 | 3.0093 | 2.9945 | 3.0093 | 2.9945 | 3.0093 | 2.9945 | 3.0093 |
|--------|--------|--------|--------|--------|--------|--------|--------|
| 2.9972 || 2.9720 || 2.9972 || 2.9720 ||
| 3.0080 |||| 3.0099 ||||
| 2.9694 ||||||||
| 2.9945 | 2.9915 ||| 3.0081 || 3.0081 | 3.0093 |
| 2.9972 || 2.9994 ||| 2.9720 |||
| 2.9972 || 4.2457 ||||||
| 5.2087 |||||| 2.9720 ||
| 5.0756 ||| 5.1468 ||| 2.9720 ||
| 2.9845 | 5.2238 ||| 5.2240 ||| 3.0093 |
| 2.9972 || 5.2245 ||| 5.1778 |||
| 2.9945 | 2.9945 |||| 5.0283 |||
| 5.0756 ||| 6.0009 |||| 3.0003 |
| 5.5472 |||| 5.0283 ||||
| 5.6305 ||||||| 3.0093 |
| 2.9945 | 4.9711 |||||||

FIG. 23

| 3.0103 | 3.0103 | 3.0103 | 3.0103 | 3.0103 | 3.0103 | 3.0103 | 3.0103 | 3.0103 | 3.0103 | 3.0103 | 3.0103 |
|---|---|---|---|---|---|---|---|---|---|---|---|
| 3.0095 | | 3.0095 | | 3.0095 | | 3.0095 | | 3.0095 | | 3.0095 | |
| 3.0103 | | | | 3.0103 | | | | 3.0103 | | | |
| 2.9744 | | | | | | | | 2.9744 | | | |
| 3.0103 | | | | | | | | | | | |

| 2.9761 | 2.9761 | 2.9761 | 2.9761 |
|---|---|---|---|
| 3.0013 | | | 2.9978 |
| 2.9761 | 3.0026 | | 2.9761 |
| | 5.0498 | | |
| 2.9761 | | 5.0934 | 2.9761 |
| | 2.9396 | | |
| 3.0013 | | | |

G352 (2, :)

| 2.9761 | 2.9761 | 2.9761 | 2.9761 |
|---|---|---|---|
| 3.0013 | | | 2.9978 |
| 2.9761 | 2.9978 | | 2.9761 |
| | 5.1959 | | |
| 2.9761 | | 4.9599 | |
| | | 3.0006 | |

G352 (3, :)

| 2.9761 | 2.9761 | 2.9761 | 2.9761 |
|---|---|---|---|
| 3.0076 | | 3.0026 | |
| 2.9761 | 3.0026 | | 2.9761 |
| | 5.0498 | | |
| 2.9761 | | 4.8038 | |
| | | 3.0011 | |

G352 (4, :)

| 2.9761 | 2.9761 | 2.9761 | 2.9761 |
|---|---|---|---|
| 3.0076 | | | 2.9978 |
| 2.9761 | 3.0026 | | 2.9761 |
| | 5.1040 | | |
| 2.9761 | | 5.0934 | |
| | 2.9396 | | |

G352 (5, :)

| 2.9761 | 2.9761 | 2.9761 | 2.9761 |
|---|---|---|---|
| 3.0076 | | | 2.9978 |
| 2.9761 | 2.9978 | | 2.9761 |
| | 5.0983 | | |
| 2.9761 | | 4.9599 | |
| | | 3.0006 | |

G352 (6, :)

| 2.9761 | 2.9761 | 2.9761 | 2.9761 |
|---|---|---|---|
| 3.0076 | | 3.0026 | |
| 2.9761 | 3.0026 | | 2.9761 |
| | 5.1040 | | |
| 2.9761 | | 5.0690 | |
| | | 3.0011 | |

G352 (7, :)

| 2.9761 | 2.9761 | 2.9761 | 2.9761 |
|---|---|---|---|
| 3.0013 | | 3.0026 | |
| 2.9761 | 2.9978 | | 2.9761 |
| | 5.1959 | | |
| 2.9761 | | 4.8038 | |
| | 3.0011 | | |

G352 (8, :)

| 2.9761 | 2.9761 | 2.9761 | 2.9761 |
|---|---|---|---|
| 3.0013 | | 3.0026 | |
| 2.9761 | 3.0026 | | 2.9761 |
| | 5.0983 | | |
| 2.9761 | | 5.0690 | |
| | 2.9554 | | |

| 3.0031 | 3.0031 | 3.0031 | 3.0031 | 3.0031 | 3.0031 |
|---|---|---|---|---|---|
| 3.0026 | 2.9936 | 3.0026 | 2.9936 | 3.0026 | 2.9936 |
| 2.9912 | | 3.0067 | | | |
| 5.0483 | | | 2.9936 | | 5.0526 |
| | 3.0026 | | | | |
| 3.0031 | 3.0026 | 2.9936 | 2.9936 | 2.9936 | 3.0031 |
| 5.1609 | | 5.0551 | | 2.9936 | |
| 3.0031 | 5.0744 | | 5.0744 | | 3.0031 |
| 3.0026 | | 5.0930 | | 5.0930 | |
| 3.0031 | 3.0067 | | 5.0930 | | |
| 3.0026 | | 3.0011 | | 2.9926 | |
| 5.1609 | | 5.8159 | | | 3.0031 |
| | 5.3016 | | 5.0930 | | |
| | 5.2147 | 4.8280 | | | |
| 3.0031 | | 3.0011 | | | |

G704 (2, :)

| 3.0031 | 3.0031 | 3.0031 | 3.0031 | 3.0031 | 3.0031 |
|---|---|---|---|---|---|
| 3.0026 | 2.9936 | 3.0026 | 2.9936 | 3.0026 | 2.9936 |
| 2.9912 | | 3.0067 | | | |
| 4.7948 | | | 3.0026 | | 4.9764 |
| | | 2.9936 | | | |
| 3.0031 | 3.0026 | 2.9936 | 2.9936 | 2.9936 | 3.0031 |
| 5.1609 | | 5.1609 | | 2.9936 | |
| 3.0031 | 5.0744 | | 5.0744 | | 3.0031 |
| 3.0026 | | 5.0551 | | 5.0930 | |
| 3.0031 | | 5.8943 | | 5.0930 | |
| 3.0026 | | 2.9665 | | 2.9936 | |
| 5.1609 | | | 2.9912 | | 3.0031 |
| | 4.3968 | | | 5.0930 | |
| | 4.5145 | 5.2918 | | | |
| 3.0031 | | 2.9910 | | | |

| 2.9900 | 2.9900 | 2.9900 | 2.9900 | 2.9900 | 2.9900 | 2.9900 | 2.9900 | 2.9900 | 2.9900 | 2.9900 | 2.9900 |
|---|---|---|---|---|---|---|---|---|---|---|---|
| 3.0026 || 3.0026 || 2.9978 || 2.9978 || 2.9978 || 2.9978 ||
| 5.1609 ||| 5.1958 ||| 5.0401 ||| 5.1958 |||
| 5.4970 |||| 5.9241 |||| 5.8152 ||||
| 5.1032 |||||| 5.1264 ||||||
| 3.0062 |||||| 5.8152 ||||||
| 5.4970 |||| 5.3028 ||||||||
| 3.9883 ||||||||||||

G1056 (2, :)

| 2.9900 | 2.9900 | 2.9900 | 2.9900 | 2.9900 | 2.9900 | 2.9900 | 2.9900 | 2.9900 | 2.9900 | 2.9900 | 2.9900 |
|---|---|---|---|---|---|---|---|---|---|---|---|
| 3.0026 || 3.0026 || 2.9978 || 2.9978 || 2.9978 || 2.9978 ||
| 5.1609 ||| 5.1958 ||| 5.0401 ||| 5.1958 |||
| 5.4970 |||| 5.9241 |||| 5.8152 ||||
| 5.1032 |||||| 5.1264 ||||||
| 3.0062 |||||| 5.8152 ||||||
| 5.4970 |||| 5.3028 ||||||||
| 3.9883 ||||||||||||

G1056 (9, :)

| 2.9900 | 2.9900 | 2.9900 | 2.9900 | 2.9900 | 2.9900 | 2.9900 | 2.9900 | 2.9900 | 2.9900 | 2.9900 | 2.9900 |
|---|---|---|---|---|---|---|---|---|---|---|---|
| 3.0026 || 3.0026 || 2.9978 || 2.9978 || 2.9978 || 2.9978 ||
| 5.1609 ||| 5.1958 ||| 5.0401 ||| 5.1958 |||
| 5.4970 |||| 5.9241 |||| 5.8152 ||||
| 5.1032 |||||| 5.1264 ||||||
| 3.0062 |||||||| 5.8152 ||||
| 5.4970 |||| 5.3028 ||||||||
| 3.9883 ||||||||||||

G1056 (10, :)

| 2.9900 | 2.9900 | 2.9900 | 2.9900 | 2.9900 | 2.9900 | 2.9900 | 2.9900 | 2.9900 | 2.9900 | 2.9900 | 2.9900 |
|---|---|---|---|---|---|---|---|---|---|---|---|
| 3.0026 || 3.0026 || 2.9978 || 2.9978 || 2.9978 || 2.9978 ||
| 5.1609 ||| 5.1958 ||| 5.0401 ||| 5.1958 |||
| 5.4970 |||| 5.9241 |||| 5.8152 ||||
| 5.1032 |||||| 5.1264 ||||||
| 3.0062 |||||||| 5.8152 ||||
| 5.4970 |||| 5.3028 ||||||||
| 3.9883 ||||||||||||

| 3.0031 | 3.0031 | 3.0031 | 3.0031 | 3.0031 | 3.0031 | 3.0031 | 3.0031 | 3.0031 | 3.0031 | 3.0031 | 3.0031 |
|---|---|---|---|---|---|---|---|---|---|---|---|
| 3.0026 | | 2.9979 | 3.0026 | | 2.9979 | 3.0026 | | 2.9979 | 3.0026 | | 2.9979 |
| 3.0067 | | | | 2.9941 | | 3.0067 | | | | 2.9941 | |
| 3.0033 | | | | | | 2.9922 | | | | | |
| 3.0101 | | | | | | | | | | | |

G1408 (2, :)

| 3.0031 | 3.0031 | 3.0031 | 3.0031 | 3.0031 | 3.0031 | 3.0031 | 3.0031 | 3.0031 | 3.0031 | 3.0031 | 3.0031 |
|---|---|---|---|---|---|---|---|---|---|---|---|
| 3.0026 | | 2.9979 | 3.0026 | | 2.9979 | 3.0026 | | 2.9979 | 3.0026 | | 2.9979 |
| 3.0067 | | | | 2.9941 | | 3.0067 | | | | 2.9941 | |
| 3.0033 | | | | | | 2.9922 | | | | | |
| 3.0007 | | | | | | | | | | | |

DATA TRANSMISSION METHOD, APPARATUS, AND SYSTEM

CROSS-REFERENCE TO RELATED APPLICATIONS

This application is a continuation of International Application No. PCT/CN2019/121681, filed on Nov. 28, 2019, which claims priority to Chinese Patent Application No. 201811458287.7, filed on Nov. 30, 2018. The disclosures of the aforementioned applications are hereby incorporated by reference in their entireties.

BACKGROUND

A wireless local area network (Wireless Local Area Network, WLAN) is generally referred to as a wireless fidelity (Wireless Fidelity, Wi-Fi) communications network, and a used standard is an institute of electrical and electronic engineers (Institute of Electrical and Electronics Engineers, IEEE) 802.11 series of standards. The IEEE 802.11 series of standards include IEEE 802.11n, IEEE 802.11ac, IEEE 802.11ax, IEEE 802.11ad, and IEEE 802.11ay. IEEE 802.11n and IEEE 802.11ac (IEEE 802.11n/ac for short) are currently the most widely used WLAN standards, and operating frequency bands of IEEE 802.11n and IEEE 802.11ac are respectively 2.4 GHz (gigahertz) and 5 GHz (2.4/5 GHz for short). IEEE 802.11ax is natural evolution of IEEE 802.11n/ac, and an operating frequency band of IEEE 802.11ax is also 2.4/5 GHz. An operating frequency band of IEEE 802.11ad/ay is 60 GHz, and a transmission rate of 60 GHz-based IEEE 802.11ad is able to reach 8 Gbps (switching bandwidth), in other words, 1 GB/s, and a peak transmission rate of next-generation IEEE 802.11ay is able to reach 176 Gbps, in other words, 22 GB/s. Due to ultra-high bandwidth, IEEE 802.11ay is expected to implement high-definition transmission, wireless screen projection, wireless backhaul, and the like.

In existing IEEE 802.11 series of standards, an orthogonal frequency division multiplexing (Orthogonal Frequency Division Multiplexing, OFDM) technology is widely used. OFDM is essentially a multi-carrier modulation scheme, and is used to divide a channel into several orthogonal sub-channels in frequency domain and modulate one subcarrier on each sub-channel, and several modulated subcarriers are transmitted in parallel. A carrier may also be referred to as a carrier frequency, and is an electric wave generated by an oscillator and transmitted on a channel After being modulated, the carrier is used to transmit information, in other words, the carrier is a carrying tool for transmitting information.

A single-carrier transmission mode and an OFDM transmission mode are already used in an existing 60 GHz WLAN standard (IEEE 802.11ay). Although a single-carrier transmission signal has a relatively low peak to average power ratio (Peak to Average Power Ratio, PAPR), it is difficult to perform frequency division multiplexing on a single carrier. Although frequency division multiplexing is performed on an OFDM transmission signal, because the OFDM transmission signal has a relatively high peak to average power ratio, a power amplifier in a transmitter needs to have relatively large power backoff, to avoid a phenomenon of signal distortion on a frequency band and signal leakage out of the frequency band, thereby causing relatively low use efficiency of the power amplifier in the transmitter. Currently, data transmission flexibility is relatively low.

SUMMARY

This application provides a data transmission method, apparatus, and system, to resolve a current problem of relatively low data transmission flexibility. The technical solutions are as follows:

According to a first aspect, a data transmission method is provided, where the method is used by a transmit end, and the method includes:

generating a PPDU, and sending the PPDU to at least one receive end.

The PPDU includes at least one modulated field STF, the modulated field STF includes a plurality of zero elements and a plurality of non-zero elements, m1 zero elements are included before a first non-zero element, m2 zero elements are included after a last non-zero element, m1+m2 zero elements are included between any two adjacent non-zero elements, m1 and m2 both are positive integers, and the modulated field STF is mapped to a plurality of consecutive subcarriers for transmission.

In other words, the non-zero elements in the modulated field STF are periodically distributed. In a process of generating the PPDU, based on a non-zero sequence including non-zero elements, the transmit end may insert m1 zero elements before each non-zero element, and insert m2 non-zero elements after each non-zero element, to generate the modulated field STF. In this application, a manner of generating the modulated field STF is enriched, so that a manner of generating the PPDU is enriched; and the transmit end sends a PPDU that includes a new modulated field STF, so that data transmission flexibility is improved.

In this application, the transmit end transmits the modulated field STF in a conventional OFDM transmission manner. After mapping the modulated field STF to a plurality of subcarriers, the transmit end makes a 0-frequency position of the modulated field STF between two subcarriers.

In this application, a non-zero sequence with a relatively low PAPR needs to be selected to generate the modulated field STF. Inserting a zero element into the non-zero sequence affects the PAPR of the entire sequence little. Therefore, when the PAPR of the non-zero sequence used to generate the modulated field STF is relatively low, a PAPR of the generated modulated field STF is made relatively low, so that use efficiency of a power amplifier at the transmit end is improved.

In a 60 GHz WLAN standard, the PPDU includes a pre-modulated field and a modulated field, and the modulated field STF in this application is an STF located in the modulated field.

According to a second aspect, another data transmission method is provided, where the method is used by a receive end, and the method includes:

receiving a PPDU sent by a transmit end, and parsing the PPDU.

The PPDU includes at least one modulated field STF, the modulated field STF includes a plurality of zero elements and a plurality of non-zero elements, the modulated field STF is mapped to a plurality of consecutive subcarriers for transmission, m1 zero elements are included before a first non-zero element, m2 zero elements are included after a last non-zero element, m1+m2 zero elements are included between any two adjacent non-zero elements, and m1 and m2 both are positive integers.

In a first possible implementation of the first aspect and the second aspect, the non-zero elements in the modulated field STF form a Golay sequence.

Because a transmission waveform of the Golay sequence is characterized by a low PAPR, when the non-zero elements in the modulated field STF is able to form a Golay sequence, it is ensured that a PAPR of the modulated field STF is relatively low.

In a second possible implementation of the first aspect and the second aspect, the modulated field STF includes one or more sequences whose lengths are N, each sequence whose length is N is mapped to a subcarrier on one resource block RB for transmission, and N is a positive integer.

With reference to the second possible implementation of the first aspect and the second aspect, in a third possible implementation of the first aspect and the second aspect, when channel bonding is CB=1, the modulated field STF includes four sequences for which N=128, and m1+m2=3.

It should be understood that one basic channel is used to transmit the modulated field STF, the basic channel is divided into four RBs, and a quantity of subcarriers on each RB is 128. Based on a time-frequency period characteristic of the sequence, when three zero elements are included between two adjacent non-zero elements in the modulated field STF, in other words, when one valued subcarrier is placed with three zero-valued subcarriers on the RB, it is ensured that one OFDM symbol includes four time-domain periods.

With reference to the second possible implementation of the first aspect and the second aspect, in a fourth possible implementation of the first aspect and the second aspect, when channel bonding is CB=1, the modulated field STF includes four sequences for which N=88, and m1+m2=3.

It should be understood that one basic channel is used to transmit the modulated field STF, the basic channel is divided into four RBs, and a quantity of subcarriers on each RB is 88. Based on a time-frequency period characteristic of the sequence, when three zero elements are included between two adjacent non-zero elements in the modulated field STF, in other words, when one valued subcarrier is placed with three zero-valued subcarriers on the RB, it is ensured that one OFDM symbol includes four time-domain periods.

With reference to the third possible implementation or the fourth possible implementation of the first aspect and the second aspect, in a fifth possible implementation of the first aspect and the second aspect, m1=1 and m2=2, or m1=2 and m2=1. In other words, when N=128 and when N=88, one zero element is inserted before each non-zero element in the non-zero sequence, and two non-zero elements is inserted after each non-zero element, to obtain the modulated field STF; or two zero elements are inserted before each non-zero element in the non-zero sequence, and one non-zero element is inserted after each non-zero element, to obtain the modulated field STF.

With reference to the third possible implementation of the first aspect and the second aspect, in a sixth possible implementation of the first aspect and the second aspect, a length of the modulated field STF in time domain is equal to a length, in time domain, of five OFDM symbols carrying no cyclic prefix.

With reference to the fourth possible implementation of the first aspect and the second aspect, in a seventh possible implementation of the first aspect and the second aspect, a length of the modulated field STF in time domain is equal to a length, in time domain, of 7.5 OFDM symbols carrying no cyclic prefix.

With reference to the third possible implementation of the first aspect and the second aspect, in an eighth possible implementation of the first aspect and the second aspect, the modulated field STF is generated based on two binary Golay sequences whose lengths each are 32, and the two binary Golay sequences are respectively: R1=[1, 1, −1, 1, 1, 1, 1, −1, 1, 1, −1, 1, −1, −1, −1, 1, 1, 1, −1, 1, 1, 1, 1, −1, −1, −1, 1, −1, 1, 1, 1, −1], and R2=[1, 1, −1, 1, 1, 1, 1, −1, 1, 1, −1, 1, −1, −1, −1, 1, −1, −1, 1, −1, −1, −1, −1, 1, 1, 1, −1, 1, −1, −1, 1].

With reference to the eighth possible implementation of the first aspect and the second aspect, in a ninth possible implementation of the first aspect and the second aspect, the modulated field STF is obtained by inserting a zero element before and after each non-zero element in G128 (v, :) based on a specified rule, where v is a positive integer and a value range meets 1≤v≤8; where G128 (1, :)=[R1, R2, R1, −R2]; G128 (2, :)=[R1, R2, −R1, R2]; G128 (3, :)=[R2, R1, R2, −R1]; G128 (4, :)=[R2, R1, −R2, R1]; G128 (5, :)=[R1, −R2, R1, R2]; G128 (6, :)=[−R1, R2, R1, R2]; G128 (7, :)=[R2, −R1, R2, R1]; and G128 (8, :)=[−R2, R1, R2, R1].

In this application, when CB=1, the modulated field STF is denoted as G512 (v, :). That the modulated field STF is obtained by inserting a zero element before and after each non-zero element in G128 (v, :) based on a specified rule includes: inserting one zero element before each non-zero element in G128 (v, :) and inserting two zero elements after each non-zero element in G128 (v, :), to obtain G512 (v, :), or inserting two zero elements before each non-zero element in G128 (v, :) and inserting one zero element after each non-zero element in G128 (v, :), to obtain G512 (v, :). In other words, when CB=1, one modulated field STF generated by the transmit end may have eight possible choices. When the transmit end supports a multiple-input multiple-output (Multiple-Input Multiple-Output, MIMO) technology, the PPDU includes a plurality of modulated field STFs, and the plurality of modulated field STFs need to be orthogonal to each other. In this case, the transmit end may generate, based on the eight modulated field STFs provided in the ninth possible implementation, the plurality of modulated field STFs that are orthogonal to each other. Because non-zero elements in each resource block form a Golay sequence, a PAPR of a sequence transmitted on each resource block is relatively low. When different resource blocks are allocated to different users, multi-user frequency division multiplexing is implemented while a low PAPR is ensured.

With reference to the fourth possible implementation of the first aspect and the second aspect, in a tenth possible implementation of the first aspect and the second aspect, the modulated field STF is generated based on two quaternary Golay sequences whose lengths each are 22, and the two quaternary Golay sequences are respectively: S1=[−1i, 1, 1, −1, 1, 1, 1i, −1i, −1, −1, 1, −1, 1i, 1i, −1i, 1i, 1i, 1i, 1, −1, −1i, −1], and S2=[−1i, −1, 1, 1, 1, −1, 1i, 1i, −1, 1, 1, 1, 1i, −1i, −1i, −1i, 1i, −1i, 1, 1, −1i, 1].

With reference to the tenth possible implementation of the first aspect and the second aspect, in an eleventh possible implementation of the first aspect and the second aspect, the modulated field STF is obtained by inserting a zero element before and after each non-zero element in G88 (v, :) based on a specified rule, where v is a positive integer and a value range meets 1≤v≤8; where G88 (1, :)=[S1, S2, S1, −S2]; G88 (2, :)=[S1, S2, −S1, S2]; G88 (3, :)=[S2, S1, S2, −S1]; G88 (4, :)=[S2, S1, −S2, S1]; G88 (5, :)=[S1, −S2, S1, S2]; G88 (6, :)=[−S1, S2, S1, S2]; G88 (7, :)=[S2, −S1, S2, S1]; and G88 (8, :)=[−S2, S1, S2, S1].

In this application, when CB=1, the modulated field STF is denoted as G352 (v, :). That the modulated field STF is obtained by inserting a zero element before and after each non-zero element in G88 (v, :) based on a specified rule includes: inserting one zero element before each non-zero element in G88 (v, :) and inserting two zero elements after each non-zero element in G88 (v, :) to obtain G352 (v, :), or inserting two zero elements before each non-zero element in G128 (v, :) and inserting one zero element after each non-zero element in G128 (v, :) to obtain G352 (v, :). In other words, when CB=1, one modulated field STF generated by the transmit end may have eight possible choices. When the transmit end supports a MIMO technology, the PPDU includes a plurality of modulated field STFs, and the plurality of modulated field STFs need to be orthogonal to each other. In this case, the transmit end may generate, based on the eight modulated field STFs provided in the eleventh possible implementation, the plurality of modulated field STFs that are orthogonal to each other. Because non-zero elements in each resource block form a Golay sequence, a PAPR of a sequence transmitted on each resource block is relatively low. When different resource blocks are allocated to different users, multi-user frequency division multiplexing is implemented while a low PAPR is ensured.

With reference to the ninth possible implementation of the first aspect and the second aspect, in a twelfth possible implementation of the first aspect and the second aspect, when CB=2, the modulated field STF is denoted as G1024 (v, :), and G1024 (v, :) is determined based on two different modulated field STFs when CB=1; where G1024 (1, :)=[G512 (1, :), G512 (2, :)]; G1024 (2, :)=[G512 (1, :), −G512 (2, :)]; G1024 (3, :)=[G512 (3, :), G512 (4, :)]; G1024 (4, :)=[G512 (3, :), −G512 (4, :)]; G1024 (5, :)=[G512 (5, :), G512 (6, :)]; G1024 (6, :)=[G512 (5, :), −G512 (6, :)]; G1024 (7, :)=[G512 (7, :), G512 (8, :)]; and G1024 (8, :)=[G512 (7, :), −G512 (8, :)].

With reference to the third possible implementation of the first aspect and the second aspect, in a thirteenth possible implementation of the first aspect and the second aspect, when CB=3, the modulated field STF is generated based on eight binary Golay sequences whose lengths each are 32, and the eight binary Golay sequences are respectively: R1=[1, 1, −1, 1, 1, 1, 1, −1, 1, 1, −1, 1, −1, −1, −1, 1, −1, −1, 1, −1, −1, −1, 1, 1, 1, −1, 1, −1, −1, −1, 1], R2=[1, −1, −1, −1, 1, −1, 1, 1, 1, −1, −1, −1, −1, 1, −1, −1, −1, 1, 1, 1, −1, 1, −1, −1, 1, −1, −1, −1, −1, 1, −1, −1], R3=[1, 1, −1, 1, 1, 1, 1, −1, 1, 1, −1, 1, −1, −1, −1, 1, 1, 1, −1, 1, 1, 1, 1, −1, −1, −1, 1, −1, 1, 1, 1, −1], R4=[1, −1, −1, −1, 1, −1, 1, 1, 1, −1, −1, −1, 1, −1, 1, −1, −1, −1, 1, −1, 1, 1, −1, 1, 1, 1, −1, 1, 1], R5=[1, 1, −1, 1, 1, 1, 1, −1, 1, 1, −1, 1, −1, −1, −1, 1, 1, 1, −1, 1, 1, 1, 1, −1, 1, 1, −1, 1, −1, −1, −1, 1, 1, 1, −1, 1, 1, 1, 1, −1], R6=[1, −1, −1, −1, 1, −1, 1, 1, 1, −1, −1, −1, −1, 1, −1, −1, 1, −1, −1, −1, 1, −1, 1, 1, 1, −1, −1, −1, −1, 1, −1, 1, 1], R7=[1, 1, −1, 1, 1, 1, 1, −1, 1, 1, −1, 1, −1, −1, −1, 1, −1, −1, 1, −1, −1, −1, 1, 1, 1, −1, 1, −1, −1, −1, 1, 1], and R8=[1, −1, −1, −1, 1, −1, 1, 1, 1, −1, −1, −1, −1, 1, −1, 1, 1, 1, −1, 1, −1, −1, −1, 1, −1, −1].

With reference to the thirteenth possible implementation of the first aspect and the second aspect, in a fourteenth possible implementation of the first aspect and the second aspect, for each binary Golay sequence, a zero element is inserted before and after each non-zero element based on a specified rule to obtain eight sequences whose lengths are 128, and the eight sequences whose lengths are 128 are respectively denoted as G128_1 (1, :), G128_1 (2, :), G128_2 (1, :), G128_2 (2, :), G128_3 (1, :), G128_3 (2, :), G128_4 (1, :), and G128_4 (2, :); and the modulated field STF is denoted as G1536 (v, :), where v is a positive integer and a value range meets 1≤v≤8; where G1536 (1, :)=[G128_1 (1, :), −G128_2 (1, :), −G128_1 (1, :), −G128_2 (1, :), −G128_1 (1, :), G128_2 (1, :), −G128_1 (1, :), −G128_2 (1, :), G128_1 (1, :), G128_2 (1, :), −G128_1 (1, :), G128_2 (1, :)]; G1536 (2, :)=[G128_1 (2, :), −G128_2 (2, :), −G128_1 (2, :), −G128_2 (2, :), −G128_1 (2, :), −G128_2 (2, :), −G128_1 (2, :), −G128_2 (2, :), G128_1 (2, :), G128_2 (2, :), −G128_1 (2, :), G128_2 (2, :)]; G1536 (3, :)=[G128_1 (3, :), −G128_2 (3, :), −G128_1 (3, :), −G128_2 (3, :), −G128_1 (3, :), −G128_2 (3, :), G128_1 (3, :), G128_2 (3, :), G128_1 (3, :), −G128_2 (3, :), G128_1 (3, :), G128_2 (3, :)]; G1536 (4, :)=[G128_1 (4, :), −G128_2 (4, :), −G128_1 (4, :), −G128_2 (4, :), −G128_1 (4, :), −G128_2 (4, :), G128_1 (4, :), G128_2 (4, :), G128_1 (4, :), −G128_2 (4, :), G128_1 (4, :), G128_2 (4, :)]; G1536 (5, :)=[G128_1 (3, :), −G128_2 (3, :), −G128_1 (3, :), −G128_2 (3, :), G128_1 (3, :), −G128_2 (3, :), −G128_1 (3, :), G128_2 (3, :), −G128_1 (3, :), G128_2 (3, :), −G128_1 (3, :), G128_2 (3, :)]; G1536 (6, :)=[G128_1 (4, :), −G128_2 (4, :), −G128_1 (4, :), −G128_2 (4, :), G128_1 (4, :), −G128_2 (4, :), −G128_1 (4, :), G128_2 (4, :), −G128_1 (4, :), G128_2 (4, :), −G128_1 (4, :), −G128_2 (4, :)]; G1536 (7, :)=[G128_1 (1, :), −G128_2 (1, :), −G128_1 (1, :), −G128_2 (1, :), G128_1 (1, :), G128_2 (1, :), G128_1 (1, :), G128_2 (1, :), G128_1 (1, :), −G128_2 (1, :), −G128_1 (1, :), −G128_2 (1, :)]; and G1536 (8, :)=[G128_1 (2, :), −G128_2 (2, :), −G128_1 (2, :), −G128_2 (2, :), G128_1 (2, :), G128_2 (2, :), G128_1 (2, :), G128_2 (2, :), G128_1 (2, :), −G128_2 (2, :), −G128_1 (2, :), −G128_2 (2, :)].

With reference to the ninth possible implementation of the first aspect and the second aspect, in a fifteenth possible implementation of the first aspect and the second aspect, when CB=4, the modulated field STF is denoted as G2048 (v, :), and G2048 (v, :) is determined based on two different modulated field STFs when CB=1; where G2048 (1, :)=[G512 (4, :), −G512 (3, :), G512 (4, :), G512 (3, :)]; G2048 (2, :)=[G512 (1, :), −G512 (2, :), G512 (1, :), G512 (2, :)]; G2048 (3, :)=[G512 (4, :), G512 (3, :), G512 (4, :), −G512 (3, :)]; G2048 (4, :)=[G512 (3, :), −G512 (4, :), G512 (3, :), G512 (4, :)]; G2048 (5, :)=[G512 (6, :), −G512 (5, :), G512 (6, :), G512 (5, :)]; G2048 (6, :)=[−G512 (6, :), G512 (5, :), G512 (6, :), G512 (5, :)]; G2048 (7, :)=[G512 (5, :), G512 (6, :), G512 (5, :), −G512 (6, :)]; and G2048 (8, :)=[−G512 (5, :), G512 (6, :), G512 (5, :), G512 (6, :)].

With reference to the eleventh possible implementation of the first aspect and the second aspect, in a sixteenth possible implementation of the first aspect and the second aspect, when CB=2, the modulated field STF is denoted as G704 (v, :), and G704 (v, :) is determined based on two different modulated field STFs when CB=1; where G704 (1, :)=[G352 (1, :), G352 (2, :)]; G704 (2, :)=[G352 (1, :), −G352 (2, :)]; G704 (3, :)=[G352 (3, :), G352 (4, :)]; G704 (4, :)=[G352 (3, :), −G352 (4, :)]; G704 (5, :)=[G352 (5, :), G352 (6, :)]; G704 (6, :)=[G352 (5, :), −G352 (6, :)]; G704 (7, :)=[G352 (7, :), G352 (8, :)]; and G704 (8, :)=[G352 (7, :), −G352 (8, :)].

With reference to the tenth possible implementation of the first aspect and the second aspect, in a seventeenth possible implementation of the first aspect and the second aspect, when CB=3, for each quaternary Golay sequence, a zero element is inserted before and after each non-zero element based on a specified rule to obtain two sequences whose lengths are 88, and the two sequences whose lengths are 88 are respectively denoted as G88_1 and G88_2; and the modulated field STF is denoted as G1056 (v, :), where v is a positive integer and a value range meets 1≤v≤8; where G1056 (1, :)=[G88_1, G88_2, −G88_1, G88_2, −G88_1, −G88_2, G88_1, G88_2, −G88_1, G88_2, G88_1, G88_2]; G1056 (2, :)=[G88_2, G88_1, −G88_2, G88_1, −G88_2, −G88_1, G88_2, G88_1, −G88_2, G88_1, G88_2, G88_1]; G1056 (3, :)=[G88_2, G88_1, G88_2, −G88_1, G88_2, −G88_1, −G88_2, G88_1, G88_2, −G88_1, G88_2, G88_1]; G1056 (4, :)=[G88_1, G88_2, G88_1, −G88_2, G88_1, −G88_2, −G88_1, G88_2, G88_1, −G88_2, G88_1, G88_2]; G1056 (5, :)=[G88_1, G88_2, G88_1, G88_2, −G88_1, G88_2, −G88_1, −G88_2, G88_1, G88_2, −G88_1, G88_2]; G1056 (6, :)=[G88_2, G88_1, G88_2, G88_1, −G88_2, G88_1, −G88_2, −G88_1, G88_2, G88_1, −G88_2, G88_1]; G1056 (7, :)=[G88_2, G88_1, G88_2, G88_1, G88_2, −G88_1, G88_2, −G88_1, −G88_2, G88_1, G88_2, −G88_1]; and G1056 (8, :)=[G88_1, G88_2, G88_1, G88_2, G88_1, −G88_2, G88_1, −G88_2, −G88_1, G88_2, G88_1, −G88_2];

or

G1056 (1, :)=[G88_1, G88_2, −G88_1, G88_2, −G88_1, −G88_2, G88_1, G88_2, −G88_1, G88_2, G88_1, G88_2]; G1056 (2, :)=[G88_2, G88_1, −G88_2, G88_1, −G88_2, −G88_1, G88_2, G88_1, −G88_2, G88_1, G88_2, G88_1]; G1056 (3, :)=[G88_1, G88_2, G88_1, −G88_2, G88_1, G88_2, G88_1, G88_2, −G88_1, −G88_2, G88_1, −G88_2]; G1056 (4, :)=[G88_2, G88_1, G88_2, −G88_1, G88_2, G88_1, G88_2, G88_1, −G88_2, −G88_1, G88_2, −G88_1]; G1056 (5, :)=[G88_1, −G88_2, −G88_1, −G88_2, G88_1, −G88_2, G88_1, −G88_2, −G88_1, G88_2, −G88_1, −G88_2]; G1056 (6, :)=[G88_2, −G88_1, −G88_2, −G88_1, G88_2, −G88_1, G88_2, −G88_1, −G88_2, G88_1, −G88_2, −G88_1]; G1056 (7, :)=[G88_1, −G88_2, G88_1, −G88_2, G88_1, G88_2, G88_1, −G88_2, G88_1, −G88_2, G88_1, G88_2]; and G1056 (8, :)=[G88_2, −G88_1, G88_2, −G88_1, G88_2, G88_1, G88_2, −G88_1, G88_2, −G88_1, G88_2, G88_1].

With reference to the eleventh possible implementation of the first aspect and the second aspect, in an eighteenth possible implementation of the first aspect and the second aspect, when CB=4, the modulated field STF is denoted as G1408 (v, :), and G1408 (v, :) is determined based on two different modulated field STFs when CB=2; where G1408 (1, :)=[G704 (1, :), G704 (2, :)]; G1408 (2, :)=[G704 (1, :), −G704 (2, :)]; G1408 (3, :)=[G704 (3, :), G704 (4, :)]; G1408 (4, :)=[G704 (3, :), −G704 (4, :)]; G1408 (5, :)=[G704 (5, :), G704 (6, :)]; G1408 (6, :)=[G704 (5, :), −G704 (6, :)]; G1408 (7, :)=[G704 (7, :), G704 (8, :)]; and G1408 (8, :)=[G704 (7, :), −G704 (8, :)].

According to a third aspect, a data transmission apparatus is provided, and is used by a transmit end, where the data transmission apparatus includes a generation unit and a sending unit that are configured to perform the data transmission method provided in the first aspect. The generation unit is configured to generate a PPDU, and the sending unit is configured to send the PPDU to at least one receive end.

The PPDU includes at least one modulated field STF, the modulated field STF includes a plurality of zero elements and a plurality of non-zero elements, m1 zero elements are included before a first non-zero element, m2 zero elements are included after a last non-zero element, m1+m2 zero elements are included between any two adjacent non-zero elements, m1 and m2 both are positive integers, and the modulated field STF is mapped to a plurality of consecutive subcarriers for transmission.

In a first possible implementation of the third aspect, the non-zero elements in the modulated field STF form a Golay sequence.

In a second possible implementation of the third aspect, the modulated field STF includes one or more sequences whose lengths are N, each sequence whose length is N is mapped to a subcarrier on one resource block RB for transmission, and N is a positive integer.

With reference to the second possible implementation of the third aspect, in a third possible implementation of the third aspect, when channel bonding is CB=1, the modulated field STF includes four sequences for which N=128, and m1+m2=3.

With reference to the second possible implementation of the third aspect, in a fourth possible implementation of the third aspect, when channel bonding is CB=1, the modulated field STF includes four sequences for which N=88, and m1+m2=3.

With reference to the third possible implementation or the fourth possible implementation of the third aspect, in a fifth possible implementation of the third aspect, m1=1 and m2=2, or m1=2 and m2=1.

With reference to the third possible implementation of the third aspect, in a sixth possible implementation of the third aspect, a length of the modulated field STF in time domain is equal to a length, in time domain, of five OFDM symbols carrying no cyclic prefix.

With reference to the fourth possible implementation of the third aspect, in a seventh possible implementation of the third aspect, a length of the modulated field STF in time domain is equal to a length, in time domain, of 7.5 OFDM symbols carrying no cyclic prefix.

With reference to the third possible implementation of the third aspect, in an eighth possible implementation of the third aspect, the modulated field STF is generated based on two binary Golay sequences whose lengths each are 32, and the two binary Golay sequences are respectively: R1=[1, 1, −1, 1, 1, 1, 1, −1, 1, 1, −1, 1, −1, −1, −1, 1, 1, 1, −1, 1, 1, 1, 1, −1, −1, −1, 1, −1, 1, 1, 1, −1], and R2=[1, 1, −1, 1, 1, 1, 1, −1, 1, 1, −1, 1, −1, −1, −1, 1, −1, −1, 1, −1, −1, −1, −1, 1, 1, 1, −1, 1, −1, −1, −1, 1].

With reference to the eighth possible implementation of the third aspect, in a ninth possible implementation of the third aspect, the modulated field STF is obtained by inserting a zero element before and after each non-zero element in G128 (v, :) based on a specified rule, where v is a positive integer and a value range meets 1≤v≤8; where G128 (1, :)=[R1, R2, R1, −R2]; G128 (2, :)=[R1, R2, −R1, R2]; G128 (3, :)=[R2, R1, R2, −R1]; G128 (4, :)=[R2, R1, −R2, R1]; G128 (5, :)=[R1, −R2, R1, R2]; G128 (6, :)=[−R1, R2, R1, R2]; G128 (7, :)=[R2, −R1, R2, R1]; and G128 (8, :)=[−R2, R1, R2, R1].

In this application, when CB=1, the modulated field STF is denoted as G512 (v, :). That the modulated field STF is obtained by inserting a zero element before and after each non-zero element in G128 (v, :) based on a specified rule includes: inserting one zero element before each non-zero element in G128 (v, :) and inserting two zero elements after each non-zero element in G128 (v, :), to obtain G512 (v, :), or inserting two zero elements before each non-zero element in G128 (v, :) and inserting one zero element after each non-zero element in G128 (v, :), to obtain G512 (v, :).

With reference to the fourth possible implementation of the third aspect, in a tenth possible implementation of the third aspect, the modulated field STF is generated based on two quaternary Golay sequences whose lengths each are 22, and the two quaternary Golay sequences are respectively:

S1=[−1i, 1, 1, −1, 1, 1, 1i, −1i, −1, −1, 1, −1, 1i, 1i, −1i, 1i, 1i, 1i, 1, −1, −1i, −1], and S2=[−1i, −1, 1, 1, 1, −1, 1i, 1i, −1, 1, 1, 1, 1i, −1i, −1i, −1i, 1i, −1i, 1, 1, −1i, 1].

With reference to the tenth possible implementation of the third aspect, in an eleventh possible implementation of the third aspect, the modulated field STF is obtained by inserting a zero element before and after each non-zero element in G88 (v, :) based on a specified rule, where v is a positive integer and a value range meets 1≤v≤8; where G88 (1, :)=[S1, S2, S1, −S2]; G88 (2, :)=[S1, S2, −S1, S2]; G88 (3, :)=[S2, S1, S2, −S1]; G88 (4, :)=[S2, S1, −S2, S1]; G88 (5, :)=[S1, −S2, S1, S2]; G88 (6, :)=[−S1, S2, S1, S2]; G88 (7, :)=[S2, −S1, S2, S1]; and G88 (8, :)=[−S2, S1, S2, S1].

In this application, when CB=1, the modulated field STF is denoted as G352 (v, :). That the modulated field STF is obtained by inserting a zero element before and after each non-zero element in G88 (v, :) based on a specified rule includes: inserting one zero element before each non-zero element in G88 (v, :) and inserting two zero elements after each non-zero element in G88 (v, :), to obtain G352 (v, :), or inserting two zero elements before each non-zero element in G128 (v, :) and inserting one zero element after each non-zero element in G128 (v, :), to obtain G352 (v, :).

With reference to the ninth possible implementation of the third aspect, in a twelfth possible implementation of the third aspect, when CB=2, the modulated field STF is denoted as G1024 (v, :), and G1024 (v, :) is determined based on two different modulated field STFs when CB=1; where G1024 (1, :)=[G512 (1, :), G512 (2, :)]; G1024 (2, :)=[G512 (1, :), −G512 (2, :)]; G1024 (3, :)=[G512 (3, :), G512 (4, :)]; G1024 (4, :)=[G512 (3, :), −G512 (4, :)]; G1024 (5, :)=[G512 (5, :), G512 (6, :)]; G1024 (6, :)=[G512 (5, :), −G512 (6, :)]; G1024 (7, :)=[G512 (7, :), G512 (8, :)]; and G1024 (8, :)=[G512 (7, :), −G512 (8, :)].

With reference to the third possible implementation of the third aspect, in a thirteenth possible implementation of the third aspect, when CB=3, the modulated field STF is generated based on eight binary Golay sequences whose lengths each are 32, and the eight binary Golay sequences are respectively: R1=[1, 1, −1, 1, 1, 1, 1, −1, 1, 1, 1, −1, 1, −1, −1, −1, 1, −1, −1, 1, −1, −1, −1, −1, 1, 1, 1, −1, 1, −1, −1, 1], R2=[1, −1, −1, −1, 1, −1, 1, 1, 1, −1, −1, −1, −1, 1, −1, −1, 1, 1, 1, −1, 1, −1, 1, −1, −1, −1, −1, 1, 1, −1, −1, 1], R3=[1, 1, −1, 1, 1, 1, 1, −1, 1, 1, 1, −1, 1, −1, −1, −1, −1, 1, 1, 1, 1, −1, −1, −1, 1, −1, 1, 1, 1, 1, −1], R4=[1, −1, −1, −1, 1, −1, 1, 1, 1, −1, −1, −1, −1, 1, −1, −1, −1, −1, 1, −1, 1, 1, 1, 1, −1, 1, 1], R5=[1, 1, −1, 1, 1, 1, 1, −1, 1, 1, −1, 1, −1, −1, −1, 1, 1, 1, −1, 1, 1, 1, 1, −1, −1, −1, 1, −1, 1, 1, 1, −1], R6=[1, −1, −1, −1, 1, −1, 1, 1, 1, −1, −1, −1, 1, −1, −1, −1, −1, 1, −1, 1, 1, 1, 1, −1, 1, 1], R7=[1, 1, −1, 1, 1, 1, 1, −1, 1, 1, 1, −1, 1, −1, −1, −1, 1, −1, −1, 1, −1, −1, −1, −1, 1, 1, 1, −1, 1, −1, −1, 1], and R8=[1, −1, −1, −1, 1, −1, 1, 1, 1, −1, −1, −1, −1, 1, −1, −1, −1, 1, 1, 1, −1, 1, −1, −1, 1, −1, −1, −1, −1, 1, −1, −1].

With reference to the thirteenth possible implementation of the third aspect, in a fourteenth possible implementation of the third aspect, for each binary Golay sequence, a zero element is inserted before and after each non-zero element based on a specified rule to obtain eight sequences whose lengths are 128, and the eight sequences whose lengths are 128 are respectively denoted as G128_1 (1, :), G128_1 (2, :), G128_2 (1, :), G128_2 (2, :), G128_3 (1, :), G128_3 (2, :), and G128_4 (1, :), and G128_4 (2, :); and the modulated field STF is denoted as G1536 (v, :), where v is a positive integer and a value range meets 1≤v≤8; where G1536 (1, :)=[G128_1 (1, :), −G128_2 (1, :), −G128_1 (1, :), −G128_2 (1, :), −G128_1 (1, :), G128_2 (1, :), −G128_1 (1, :), −G128_2 (1, :), G128_1 (1, :), −G128_2 (1, :), G128_1 (1, :), G128_2 (1, :)]; G1536 (2, :)=[G128_1 (2, :), −G128_2 (2, :), −G128_1 (2, :), −G128_2 (2, :), −G128_1 (2, :), −G128_2 (2, :), −G128_1 (2, :), −G128_2 (2, :), G128_1 (2, :), G128_2 (2, :), −G128_1 (2, :), G128_2 (2, :)]; G1536 (3, :)=[G128_1 (3, :), −G128_2 (3, :), −G128_1 (3, :), −G128_2 (3, :), −G128_1 (3, :), −G128_2 (3, :), G128_1 (3, :), G128_2 (3, :), G128_1 (3, :), −G128_2 (3, :), G128_1 (3, :), G128_2 (3, :)]; G1536 (4, :)=[G128_1 (4, :), −G128_2 (4, :), −G128_1 (4, :), −G128_2 (4, :), −G128_1 (4, :), −G128_2 (4, :), G128_1 (4, :), G128_2 (4, :), G128_1 (4, :), −G128_2 (4, :), G128_1 (4, :), G128_2 (4, :)]; G1536 (5, :)=[G128_1 (3, :), −G128_2 (3, :), −G128_1 (3, :), −G128_2 (3, :), G128_1 (3, :), −G128_2 (3, :), −G128_1 (3, :), G128_2 (3, :), −G128_1 (3, :), G128_2 (3, :), −G128_1 (3, :), −G128_2 (3, :)]; G1536 (6, :)=[G128_1 (4, :), −G128_2 (4, :), −G128_1 (4, :), −G128_2 (4, :), G128_1 (4, :), −G128_2 (4, :), −G128_1 (4, :), G128_2 (4, :), −G128_1 (4, :), G128_2 (4, :), −G128_1 (4, :), −G128_2 (4, :)]; G1536 (7, :)=[G128_1 (1, :), −G128_2 (1, :), −G128_1 (1, :), −G128_2 (1, :), G128_1 (1, :), G128_2 (1, :), G128_1 (1, :), G128_2 (1, :), G128_1 (1, :), −G128_2 (1, :), G128_1 (1, :), −G128_2 (1, :)]; and G1536 (8, :)=[G128_1 (2, :), −G128_2 (2, :), −G128_1 (2, :), −G128_2 (2, :), G128_1 (2, :), G128_2 (2, :), G128_1 (2, :), G128_2 (2, :), G128_1 (2, :), −G128_2 (2, :)].

With reference to the ninth possible implementation of the third aspect, in a fifteenth possible implementation of the third aspect, when CB=4, the modulated field STF is denoted as G2048 (v, :), and G2048 (v, :) is determined based on two different modulated field STFs when CB=1; where G2048 (1, :)=[G512 (4, :), −G512 (3, :), G512 (4, :), G512 (3, :)]; G2048 (2, :)=[G512 (1, :), −G512 (2, :), G512 (1, :), G512 (2, :)]; G2048 (3, :)=[G512 (4, :), G512 (3, :), G512 (4, :), −G512 (3, :)]; G2048 (4, :)=[G512 (3, :), −G512 (4, :), G512 (3, :), G512 (4, :)]; G2048 (5, :)=[G512 (6, :), −G512 (5, :), G512 (6, :), G512 (5, :)]; G2048 (6, :)=[−G512 (6, :), G512 (5, :), G512 (6, :), G512 (5, :)]; G2048 (7, :)=[G512 (5, :), G512 (6, :), G512 (5, :), −G512 (6, :)]; and G2048 (8, :)=[−G512 (5, :), G512 (6, :), G512 (5, :), G512 (6, :)].

With reference to the eleventh possible implementation of the third aspect, in a sixteenth possible implementation of the third aspect, when CB=2, the modulated field STF is denoted as G704 (v, :), and G704 (v, :) is determined based on two different modulated field STFs when CB=1; where G704 (1, :)=[G352 (1, :), G352 (2, :)]; G704 (2, :)=[G352 (1, :), −G352 (2, :)]; G704 (3, :)=[G352 (3, :), G352 (4, :)]; G704 (4, :)=[G352 (3, :), −G352 (4, :)]; G704 (5, :)=[G352 (5, :), G352 (6, :)]; G704 (6, :)=[G352 (5, :), −G352 (6, :)]; G704 (7, :)=[G352 (7, :), G352 (8, :)]; and G704 (8, :)=[G352 (7, :), −G352 (8, :)].

With reference to the tenth possible implementation of the third aspect, in a seventeenth possible implementation of the third aspect, when CB=3, for each quaternary Golay sequence, a zero element is inserted before and after each non-zero element based on a specified rule to obtain two sequences whose lengths are 88, and the two sequences whose lengths are 88 are respectively denoted as G88_1 and G88_2; and the modulated field STF is denoted as G1056 (v, :), where v is a positive integer and a value range meets 1≤v≤8; where G1056 (1, :)=[G88_1, G88_2, −G88_1, G88_2, −G88_1, −G88_2, G88_1, G88_2, −G88_1, G88_2, G88_1, G88_2];

G1056 (2, :)=[G88_2, G88_1, −G88_2, G88_1, −G88_2, −G88_1, G88_2, G88_1, −G88_2, G88_1, G88_2, G88_1]; G1056 (3, :)=[G88_2, G88_1, G88_2, −G88_1, G88_2, −G88_1, −G88_2, G88_1, G88_2, −G88_1, G88_2, G88_1]; G1056 (4, :)=[G88_1, G88_2, G88_1, −G88_2, G88_1, −G88_2, −G88_1, G88_2, G88_1, −G88_2, G88_1, G88_2]; G1056 (5, :)=[G88_1, G88_2, G88_1, G88_2, −G88_1, G88_2, −G88_1, −G88_2, G88_1, G88_2, −G88_1, G88_2]; G1056 (6, :)=[G88_2, G88_1, G88_2, G88_1, −G88_2, G88_1, −G88_2, −G88_1, G88_2, G88_1, −G88_2, G88_1]; G1056 (7, :)=[G88_2, G88_1, G88_2, G88_1, G88_2, −G88_1, G88_2, −G88_1, −G88_2, G88_1, G88_2, −G88_1]; and G1056 (8, :)=[G88_1, G88_2, G88_1, G88_2, G88_1, −G88_2, G88_1, −G88_2, −G88_1, G88_2, G88_1, −G88_2];

or

G1056 (1, :)=[G88_1, G88_2, −G88_1, G88_2, −G88_1, −G88_2, G88_1, G88_2, −G88_1, G88_2, G88_1, G88_2]; G1056 (2, :)=[G88_2, G88_1, −G88_2, G88_1, −G88_2, −G88_1, G88_2, G88_1, −G88_2, G88_1, G88_2, G88_1]; G1056 (3, :)=[G88_1, G88_2, G88_1, −G88_2, G88_1, G88_2, G88_1, G88_2, −G88_1, −G88_2, G88_1, −G88_2]; G1056 (4, :)=[G88_2, G88_1, G88_2, −G88_1, G88_2, G88_1, G88_2, G88_1, −G88_2, −G88_1, G88_2, −G88_1]; G1056 (5, :)=[G88_1, −G88_2, −G88_1, −G88_2, G88_1, −G88_2, G88_1, −G88_2, −G88_1, G88_2, −G88_1, −G88_2]; G1056 (6, :)=[G88_2, −G88_1, −G88_2, −G88_1, G88_2, −G88_1, G88_2, −G88_1, G88_2, G88_1, −G88_2, −G88_1]; G1056 (7, :)=[G88_1, −G88_2, G88_1, −G88_2, G88_1, G88_2, −G88_1, −G88_2, G88_1, G88_2, G88_1, G88_2]; and G1056 (8, :)=[G88_2, −G88_1, G88_2, −G88_1, G88_2, G88_1, −G88_2, −G88_1, G88_2, G88_1, G88_2, G88_1].

With reference to the eleventh possible implementation of the third aspect, in an eighteenth possible implementation of the third aspect, when CB=4, the modulated field STF is denoted as G1408 (v, :), and G1408 (v, :) is determined based on two different modulated field STFs when CB=2; where G1408 (1, :)=[G704 (1, :), G704 (2, :)]; G1408 (2, :)=[G704 (1, :), −G704 (2, :)]; G1408 (3, :)=[G704 (3, :), G704 (4, :)]; G1408 (4, :)=[G704 (3, :), −G704 (4, :)]; G1408 (5, :)=[G704 (5, :), G704 (6, :)]; G1408 (6, :)=[G704 (5, :), −G704 (6, :)]; G1408 (7, :)=[G704 (7, :), G704 (8, :)]; and G1408 (8, :)=[G704 (7, :), −G704 (8, :)].

According to a fourth aspect, a data transmission apparatus is provided, and is used by a receive end, where the data transmission apparatus includes a receiving unit and a parsing unit that are configured to perform the data transmission method provided in the second aspect. The receiving unit is configured to receive a PPDU sent by a transmit end, and the parsing unit is configured to parse the PPDU.

The PPDU includes at least one modulated field STF, the modulated field STF includes a plurality of zero elements and a plurality of non-zero elements, m1 zero elements are included before a first non-zero element, m2 zero elements are included after a last non-zero element, m1+m2 zero elements are included between any two adjacent non-zero elements, m1 and m2 both are positive integers, and the modulated field STF is mapped to a plurality of consecutive subcarriers for transmission.

In a first possible implementation of the fourth aspect, all the non-zero elements in the modulated field STF form a Golay sequence.

In a second possible implementation of the fourth aspect, the modulated field STF includes one or more sequences whose lengths are N, each sequence whose length is N is mapped to a subcarrier on one resource block RB for transmission, and N is a positive integer.

With reference to the second possible implementation of the fourth aspect, in a third possible implementation of the fourth aspect, when channel bonding is CB=1, the modulated field STF includes four sequences for which N=128, and m1+m2=3.

With reference to the second possible implementation of the fourth aspect, in a fourth possible implementation of the fourth aspect, when channel bonding is CB=1, the modulated field STF includes four sequences for which N=88, and m1+m2=3.

With reference to the third possible implementation or the fourth possible implementation of the fourth aspect, in a fifth possible implementation of the fourth aspect, m1=1 and m2=2, or m1=2 and m2=1.

With reference to the third possible implementation of the fourth aspect, in a sixth possible implementation of the fourth aspect, a length of the modulated field STF in time domain is equal to a length, in time domain, of five OFDM symbols carrying no cyclic prefix.

With reference to the fourth possible implementation of the fourth aspect, in a seventh possible implementation of the fourth aspect, a length of the modulated field STF in time domain is equal to a length, in time domain, of 7.5 OFDM symbols carrying no cyclic prefix.

With reference to the third possible implementation of the fourth aspect, in an eighth possible implementation of the fourth aspect, the modulated field STF is generated based on two binary Golay sequences whose lengths each are 32, and the two binary Golay sequences are respectively: R1=[1, 1, −1, 1, 1, 1, 1, −1, 1, 1, −1, 1, −1, −1, −1, 1, 1, 1, −1, 1, 1, 1, 1, −1, −1, −1, 1, −1, 1, 1, 1, −1], and R2=[1, 1, −1, 1, 1, 1, 1, −1, 1, 1, −1, 1, −1, −1, −1, 1, −1, −1, 1, −1, −1, −1, −1, 1, 1, 1, −1, 1, −1, −1, −1, 1].

With reference to the eighth possible implementation of the fourth aspect, in a ninth possible implementation of the fourth aspect, the modulated field STF is obtained by inserting a zero element before and after each non-zero element in G128 (v, :) based on a specified rule, where v is a positive integer and a value range meets 1≤v≤8; where G128 (1, :)=[R1, R2, R1, −R2]; G128 (2, :)=[R1, R2, −R1, R2]; G128 (3, :)=[R2, R1, R2, −R1]; G128 (4, :)=[R2, R1, −R2, R1]; G128 (5, :)=[R1, −R2, R1, R2]; G128 (6, :)=[−R1, R2, R1, R2]; G128 (7, :)=[R2, −R1, R2, R1]; and G128 (8, :)=[−R2, R1, R2, R1].

In this application, when CB=1, the modulated field STF is denoted as G512 (v, :). That the modulated field STF is obtained by inserting a zero element before and after each non-zero element in G128 (v, :) based on a specified rule includes: inserting one zero element before each non-zero element in G128 (v, :) and inserting two zero elements after each non-zero element in G128 (v, :), to obtain G512 (v, :), or inserting two zero elements before each non-zero element in G128 (v, :) and inserting one zero element after each non-zero element in G128 (v, :), to obtain G512 (v, :).

With reference to the fourth possible implementation of the fourth aspect, in a tenth possible implementation of the fourth aspect, the modulated field STF is generated based on two quaternary Golay sequences whose lengths each are 22, and the two quaternary Golay sequences are respectively: S1=[−1i, 1, 1, −1, 1, 1, 1i, −1i, −1, −1, 1, −1, 1i, 1i, −1i, 1i, 1i, 1i, 1, −1, −1i, −1], and S2=[−1i, −1, 1, 1, 1, −1, 1i, 1i, −1, 1, 1, 1i, −1i, −1i, −1i, 1i, −1i, 1, 1, −1i, 1].

With reference to the tenth possible implementation of the fourth aspect, in an eleventh possible implementation of the fourth aspect, the modulated field STF is obtained by inserting a zero element before and after each non-zero element in G88 (v, :) based on a specified rule, where v is a positive integer and a value range meets 1≤v≤8; where G88 (1, :)=[S1, S2, S1, −S2]; G88 (2, :)=[S1, S2, −S1, S2]; G88 (3, :)=[S2, S1, S2, −S1]; G88 (4, :)=[S2, S1, −S2, S1]; G88 (5, :)=[S1, −S2, S1, S2]; G88 (6, :)=[−S1, S2, S1, S2]; G88 (7, :)=[S2, −S1, S2, S1]; and G88 (8, :)=[−S2, S1, S2, S1].

In this application, when CB=1, the modulated field STF is denoted as G352 (v, :). That the modulated field STF is obtained by inserting a zero element before and after each non-zero element in G88 (v, :) based on a specified rule includes: inserting one zero element before each non-zero element in G88 (v, :) and inserting two zero elements after each non-zero element in G88 (v, :), to obtain G352 (v, :), or inserting two zero elements before each non-zero element in G128 (v, :) and inserting one zero element after each non-zero element in G128 (v, :), to obtain G352 (v, :).

With reference to the ninth possible implementation of the fourth aspect, in a twelfth possible implementation of the fourth aspect, when CB=2, the modulated field STF is denoted as G1024 (v, :), and G1024 (v, :) is determined based on two different modulated field STFs when CB=1; where G1024 (1, :)=[G512 (1, :), G512 (2, :)]; G1024 (2, :)=[G512 (1, :), −G512 (2, :)]; G1024 (3, :)=[G512 (3, :), G512 (4, :)]; G1024 (4, :)=[G512 (3, :), −G512 (4, :)]; G1024 (5, :)=[G512 (5, :), G512 (6, :)]; G1024 (6, :)=[G512 (5, :), −G512 (6, :)]; G1024 (7, :)=[G512 (7, :), G512 (8, :)]; and G1024 (8, :)=[G512 (7, :), −G512 (8, :)].

With reference to the third possible implementation of the fourth aspect, in a thirteenth possible implementation of the fourth aspect, when CB=3, the modulated field STF is generated based on eight binary Golay sequences whose lengths each are 32, and the eight binary Golay sequences are respectively: R1=[1, 1, −1, 1, 1, 1, 1, −1, 1, 1, −1, 1, −1, −1, −1, 1, −1, −1, 1, −1, −1, −1, −1, 1, 1, 1, −1, 1, −1, −1, −1, 1], R2=[1, −1, −1, −1, 1, −1, 1, 1, −1, −1, −1, −1, 1, −1, −1, −1, 1, 1, 1, −1, 1, −1, −1, 1, −1, −1, −1, −1, 1, −1], R3=[1, 1, −1, 1, 1, 1, 1, −1, 1, 1, −1, 1, −1, −1, −1, 1, 1, 1, −1, 1, 1, 1, 1, −1, −1, −1, 1, −1, 1, 1, 1, −1], R4=[1, −1, −1, −1, 1, −1, 1, 1, 1, −1, −1, −1, −1, 1, −1, 1, 1, −1, −1, −1, 1, −1, 1, 1, 1, −1, 1, 1], R5=[1, 1, −1, 1, 1, 1, 1, −1, 1, 1, −1, 1, −1, −1, −1, 1, 1, 1, −1, 1, 1, 1, 1, −1, −1, −1, 1, −1, 1, 1, 1, −1], R6=[1, −1, −1, −1, 1, −1, 1, 1, −1, −1, −1, −1, 1, −1, −1, −1, 1, 1, 1, −1, 1, −1, −1, 1, −1, −1, −1, −1, 1, 1, 1, 1], R7=[1, 1, −1, 1, 1, 1, 1, −1, 1, 1, −1, 1, −1, −1, 1, −1, −1, −1, −1, 1, 1, 1, −1, 1, −1, −1, −1, 1], and R8=[1, −1, −1, −1, 1, −1, 1, 1, 1, −1, −1, −1, 1, −1, −1, −1, 1, 1, 1, −1, 1, −1, −1, −1, 1, −1, −1, 1, −1, 1, 1, −1].

With reference to the thirteenth possible implementation of the fourth aspect, in a fourteenth possible implementation of the fourth aspect, for each binary Golay sequence, a zero element is inserted before and after each non-zero element based on a specified rule to obtain eight sequences whose lengths are 128, and the eight sequences whose lengths are 128 are respectively denoted as G128_1 (1, :), G128_1 (2, :), G128_2 (1, :), G128_2 (2, :), G128_3 (1, :), G128_3 (2, :), G128_4 (1, :), and G128_4 (2, :); and the modulated field STF is denoted as G1536 (v, :), where v is a positive integer and a value range meets 1≤v≤8; where G1536 (1, :)=[G128_1 (1, :), −G128_2 (1, :), −G128_1 (1, :), −G128_2 (1, :), G128_1 (1, :), G128_2 (1, :), −G128_1 (1, :), −G128_2 (1, :), G128_1 (1, :), −G128_2 (1, :), G128_1 (1, :), −G128_2 (1, :), −G128_1 (1, :), G128_2 (1, :)]; G1536 (2, :)=[G128_1 (2, :), −G128_2 (2, :), −G128_1 (2, :), −G128_2 (2, :), G128_1 (2, :), G128_2 (2, :), −G128_1 (2, :), −G128_2 (2, :), G128_1 (2, :), −G128_2 (2, :), G128_1 (2, :), −G128_2 (2, :), −G128_1 (2, :), G128_2 (2, :)]; G1536 (3, :)=[G128_1 (3, :), −G128_2 (3, :), −G128_1 (3, :), −G128_2 (3, :), G128_1 (3, :), −G128_2 (3, :), G128_1 (3, :), −G128_2 (3, :), −G128_1 (3, :), G128_2 (3, :)]; G1536 (4, :)=[G128_1 (4, :), −G128_2 (4, :), −G128_1 (4, :), −G128_2 (4, :), G128_1 (4, :), −G128_2 (4, :), G128_1 (4, :), G128_2 (4, :), G128_1 (4, :), −G128_2 (4, :), G128_1 (4, :), G128_2 (4, :)]; G1536 (5, :)=[G128_1 (3, :), −G128_2 (3, :), −G128_1 (3, :), −G128_2 (3, :), G128_1 (3, :), −G128_2 (3, :), −G128_1 (3, :), G128_2 (3, :), −G128_1 (3, :), G128_2 (3, :), G128_1 (3, :), −G128_2 (3, :)]; G1536 (6, :)=[G128_1 (4, :), −G128_2 (4, :), −G128_1 (4, :), G128_2 (4, :), G128_1 (4, :), −G128_2 (4, :), −G128_1 (4, :), G128_2 (4, :), −G128_1 (4, :), G128_2 (4, :), G128_1 (4, :), −G128_1 (4, :), −G128_2 (4, :)]; G1536 (7, :)=[G128_1 (1, :), −G128_2 (1, :), −G128_1 (1, :), −G128_2 (1, :), G128_1 (1, :), G128_2 (1, :), G128_1 (1, :), G128_2 (1, :), G128_1 (1, :), −G128_2 (1, :), −G128_1 (1, :), −G128_2 (1, :)]; and G1536 (8, :)=[G128_1 (2, :), −G128_2 (2, :), −G128_1 (2, :), −G128_2 (2, :), G128_1 (2, :), G128_2 (2, :), G128_1 (2, :), G128_2 (2, :), G128_1 (2, :), −G128_2 (2, :), −G128_1 (2, :), −G128_2 (2, :)].

With reference to the ninth possible implementation of the fourth aspect, in a fifteenth possible implementation of the fourth aspect, when CB=4, the modulated field STF is denoted as G2048 (v, :), and G2048 (v, :) is determined based on two different modulated field STFs when CB=1; where G2048 (1, :)=[G512 (4, :), −G512 (3, :), G512 (4, :), G512 (3, :)]; G2048 (2, :)=[G512 (1, :), −G512 (2, :), G512 (1, :), G512 (2, :)]; G2048 (3, :)=[G512 (4, :), G512 (3, :), G512 (4, :), −G512 (3, :)]; G2048 (4, :)=[G512 (3, :), −G512 (4, :), G512 (3, :), G512 (4, :)]; G2048 (5, :)=[G512 (6, :), −G512 (5, :), G512 (6, :), G512 (5, :)]; G2048 (6, :)=[−G512 (6, :), G512 (5, :), G512 (6, :), G512 (5, :)]; G2048 (7, :)=[G512 (5, :), G512 (6, :), G512 (5, :), −G512 (6, :)]; and G2048 (8, :)=[−G512 (5, :), G512 (6, :), G512 (5, :), G512 (6, :)].

With reference to the eleventh possible implementation of the fourth aspect, in a sixteenth possible implementation of the fourth aspect, when CB=2, the modulated field STF is denoted as G704 (v, :), and G704 (v, :) is determined based on two different modulated field STFs when CB=1; where G704 (1, :)=[G352 (1, :), G352 (2, :)]; G704 (2, :)=[G352 (1, :), −G352 (2, :)]; G704 (3, :)=[G352 (3, :), G352 (4, :)]; G704 (4, :)=[G352 (3, :), −G352 (4, :)]; G704 (5, :)=[G352 (5, :), G352 (6, :)]; G704 (6, :)=[G352 (5, :), −G352 (6, :)]; G704 (7, :)=[G352 (7, :), G352 (8, :)]; and G704 (8, :)=[G352 (7, :), −G352 (8, :)].

With reference to the tenth possible implementation of the fourth aspect, in a seventeenth possible implementation of the fourth aspect, when CB=3, for each quaternary Golay sequence, a zero element is inserted before and after each non-zero element based on a specified rule to obtain two sequences whose lengths are 88, and the two sequences whose lengths are 88 are respectively denoted as G88_1 and G88_2; and the modulated field STF is denoted as G1056 (v, :), where v is a positive integer and a value range meets 1≤v≤8; where G1056 (1, :)=[G88_1, G88_2, −G88_1, G88_2, −G88_1, −G88_2, G88_1, G88_2, −G88_1, G88_2, G88_1, G88_2]; G1056 (2, :)=[G88_2, G88_1, −G88_2, G88_1, −G88_2, −G88_1, G88_2, G88_1, −G88_2, G88_1, G88_2, G88_1]; G1056 (3, :)=[G88_2, G88_1, −G88_2, G88_1, −G88_2, −G88_1, −G88_1, G88_2, G88_1, G88_2, −G88_1, G88_2, G88_1]; G1056 (4, :)=[G88_1, G88_2, G88_1, −G88_2, G88_1, −G88_2, −G88_1, G88_2, G88_1, −G88_2, G88_1, G88_2]; G1056 (5, :)=[G88_1, G88_2, G88_1, G88_2, −G88_1, G88_2, −G88_1, −G88_2, G88_1, G88_2, −G88_1, −G88_2]; G1056 (6, :)=[G88_2, G88_1, G88_2, G88_1, −G88_2, G88_1, G88_2, −G88_1, G88_2, G88_1, −G88_2, G88_1]; G1056 (7, :)=[G88_2, G88_1, G88_2, G88_1, G88_2, −G88_1, G88_2, −G88_1, −G88_2, G88_1, G88_2, −G88_1]; and G1056 (8, :)=[G88_1, G88_2, G88_1, G88_2, G88_1, −G88_1, −G88_2, −G88_1, G88_2, G88_1, −G88_2];

or

G1056 (1, :)=[G88_1, G88_2, −G88_1, G88_2, −G88_1, −G88_2, G88_1, G88_2, −G88_1, G88_2, G88_1, G88_2]; G1056 (2, :)=[G88_2, G88_1, −G88_2, G88_1, −G88_2, −G88_1, G88_2, G88_1, −G88_2, G88_1, G88_2, G88_1]; G1056 (3, :)=[G88_1, G88_2, G88_1, −G88_2, G88_1, G88_2, G88_1, G88_2, −G88_1, −G88_2, G88_1, −G88_2]; G1056 (4, :)=[G88_2, G88_1, G88_2, −G88_1, G88_2, G88_1, G88_2, G88_1, −G88_2, −G88_1, G88_2, −G88_1]; G1056 (5, :)=[G88_1, −G88_2, −G88_1, −G88_2, G88_1, −G88_2, G88_1, −G88_2, −G88_1, G88_2, −G88_1, −G88_2]; G1056 (6, :)=[G88_2, −G88_1, −G88_2, −G88_1, G88_2, −G88_1, G88_2, −G88_1, −G88_2, G88_1, −G88_2, −G88_1]; G1056 (7, :)=[G88_1, −G88_2, G88_1, −G88_2, −G88_1, −G88_2, G88_1, G88_2, G88_1, G88_2]; and G1056 (8, :)=[G88_2, −G88_1, G88_2, −G88_1, G88_2, G88_1, −G88_2, −G88_1, G88_2, G88_1, G88_2, G88_1].

With reference to the eleventh possible implementation of the fourth aspect, in an eighteenth possible implementation of the fourth aspect, when CB=4, the modulated field STF is denoted as G1408 (v, :), and G1408 (v, :) is determined based on two different modulated field STFs when CB=2; where G1408 (1, :)=[G704 (1, :), G704 (2, :)]; G1408 (2, :)=[G704 (1, :), −G704 (2, :)]; G1408 (3, :)=[G704 (3, :), G704 (4, :)]; G1408 (4, :)=[G704 (3, :), −G704 (4, :)]; G1408 (5, :)=[G704 (5, :), G704 (6, :)]; G1408 (6, :)=[G704 (5, :), −G704 (6, :)]; G1408 (7, :)=[G704 (7, :), G704 (8, :)]; and G1408 (8, :)=[G704 (7, :), −G704 (8, :)].

According to a fifth aspect, a data transmission apparatus is provided, including a processor and a transceiver, and optionally, the apparatus further includes a memory. The processor, the transceiver, and the memory communicate with each other by using an internal connection. The processor is configured to perform a processing step in the data transmission method provided in the first aspect. The transceiver is configured to perform, under control of the processor, a transmitting/receiving step in the data transmission method provided in the first aspect. The memory is configured to store instructions, and the instructions are invoked by the processor to perform the processing step in the data transmission method provided in the first aspect. Alternatively, the processor is configured to perform a processing step in the data transmission method provided in the second aspect. The transceiver is configured to perform, under control of the processor, a transmitting/receiving step in the data transmission method provided in the second aspect. The memory is configured to store instructions, and the instructions are invoked by the processor to perform the processing step in the data transmission method provided in the second aspect.

In a first possible implementation of the fifth aspect, the non-zero elements in the modulated field STF form a Golay sequence.

In a second possible implementation of the fifth aspect, the modulated field STF includes one or more sequences whose lengths are N, each sequence whose length is N is mapped to a subcarrier on one resource block RB for transmission, and N is a positive integer.

With reference to the second possible implementation of the fifth aspect, in a third possible implementation of the fifth aspect, when channel bonding is CB=1, the modulated field STF includes four sequences for which N=128, and m1+m2=3.

With reference to the second possible implementation of the fifth aspect, in a fourth possible implementation of the fifth aspect, when channel bonding is CB=1, the modulated field STF includes four sequences for which N=88, and m1+m2=3.

With reference to the third possible implementation or the fourth possible implementation of the fifth aspect, in a fifth possible implementation of the fifth aspect, m1=1 and m2=2, or m1=2 and m2=1.

With reference to the third possible implementation of the fifth aspect, in a sixth possible implementation of the fifth aspect, a length of the modulated field STF in time domain is equal to a length, in time domain, of five OFDM symbols carrying no cyclic prefix.

With reference to the fourth possible implementation of the fifth aspect, in a seventh possible implementation of the fifth aspect, a length of the modulated field STF in time domain is equal to a length, in time domain, of 7.5 OFDM symbols carrying no cyclic prefix.

With reference to the third possible implementation of the fifth aspect, in an eighth possible implementation of the fifth aspect, the modulated field STF is generated based on two binary Golay sequences whose lengths each are 32, and the two binary Golay sequences are respectively: R1=[1, 1, −1, 1, 1, 1, 1, −1, 1, 1, −1, 1, −1, −1, −1, 1, 1, 1, −1, 1, 1, 1, 1, −1, −1, −1, 1, −1, 1, 1, 1, −1], and R2=[1, 1, −1, 1, 1, 1, 1, −1, 1, 1, −1, 1, −1, −1, −1, 1, −1, −1, 1, −1, −1, −1, −1, 1, 1, −1, 1, −1, −1, −1, −1, 1].

With reference to the eighth possible implementation of the fifth aspect, in a ninth possible implementation of the fifth aspect, the modulated field STF is obtained by inserting a zero element before and after each non-zero element in G128 (v, :) based on a specified rule, where v is a positive integer and a value range meets 1≤v≤8; where G128 (1, :)=[R1, R2, R1, −R2]; G128 (2, :)=[R1, R2, −R1, R2]; G128 (3, :)=[R2, R1, R2, −R1]; G128 (4, :)=[R2, R1, −R2, R1]; G128 (5, :)=[R1, −R2, R1, R2]; G128 (6, :)=[−R1, R2, R1, R2]; G128 (7, :)=[R2, −R1, R2, R1]; and G128 (8, :)=[−R2, R1, R2, R1].

In this application, when CB=1, the modulated field STF is denoted as G512 (v, :). That the modulated field STF is obtained by inserting a zero element before and after each non-zero element in G128 (v, :) based on a specified rule includes: inserting one zero element before each non-zero element in G128 (v, :) and inserting two zero elements after each non-zero element in G128 (v, :), to obtain G512 (v, :), or inserting two zero elements before each non-zero element in G128 (v, :) and inserting one zero element after each non-zero element in G128 (v, :), to obtain G512 (v, :).

With reference to the fourth possible implementation of the fifth aspect, in a tenth possible implementation of the fifth aspect, the modulated field STF is generated based on two quaternary Golay sequences whose lengths each are 22, and the two quaternary Golay sequences are respectively: S1=[−1i, 1, 1, −1, 1, 1, 1i, −1i, −1, −1, 1, −1, 1i, 1i, −1i, 1i, 1i, 1i, 1, −1, −1i, −1], and S2=[−1i, −1, 1, 1, 1, −1, 1i, 1i, −1, 1, 1, 1, 1i, −1i, −1i, −1i, 1i, −1i, 1, 1, −1i, 1].

With reference to the tenth possible implementation of the fifth aspect, in an eleventh possible implementation of the fifth aspect, the modulated field STF is obtained by inserting a zero element before and after each non-zero element in G88 (v, :) based on a specified rule, where v is a positive integer and a value range meets 1≤v≤8; where G88 (1, :)=[S1, S2, S1, −S2]; G88 (2, :)=[S1, S2, −S1, S2]; G88 (3, :)=[S2, S1, S2, −S1]; G88 (4, :)=[S2, S1, −S2, S1]; G88 (5, :)=[S1, −S2, S1, S2]; G88 (6, :)=[−S1, S2, S1, S2]; G88 (7, :)=[S2, −S1, S2, S1]; and G88 (8, :)=[−S2, S1, S2, S1].

In this application, when CB=1, the modulated field STF is denoted as G352 (v, :). That the modulated field STF is obtained by inserting a zero element before and after each non-zero element in G88 (v, :) based on a specified rule includes: inserting one zero element before each non-zero element in G88 (v, :) and inserting two zero elements after each non-zero element in G88 (v, :), to obtain G352 (v, :), or inserting two zero elements before each non-zero element in G128 (v, :) and inserting one zero element after each non-zero element in G128 (v, :), to obtain G352 (v, :).

With reference to the ninth possible implementation of the fifth aspect, in a twelfth possible implementation of the fifth aspect, when CB=2, the modulated field STF is denoted as G1024 (v, :), and G1024 (v, :) is determined based on two different modulated field STFs when CB=1; where G1024 (1, :)=[G512 (1, :), G512 (2, :)]; G1024 (2, :)=[G512 (1, :), −G512 (2, :)]; G1024 (3, :)=[G512 (3, :), G512 (4, :)]; G1024 (4, :)=[G512 (3, :), −G512 (4, :)]; G1024 (5, :)=[G512 (5, :), G512 (6, :)]; G1024 (6, :)=[G512 (5, :), −G512 (6, :)]; G1024 (7, :)=[G512 (7, :), G512 (8, :)]; and G1024 (8, :)=[G512 (7, :), −G512 (8, :)].

With reference to the third possible implementation of the fifth aspect, in a thirteenth possible implementation of the fifth aspect, when CB=3, the modulated field STF is generated based on eight binary Golay sequences whose lengths each are 32, and the eight binary Golay sequences are respectively: R1=[1, 1, −1, 1, 1, 1, 1, −1, 1, 1, −1, 1, −1, −1, −1, 1, −1, −1, 1, −1, −1, −1, −1, 1, 1, 1, −1, 1, −1, −1, −1, 1], R2=[1, −1, −1, −1, 1, −1, 1, 1, 1, −1, −1, −1, −1, 1, −1, −1, −1, 1, 1, −1, 1, −1, −1, 1, −1, −1, −1, −1, 1, −1, −1], R3=[1, 1, −1, 1, 1, 1, 1, −1, 1, 1, −1, 1, −1, −1, −1, 1, 1, 1, −1, 1, 1, 1, 1, −1, −1, −1, 1, −1, 1, 1, 1, −1], R4=[1, −1, −1, 1, −1, 1, 1, 1, −1, −1, −1, 1, −1, −1, −1, 1, −1, 1, −1, 1, 1, −1, 1, 1, 1, −1, 1, 1], R5=[1, 1, −1, 1, 1, 1, 1, −1, 1, 1, 1, −1, 1, −1, −1, −1, 1, 1, 1, −1, 1, 1, 1, 1, −1, 1, 1, 1, −1, 1, 1, −1], R6=[1, −1, −1, −1, 1, −1, 1, 1, 1, −1, −1, 1, −1, 1, 1, 1, −1, −1, −1, 1, −1, 1, 1, 1, −1, 1, 1, 1, −1, 1, 1, 1], R7=[1, 1, −1, 1, 1, 1, 1, −1, 1, 1, −1, 1, −1, −1, −1, 1, −1, −1, 1, −1, −1, −1, −1, 1, 1, 1, −1, 1, −1, −1, −1, 1], and R8=[1, −1, −1, −1, 1, −1, 1, 1, 1, −1, −1, −1, −1, 1, −1, −1, −1, 1, 1, 1, −1, 1, −1, −1, 1, −1, −1, −1, −1, 1, −1, −1].

With reference to the thirteenth possible implementation of the fifth aspect, in a fourteenth possible implementation of the fifth aspect, for each binary Golay sequence, a zero element is inserted before and after each non-zero element based on a specified rule to obtain eight sequences whose lengths are 128, and the eight sequences whose lengths are 128 are respectively denoted as G128_1 (1, :), G128_1 (2, :), G128_2 (1, :), G128_2 (2, :), G128_3 (1, :), G128_3 (2, :), G128_4 (1, :), and G128_4 (2, :); and the modulated field STF is denoted as G1536 (v, :), where v is a positive integer and a value range meets 1≤v≤8; where G1536 (1, :)=[G128_1 (1, :), −G128_2 (1, :), −G128_1 (1, :), −G128_2 (1, :), −G128_1 (1, :), G128_2 (1, :), −G128_1 (1, :), G128_2 (1, :), −G128_1 (1, :), G128_2 (1, :)]; G1536 (2, :)=[G128_1 (2, :), −G128_2 (2, :), −G128_1 (2, :), −G128_2 (2, :), −G128_1 (2, :), G128_2 (2, :), −G128_1 (2, :), G128_2 (2, :)]; G1536 (3, :)=[G128_1 (3, :), −G128_2 (3, :), −G128_1 (3, :), −G128_2 (3, :), −G128_1 (3, :), G128_2 (3, :), G128_1 (3, :), −G128_2 (3, :), G128_1 (3, :), −G128_2 (3, :), G128_1 (3, :), G128_2 (3, :)]; G1536 (4, :)=[G128_1 (4, :), −G128_2 (4, :), −G128_1 (4, :), −G128_2 (4, :), −G128_1 (4, :), −G128_2 (4, :), G128_1 (4, :), G128_2 (4, :), G128_1 (4, :), −G128_2 (4, :), G128_1 (4, :), G128_2 (4, :)]; G1536 (5, :)=[G128_1 (3, :), −G128_2 (3, :), −G128_1 (3, :), −G128_2 (3, :), G128_1 (3, :), −G128_2 (3, :), −G128_1 (3, :), G128_2 (3, :), −G128_1 (3, :), G128_2 (3, :), −G128_1 (3, :), G128_2 (3, :)]; G1536 (6, :)=[G128_1 (4, :), −G128_2 (4, :), −G128_1 (4, :), −G128_2 (4, :), G128_1 (4, :), −G128_2 (4, :), −G128_1 (4, :), G128_2 (4, :), −G128_1 (4, :), G128_2 (4, :), G128_1 (4, :), −G128_2 (4, :)]; G1536 (7, :)=[G128_1 (1, :), −G128_2 (1, :), −G128_1 (1, :), −G128_2 (1, :), G128_1 (1, :), G128_2 (1, :), G128_1 (1, :), G128_2 (1, :), G128_1 (1, :), −G128_2 (1, :), −G128_1 (1, :), −G128_2 (1, :)]; and G1536 (8, :)=[G128_1 (2, :), −G128_2 (2, :), −G128_1 (2, :), −G128_2 (2, :), G128_1 (2, :), G128_2 (2, :), G128_1 (2, :), G128_2 (2, :), G128_1 (2, :), −G128_2 (2, :), −G128_1 (2, :), −G128_2 (2, :)].

With reference to the ninth possible implementation of the fifth aspect, in a fifteenth possible implementation of the fifth aspect, when CB=4, the modulated field STF is denoted as G2048 (v, :), and G2048 (v, :) is determined based on two different modulated field STFs when CB=1; where G2048 (1, :)=[G512 (4, :), −G512 (3, :), G512 (4, :), G512 (3, :)]; G2048 (2, :)=[G512 (1, :), −G512 (2, :), G512 (1, :), G512 (2, :)]; G2048 (3, :)=[G512 (4, :), G512 (3, :), G512 (4, :), −G512 (3, :)]; G2048 (4, :)=[G512 (3, :), −G512 (4, :), G512 (3, :), G512 (4, :)]; G2048 (5, :)=[G512 (6, :), −G512 (5, :), G512 (6, :), G512 (5, :)]; G2048 (6, :)=[−G512 (6, :), G512 (5, :), G512 (6, :), G512 (5, :)]; G2048 (7, :)=[G512 (5, :), G512 (6, :), G512 (5, :), −G512 (6, :)]; and G2048 (8, :)=[−G512 (5, :), G512 (6, :), G512 (5, :), G512 (6, :)].

With reference to the eleventh possible implementation of the fifth aspect, in a sixteenth possible implementation of the fifth aspect, when CB=2, the modulated field STF is denoted as G704 (v, :), and G704 (v, :) is determined based on two different modulated field STFs when CB=1; where G704 (1, :)=[G352 (1, :), G352 (2, :)]; G704 (2, :)=[G352 (1, :), −G352 (2, :)]; G704 (3, :)=[G352 (3, :), G352 (4, :)]; G704 (4, :)=[G352 (3, :), −G352 (4, :)]; G704 (5, :)=[G352 (5, :), G352 (6, :)]; G704 (6, :)=[G352 (5, :), −G352 (6, :)]; G704 (7, :)=[G352 (7, :), G352 (8, :)]; and G704 (8, :)=[G352 (7, :), −G352 (8, :)].

With reference to the tenth possible implementation of the fifth aspect, in a seventeenth possible implementation of the fifth aspect, when CB=3, for each quaternary Golay sequence, a zero element is inserted before and after each non-zero element based on a specified rule to obtain two sequences whose lengths are 88, and the two sequences whose lengths are 88 are respectively denoted as G88_1 and G88_2; and the modulated field STF is denoted as G1056 (v, :), where v is a positive integer and a value range meets 1≤v≤8; where G1056 (1, :)=[G88_1, G88_2, −G88_1, G88_2, −G88_1, −G88_2, G88_1, G88_2, −G88_1, G88_2, G88_1, G88_2]; G1056 (2, :)=[G88_2, G88_1, −G88_2, G88_1, −G88_2, −G88_1, G88_2, G88_1, −G88_2, G88_1, G88_2, G88_1]; G1056 (3, :)=[G88_2, G88_1, G88_2, −G88_1, G88_2, −G88_1, −G88_2, G88_1, G88_2, −G88_1, G88_2, G88_1]; G1056 (4, :)=[G88_1, G88_2, G88_1, −G88_2, G88_1, −G88_2, −G88_1, G88_2, G88_1, −G88_2, G88_1, G88_2]; G1056 (5, :)=[G88_1, G88_2, G88_1, G88_2, −G88_1, G88_2, −G88_1, −G88_2, G88_1, G88_2, −G88_1, G88_2]; G1056 (6, :)=[G88_2, G88_1, G88_2, G88_1, −G88_2, G88_1, −G88_2, −G88_1, G88_2, G88_1, −G88_2, G88_1]; G1056 (7, :)=[G88_2, G88_1, G88_2, G88_1, G88_2, −G88_1, G88_2, −G88_1, −G88_2, G88_1, G88_2, −G88_1]; and G1056 (8, :)=[G88_1, G88_2, G88_1, G88_2, G88_1, −G88_2, G88_1, −G88_2, −G88_1, G88_2, G88_1, −G88_2];

or

G1056 (1, :)=[G88_1, G88_2, −G88_1, G88_2, −G88_1, −G88_2, G88_1, G88_2, −G88_1, G88_2, G88_1, G88_2]; G1056 (2, :)=[G88_2, G88_1, −G88_2, G88_1, −G88_2, −G88_1, G88_2, G88_1, −G88_2, G88_1, G88_2, G88_1]; G1056 (3, :)=[G88_1, G88_2, G88_1, −G88_2, G88_1, G88_2, G88_1, G88_2, −G88_1, −G88_2, G88_1, −G88_2]; G1056 (4, :)=[G88_2, G88_1, G88_2, −G88_1, G88_2, G88_1, G88_2, G88_1, −G88_2, −G88_1, G88_2, −G88_1]; G1056 (5, :)=[G88_1, −G88_2, −G88_1, −G88_2, G88_1, −G88_2, G88_1, −G88_2, −G88_1, G88_2, −G88_1, −G88_2]; G1056 (6, :)=[G88_2, −G88_1, −G88_2, −G88_1, G88_2, −G88_1, G88_2, −G88_1, G88_2, G88_1, −G88_2, −G88_1]; G1056 (7, :)=[G88_1, −G88_2, G88_1, −G88_2, G88_1, G88_2, −G88_1, −G88_2, G88_1, G88_2, G88_2]; and G1056 (8, :)=[G88_2, −G88_1, G88_2, −G88_1, G88_2, G88_1, −G88_2, −G88_1, G88_2, G88_1, G88_2, G88_1].

With reference to the eleventh possible implementation of the fifth aspect, in an eighteenth possible implementation of the fifth aspect, when CB=4, the modulated field STF is denoted as G1408 (v, :), and G1408 (v, :) is determined based on two different modulated field STFs when CB=2; where G1408 (1, :)=[G704 (1, :), G704 (2, :)]; G1408 (2, :)=[G704 (1, :), −G704 (2, :)]; G1408 (3, :)=[G704 (3, :), G704 (4, :)]; G1408 (4, :)=[G704 (3, :), −G704 (4, :)]; G1408 (5, :)=[G704 (5, :), G704 (6, :)]; G1408 (6, :)=[G704 (5, :), −G704 (6, :)]; G1408 (7, :)=[G704 (7, :), G704 (8, :)]; and G1408 (8, :)=[G704 (7, :), −G704 (8, :)].

According to a sixth aspect, a data transmission apparatus is provided, including a processing circuit, an input interface, and an output interface, where the processing circuit, the input interface, and the output interface communicate with each other by using an internal connection. The input interface is configured to obtain information to be processed by the processing circuit. The processing circuit is configured to perform a processing step in the first aspect or the second aspect to process the to-be-processed information. The output interface is configured to output the information processed by the processing circuit.

In a first possible implementation of the sixth aspect, the non-zero elements in the modulated field STF form a Golay sequence.

In a second possible implementation of the sixth aspect, the modulated field STF includes one or more sequences whose lengths are N, each sequence whose length is N is mapped to a subcarrier on one resource block RB for transmission, and N is a positive integer.

With reference to the second possible implementation of the sixth aspect, in a third possible implementation of the sixth aspect, when channel bonding is CB=1, the modulated field STF includes four sequences for which N=128, and m1+m2=3.

With reference to the second possible implementation of the sixth aspect, in a fourth possible implementation of the sixth aspect, when channel bonding is CB=1, the modulated field STF includes four sequences for which N=88, and m1+m2=3.

With reference to the third possible implementation or the fourth possible implementation of the sixth aspect, in a fifth possible implementation of the sixth aspect, m1=1 and m2=2, or m1=2 and m2=1.

With reference to the third possible implementation of the sixth aspect, in a sixth possible implementation of the sixth aspect, a length of the modulated field STF in time domain is equal to a length, in time domain, of five OFDM symbols carrying no cyclic prefix.

With reference to the fourth possible implementation of the sixth aspect, in a seventh possible implementation of the sixth aspect, a length of the modulated field STF in time domain is equal to a length, in time domain, of 7.5 OFDM symbols carrying no cyclic prefix.

With reference to the third possible implementation of the sixth aspect, in an eighth possible implementation of the sixth aspect, the modulated field STF is generated based on two binary Golay sequences whose lengths each are 32, and the two binary Golay sequences are respectively: R1=[1, 1, −1, 1, 1, 1, 1, −1, 1, 1, −1, 1, −1, −1, −1, 1, 1, 1, −1, 1, 1, 1, 1, −1, −1, −1, 1, −1, 1, 1, 1, −1], and R2=[1, 1, −1, 1, 1, 1, 1, −1, 1, 1, −1, 1, −1, −1, −1, 1, −1, −1, 1, −1, −1, −1, −1, 1, 1, 1, −1, 1, −1, −1, −1, 1].

With reference to the eighth possible implementation of the sixth aspect, in a ninth possible implementation of the sixth aspect, the modulated field STF is obtained by inserting a zero element before and after each non-zero element in G128 (v, :) based on a specified rule, where v is a positive integer and a value range meets 1≤v≤8; where G128 (1, :)=[R1, R2, R1, −R2]; G128 (2, :)=[R1, R2, −R1, R2]; G128 (3, :)=[R2, R1, R2, −R1]; G128 (4, :)=[R2, R1, −R2, R1]; G128 (5, :)=[R1, −R2, R1, R2]; G128 (6, :)=[−R1, R2, R1, R2]; G128 (7, :)=[R2, −R1, R2, R1]; and G128 (8, :)=[−R2, R1, R2, R1].

In this application, when CB=1, the modulated field STF is denoted as G512 (v, :). That the modulated field STF is obtained by inserting a zero element before and after each non-zero element in G128 (v, :) based on a specified rule includes: inserting one zero element before each non-zero element in G128 (v, :) and inserting two zero elements after each non-zero element in G128 (v, :), to obtain G512 (v, :), or inserting two zero elements before each non-zero element in G128 (v, :) and inserting one zero element after each non-zero element in G128 (v, :), to obtain G512 (v, :).

With reference to the fourth possible implementation of the sixth aspect, in a tenth possible implementation of the sixth aspect, the modulated field STF is generated based on two quaternary Golay sequences whose lengths each are 22, and the two quaternary Golay sequences are respectively: S1=[−1i, 1, 1, −1, 1, 1, 1i, −1i, −1, −1, 1, −1, 1i, 1i, −1i, 1i, 1i, 1i, 1, −1, −1i, −1], and S2=[−1i, −1, 1, 1, 1, −1, 1i, 1i, −1, 1, 1, 1, 1i, −1i, −1i, −1i, 1i, −1i, 1, 1, −1i, 1].

With reference to the tenth possible implementation of the sixth aspect, in an eleventh possible implementation of the sixth aspect, the modulated field STF is obtained by inserting a zero element before and after each non-zero element in G88 (v, :) based on a specified rule, where v is a positive integer and a value range meets 1≤v≤8; where G88 (1, :)=[S1, S2, S1, −S2]; G88 (2, :)=[S1, S2, −S1, S2]; G88 (3, :)=[S2, S1, S2, −S1]; G88 (4, :)=[S2, S1, −S2, S1]; G88 (5, :)=[S1, −S2, S1, S2]; G88 (6, :)=[−S1, S2, S1, S2]; G88 (7, :)=[S2, −S1, S2, S1]; and G88 (8, :)=[−S2, S1, S2, S1].

In this application, when CB=1, the modulated field STF is denoted as G352 (v, :). That the modulated field STF is obtained by inserting a zero element before and after each non-zero element in G88 (v, :) based on a specified rule includes: inserting one zero element before each non-zero element in G88 (v, :) and inserting two zero elements after each non-zero element in G88 (v, :), to obtain G352 (v, :), or inserting two zero elements before each non-zero element in G128 (v, :) and inserting one zero element after each non-zero element in G128 (v, :), to obtain G352 (v, :).

With reference to the ninth possible implementation of the sixth aspect, in a twelfth possible implementation of the sixth aspect, when CB=2, the modulated field STF is denoted as G1024 (v, :), and G1024 (v, :) is determined based on two different modulated field STFs when CB=1; where G1024 (1, :)=[G512 (1, :), G512 (2, :)]; G1024 (2, :)=[G512 (1, :), −G512 (2, :)]; G1024 (3, :)=[G512 (3, :), G512 (4, :)]; G1024 (4, :)=[G512 (3, :), −G512 (4, :)]; G1024 (5, :)=[G512 (5, :), G512 (6, :)]; G1024 (6, :)=[G512 (5, :), −G512 (6, :)]; G1024 (7, :)=[G512 (7, :), G512 (8, :)]; and G1024 (8, :)=[G512 (7, :), −G512 (8, :)].

With reference to the third possible implementation of the sixth aspect, in a thirteenth possible implementation of the sixth aspect, when CB=3, the modulated field STF is generated based on eight binary Golay sequences whose lengths each are 32, and the eight binary Golay sequences are respectively: R1=[1, 1, −1, 1, 1, 1, 1, −1, 1, 1, −1, 1, −1, −1, −1, 1, −1, −1, 1, −1, −1, −1, −1, 1, 1, 1, −1, 1, −1, −1, 1], R2=[1, −1, −1, −1, 1, −1, 1, 1, 1, −1, −1, −1, −1, 1, −1, −1, 1, 1, 1, −1, 1, −i, 1, −1, −1, −1, −1, 1, −1, −1], R3=[1, 1, −1, 1, 1, 1, 1, −1, 1, 1, −1, 1, −1, −1, 1, 1, −1, 1, 1, 1, 1, −1, −1, −1, 1, −1, 1, 1, 1, −1], R4=[1, −1, −1, −1, 1, −1, 1, 1, 1, −1, −1, −1, −1, 1, −1, −1, −1, −1, 1, −1, −1, −1, 1, −1, 1, 1, −1, −1, 1, 1], R5=[1, 1, −1, 1, 1, 1, 1, −1, 1, 1, −1, 1, −1, −1, −1, 1, 1, 1, 1, 1, 1, 1, −1, 1, −1, −1, 1, −1, 1, 1, 1, 1, −1], R6=[1, −1, −1, −1, 1, −1, 1, 1, 1, −1, −1, −1, 1, −1, −1, −1, −1, 1, −1, 1, 1, −1, 1, 1, 1, 1, 1, 1], R7=[1, 1, −1, 1, 1, 1, 1, −1, 1, 1, −1, 1, −1, −1, −1, 1, −1, −1, 1, −1, −1, −1, 1, 1, 1, −1, 1, −1, −1, −1, 1], and R8=[1, −1, −1, −1, 1, −1, 1, 1, 1, −1, −1, −1, −1, 1, −1, −1, −1, 1, 1, 1, −1, 1, −1, −1, 1, −1, −1, −1, −1, 1, −1, −1].

With reference to the thirteenth possible implementation of the sixth aspect, in a fourteenth possible implementation of the sixth aspect, for each binary Golay sequence, a zero element is inserted before and after each non-zero element based on a specified rule to obtain eight sequences whose lengths are 128, and the eight sequences whose lengths are 128 are respectively denoted as G128_1 (1, :), G128_1 (2, :), G128_2 (1, :), G128_2 (2, :), G128_3 (1, :), G128_3 (2, :), G128_4 (1, :), and G128_4 (2, :); and the modulated field STF is denoted as G1536 (v, :), where v is a positive integer and a value range meets 1≤v≤8; where G1536 (1, :)=[G128_1 (1, :), −G128_2 (1, :), −G128_1 (1, :), −G128_2 (1, :), −G128_1 (1, :), G128_2 (1, :), −G128_1 (1, :), −G128_2 (1, :), G128_1 (1, :), G128_2 (1, :), −G128_1 (1, :), G128_2 (1, :)]; G1536 (2, :)=[G128_1 (2, :), −G128_2 (2, :), −G128_1 (2, :), −G128_2 (2, :), −G128_1 (2, :), −G128_2 (2, :), −G128_1 (2, :), −G128_2 (2, :), G128_1 (2, :), G128_2 (2, :), −G128_1 (2, :), G128_2 (2, :)]; G1536 (3, :)=[G128_1 (3, :), −G128_2 (3, :), −G128_1 (3, :), −G128_2 (3, :), −G128_1 (3, :), −G128_2 (3, :), G128_1 (3, :), G128_2 (3, :), −G128_1 (3, :), −G128_2 (3, :), G128_1 (3, :), G128_2 (3, :)]; G1536 (4, :)=[G128_1 (4, :), −G128_2 (4, :), −G128_1 (4, :), −G128_2 (4, :), G128_1 (4, :), −G128_2 (4, :), −G128_1 (4, :), G128_2 (4, :), −G128_1 (4, :), −G128_2 (4, :), G128_1 (4, :), G128_2 (4, :)]; G1536 (5, :)=[G128_1 (3, :), −G128_2 (3, :), −G128_1 (3, :), G128_2 (3, :), G128_1 (3, :), −G128_2 (3, :), −G128_1 (3, :), G128_2 (3, :), −G128_1 (3, :), G128_2 (3, :), −G128_1 (3, :), −G128_2 (3, :)]; G1536 (6, :)= [G128_1 (4, :), −G128_2 (4, :), −G128_1 (4, :), −G128_2 (4, :), G128_1 (4, :), −G128_2 (4, :), −G128_1 (4, :), G128_2 (4, :), −G128_1 (4, :), G128_2 (4, :), −G128_1 (4, :), −G128_2 (4, :)]; G1536 (7, :)=[G128_1 (1, :), −G128_2 (1, :), −G128_1 (1, :), −G128_2 (1, :), G128_1 (1, :), G128_2 (1, :), G128_1 (1, :), G128_2 (1, :), G128_1 (1, :), −G128_2 (1, :), −G128_1 (1, :), −G128_2 (1, :)]; and G1536 (8, :)=[G128_1 (2, :), −G128_2 (2, :), −G128_1 (2, :), −G128_2 (2, :), G128_1 (2, :), G128_2 (2, :), G128_1 (2, :), G128_2 (2, :), G128_1 (2, :), −G128_2 (2, :), −G128_1 (2, :), −G128_2 (2, :)].

With reference to the ninth possible implementation of the sixth aspect, in a fifteenth possible implementation of the sixth aspect, when CB=4, the modulated field STF is denoted as G2048 (v, :), and G2048 (v, :) is determined based on two different modulated field STFs when CB=1; where G2048 (1, :)=[G512 (4, :), −G512 (3, :), G512 (4, :), G512 (3, :)]; G2048 (2, :)=[G512 (1, :), −G512 (2, :), G512 (1, :), G512 (2, :)]; G2048 (3, :)=[G512 (4, :), G512 (3, :), G512 (4, :), −G512 (3, :)]; G2048 (4, :)=[G512 (3, :), −G512 (4, :), G512 (3, :), G512 (4, :)]; G2048 (5, :)=[G512 (6, :), −G512 (5, :), G512 (6, :), G512 (5, :)]; G2048 (6, :)=[−G512 (6, :), G512 (5, :), G512 (6, :), G512 (5, :)]; G2048 (7, :)=[G512 (5, :), G512 (6, :), G512 (5, :), −G512 (6, :)]; and G2048 (8, :)=[−G512 (5, :), G512 (6, :), G512 (5, :), G512 (6, :)].

With reference to the eleventh possible implementation of the sixth aspect, in a sixteenth possible implementation of the sixth aspect, when CB=2, the modulated field STF is denoted as G704 (v, :), and G704 (v, :) is determined based on two different modulated field STFs when CB=1; where G704 (1, :)=[G352 (1, :), G352 (2, :)]; G704 (2, :)=[G352 (1, :), −G352 (2, :)]; G704 (3, :)=[G352 (3, :), G352 (4, :)]; G704 (4, :)=[G352 (3, :), −G352 (4, :)]; G704 (5, :)=[G352 (5, :), G352 (6, :)]; G704 (6, :)=[G352 (5, :), −G352 (6, :)]; G704 (7, :)=[G352 (7, :), G352 (8, :)]; and G704 (8, :)=[G352 (7, :), −G352 (8, :)].

With reference to the tenth possible implementation of the sixth aspect, in a seventeenth possible implementation of the sixth aspect, when CB=3, for each quaternary Golay sequence, a zero element is inserted before and after each non-zero element based on a specified rule to obtain two sequences whose lengths are 88, and the two sequences whose lengths are 88 are respectively denoted as G88_1 and G88_2; and the modulated field STF is denoted as G1056 (v, :), where v is a positive integer and a value range meets 1≤v≤8; where G1056 (1, :)=[G88_1, G88_2, −G88_1, G88_2, −G88_1, −G88_2, G88_1, G88_2, −G88_1, G88_2, G88_1, G88_2]; G1056 (2, :)=[G88_2, G88_1, −G88_2, G88_1, −G88_2, −G88_1, G88_2, G88_1, −G88_2, G88_1, G88_2, G88_1]; G1056 (3, :)=[G88_2, G88_1, G88_2, −G88_1, G88_2, −G88_1, −G88_2, G88_1, G88_2, −G88_1, G88_2, G88_1]; G1056 (4, :)=[G88_1, G88_2, G88_1, −G88_2, G88_1, −G88_2, −G88_1, G88_2, G88_1, −G88_2, G88_1, G88_2]; G1056 (5, :)=[G88_1, G88_2, G88_1, G88_2, −G88_1, G88_2, −G88_1, −G88_2, G88_1, G88_2, −G88_1, G88_2]; G1056 (6, :)=[G88_2, G88_1, G88_2, G88_1, −G88_2, G88_1, −G88_2, −G88_1, G88_2, G88_1, −G88_2, G88_1]; G1056 (7, :)=[G88_2, G88_1, G88_2, G88_1, G88_2, −G88_1, G88_2, −G88_1, −G88_2, G88_1, G88_2, −G88_1]; and G1056 (8, :)=[G88_1, G88_2, G88_1, G88_2, G88_1, −G88_2, G88_1, −G88_2, −G88_1, G88_2, G88_1, −G88_2];

or

G1056 (1, :)=[G88_1, G88_2, −G88_1, G88_2, −G88_1, −G88_2, G88_1, G88_2, −G88_1, G88_2, G88_1, G88_2];

G1056 (2, :)=[G88_2, G88_1, −G88_2, G88_1, −G88_2, −G88_1, G88_2, G88_1, −G88_2, G88_1, G88_2, G88_1]; G1056 (3, :)=[G88_1, G88_2, G88_1, −G88_2, G88_1, G88_2, G88_1, G88_2, −G88_1, −G88_2, G88_1, −G88_2]; G1056 (4, :)=[G88_2, G88_1, G88_2, −G88_1, G88_2, G88_1, G88_2, G88_1, −G88_2, −G88_1, G88_2, −G88_1]; G1056 (5, :)=[G88_1, −G88_2, −G88_1, −G88_2, G88_1, −G88_2, G88_1, −G88_2, −G88_1, G88_2, −G88_1, −G88_2]; G1056 (6, :)=[G88_2, −G88_1, −G88_2, −G88_1, G88_2, −G88_1, G88_2, −G88_1, −G88_2, G88_1, −G88_2, −G88_1]; G1056 (7, :)=[G88_1, −G88_2, G88_1, −G88_2, G88_1, G88_2, −G88_1, −G88_2, G88_1, G88_2, G88_1, G88_2]; and G1056 (8, :)=[G88_2, −G88_1, G88_2, −G88_1, G88_2, G88_1, −G88_2, −G88_1, G88_2, G88_1, G88_2, G88_1].

With reference to the eleventh possible implementation of the sixth aspect, in an eighteenth possible implementation of the sixth aspect, when CB=4, the modulated field STF is denoted as G1408 (v, :), and G1408 (v, :) is determined based on two different modulated field STFs when CB=2; where G1408 (1, :)=[G704 (1, :), G704 (2, :)]; G1408 (2, :)=[G704 (1, :), −G704 (2, :)]; G1408 (3, :)=[G704 (3, :), G704 (4, :)]; G1408 (4, :)=[G704 (3, :), −G704 (4, :)]; G1408 (5, :)=[G704 (5, :), G704 (6, :)]; G1408 (6, :)=[G704 (5, :), −G704 (6, :)]; G1408 (7, :)=[G704 (7, :), G704 (8, :)]; and G1408 (8, :)=[G704 (7, :), −G704 (8, :)].

In a nineteenth possible implementation of the sixth aspect, the data transmission apparatus further includes a transceiver. When the processing circuit is configured to perform the processing step in the first aspect to process the to-be-processed information, the output interface is configured to output the information processed by the processing circuit to the transceiver, and the transceiver is configured to send the information processed by the processing circuit. When the processing circuit is configured to perform the processing step in the second aspect to process the to-be-processed information, the transceiver is configured to receive the information to be processed by the processing circuit, and send the information to be processed by the processing circuit to the input interface.

According to a seventh aspect, a computer-readable storage medium is provided, configured to store a computer program. The computer program includes instructions used to perform the method in the first aspect or any possible implementation of the first aspect; or the computer program includes instructions used to perform the method in the second aspect or any possible implementation of the second aspect.

According to an eighth aspect, a data transmission system is provided, including a transmit end and a receive end. The transmit end includes the data transmission apparatus in the third aspect or any possible implementation of the third aspect, and the receive end includes the data transmission apparatus in the fourth aspect or any possible implementation of the fourth aspect.

According to a ninth aspect, a computer program is provided, and the computer program includes instructions used to perform the method in the first aspect or any possible implementation of the first aspect, or the computer program includes instructions used to perform the method in the second aspect or any possible implementation of the second aspect.

BRIEF DESCRIPTION OF DRAWINGS

FIG. 9 is a schematic diagram of allocation of a spectrum resource according to an embodiment of this application;

FIG. 10 is a schematic diagram of a PAPR according to an embodiment of this application;

FIG. 11 is a schematic structural diagram of a spectrum resource according to an embodiment of this application;

FIG. 12 is a schematic diagram of allocation of another spectrum resource according to an embodiment of this application;

FIG. 13 is a schematic diagram of another PAPR according to an embodiment of this application;

FIG. 15 is a schematic diagram of allocation of still another spectrum resource according to an embodiment of this application;

FIG. 18 is a schematic diagram of allocation of yet another spectrum resource according to an embodiment of this application;

FIG. 19 is a schematic diagram of yet another PAPR according to an embodiment of this application;

FIG. 21 is a schematic diagram of a PAPR according to another embodiment of this application;

FIG. 22 is a schematic diagram of another PAPR according to another embodiment of this application;

FIG. 23 is a schematic diagram of still another PAPR according to another embodiment of this application;

FIG. 24 is a schematic diagram of yet another PAPR according to another embodiment of this application;

FIG. 28 is a schematic diagram of a PAPR according to still another embodiment of this application;

FIG. 30 is a schematic diagram of another PAPR according to still another embodiment of this application;

FIG. 33 is a schematic diagram of yet another PAPR according to still another embodiment of this application;

FIG. 35 is a schematic diagram of yet another PAPR according to still another embodiment of this application;

DESCRIPTION OF EMBODIMENTS

To make the objectives, technical solutions, and advantages of this application clearer, the following further describes the implementations of this application in detail with reference to the accompanying drawings.

Because a discrete Fourier transform-spread orthogonal frequency division multiplexing (Discrete Fourier Transform-Spread OFDM, DFT-S-OFDM) transmission signal essentially has a characteristic of a single carrier, and a transmission waveform of the DFT-S-OFDM transmission signal has a relatively low peak to average power ratio, and the DFT-S-OFDM transmission signal supports multi-user multiplexing in terms of frequency. Therefore, a DFT-S-OFDM transmission technology is introduced into a next-generation 60 GHz WLAN standard, so that a PAPR of a WLAN system is reduced while multi-user frequency division multiplexing is supported.

Figure 1:
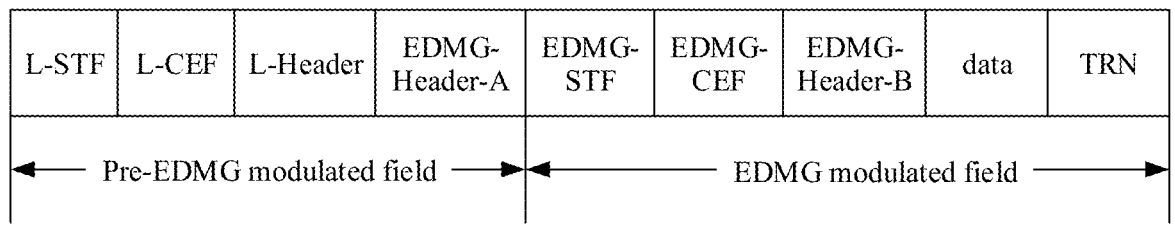
FIG. 1 is a schematic diagram of a frame structure of a PPDU in an existing 60 GHz WLAN standard.

FIG. 1 is a schematic diagram of a frame structure of a physical layer protocol data unit (Physical Layer Protocol Data Unit, PPDU) in an existing 60 GHz WLAN standard (IEEE 802.11ay). As shown in FIG. 1, the PPDU includes a pre-extended directional multi-gigabit (Extended directional multi-Gigabit, EDMG) modulated field (Pre-EDMG modulated fields) and an EDMG modulated field (EDMG modulated fields). The pre-EDMG modulated field includes a legacy short training field (Legacy Short Training Field, L-STF), a legacy channel estimation field (Legacy Channel Estimation Field, L-CEF), a legacy header (Legacy Header, L-Header), and a header-A (Header-A, also referred to as EDMG-Header-A). The EDMG modulated field includes a short training field (STF, also referred to as EDMG-STF), a channel estimation field (CEF, also referred to as EDMG-CEF), a header-B (Header-B, also referred to as EDMG-Header-B), a data field (data), and a training field (training, TRN).

When a receiver in a WLAN system receives a signal, a power gain of the received signal needs to be adjusted, so that the signal enters an analog-to-digital converter (Analog-to-Digital Converter, ADC) at proper power, and the ADC is able to convert the received signal into a digital signal to further perform digital processing on the received signal. In the existing 60 GHz WLAN standard, two-level automatic gain control (Automatic Gain Control, AGC) adjustment is separately performed on the received signal by using the L-STF and the EDMG-STF, to adjust the power gain of the received signal. The L-STF and the EDMG-STF are further used by the receiver to perform signal synchronization, frequency offset estimation compensation, and the like.

During resource mapping for a conventional OFDM transmission signal, several vacant subcarriers need to be placed at a center of a spectrum, and a direct current component at a receive end is located at a center of a single vacant subcarrier at the center, to prevent the direct current component from affecting a payload subcarrier. During resource mapping of a DFT-S-OFDM transmission signal, a vacant subcarrier is unable to be placed at a center of a spectrum. Otherwise, single-carrier nature of the DFT-S-OFDM transmission signal is affected, thereby deteriorating a PAPR of a signal waveform. Therefore, the DFT-S-OFDM transmission signal needs to be mapped to subcarriers at the center of the spectrum, and the direct current component at the receive end is located between two subcarriers at the center. Therefore, when the DFT-S-OFDM transmission technology is introduced into a next-generation 60 GHz WLAN standard, the STF needs to be re-designed. Optionally, when the DFT-S-OFDM transmission technology is used to implement multi-user frequency division multiplexing, a corresponding STF needs to be designed after spectrum resources are divided.

For a frame structure of a PPDU provided in the embodiments of this application, refer to FIG. 1. The PPDU includes a pre-modulated field (corresponding to the pre-EDGM modulated field) and a modulated field (corresponding to the EDMG modulated field). An L-STF part in the pre-modulated field is consistent with an L-STF in a pre-EDMG modulated field in a PPDU in the existing 60 GHz WLAN standard, to implement compatibility with a conventional device. A modulated field STF in the following embodiments of this application is an STF located in a modulated field. Optionally, the modulated field STF is referred to as a DFT-S-OFDM-STF (DSO-STF). A name of the modulated field STF is not limited in the embodiments of this application.

An embodiment of this application provides a data transmission system, and the data transmission system includes a transmit end and a receive end. A wireless communication connection is established between the transmit end and the receive end. Optionally, the transmit end and the receive end may transmit data on a 60 GHz frequency band by transmitting a PPDU.

Figure 2:
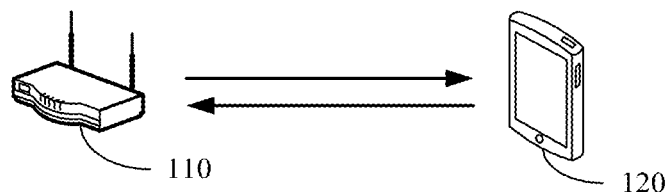
FIG. 2 is a schematic structural diagram of a data transmission system according to an embodiment of this application.

For example, FIG. 2 is a schematic structural diagram of a data transmission system according to an embodiment of this application. As shown in FIG. 2, the system includes an access point (Access Point, AP) 110 and one station (Station, STA) 120.

The AP is a transmit end, and the STA is a receive end, in other words, the data transmission system is used for single-user downlink transmission. Alternatively, the STA is a transmit end, and the AP is a receive end, in other words, the data transmission system is used for single-user uplink transmission.

Figure 3:
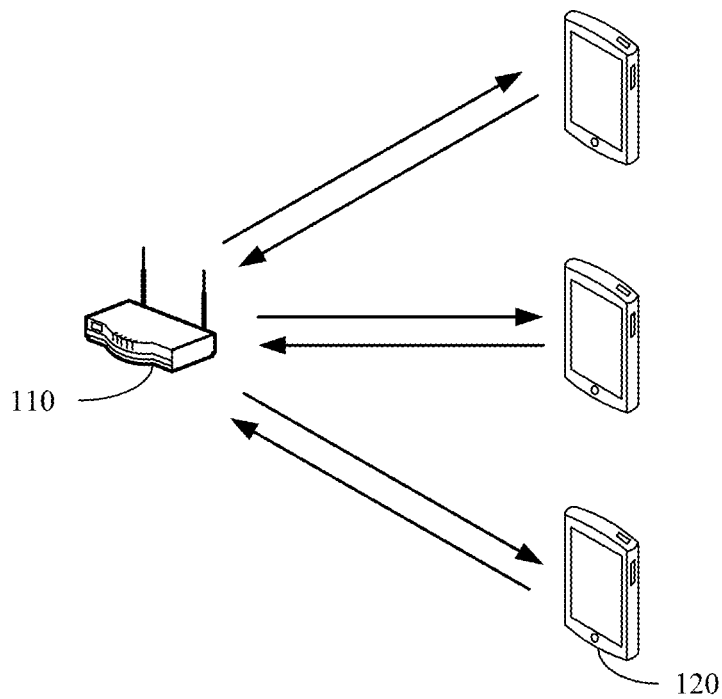
FIG. 3 is a schematic structural diagram of another data transmission system according to an embodiment of this application.

For example, FIG. 3 is a schematic structural diagram of another data transmission system according to an embodiment of this application. As shown in FIG. 3, the system includes an AP 110 and a plurality of STAs 120. In FIG. 3, for example, an application scenario includes one AP and three STAs.

The AP is a transmit end, and the STA is a receive end, in other words, the data transmission system is used for multi-user downlink transmission. Alternatively, the STA is a transmit end, and the AP is a receive end, in other words, the data transmission system is used for multi-user uplink transmission.

Optionally, the AP is a network device such as a base station, a router, a switch, or a bridge, and the STA is user equipment (User Equipment, UE) such as a mobile phone or a computer. This is not limited in this embodiment of this application.

Figure 4:
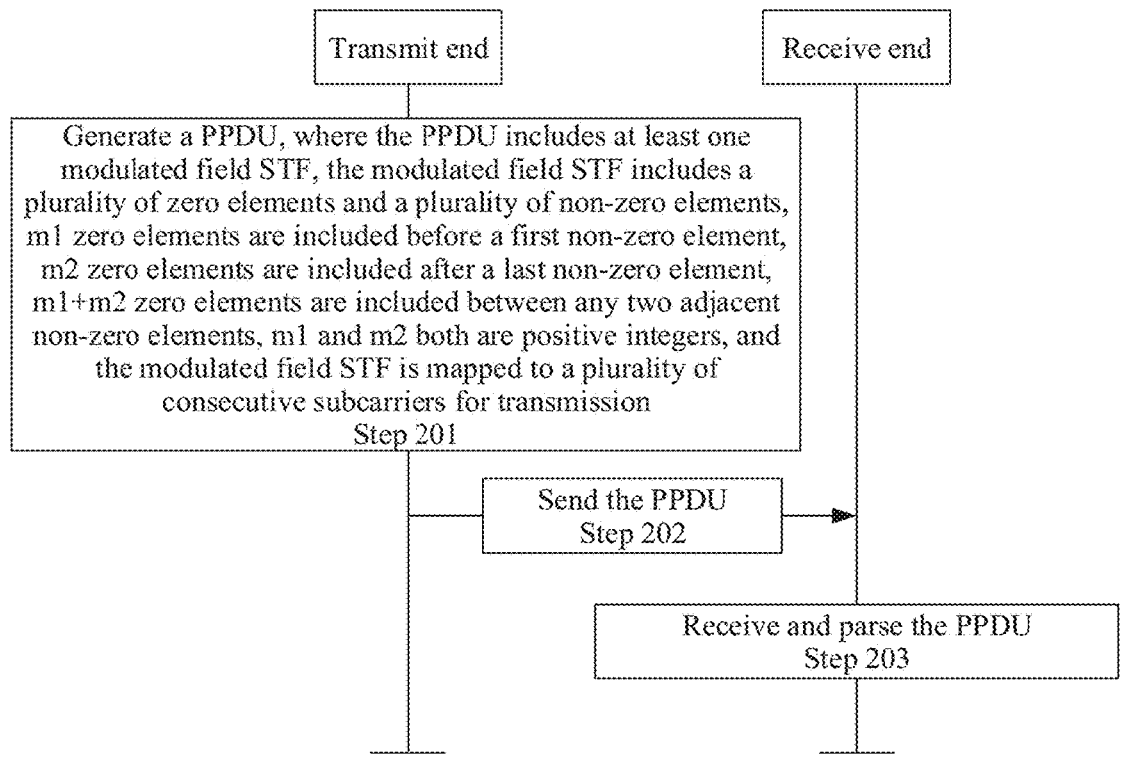
FIG. 4 is a flowchart of a data transmission method according to an embodiment of this application.

FIG. 4 is a flowchart of a data transmission method according to an embodiment of this application. The method is applied to the data transmission system shown in FIG. 2 or FIG. 3. As shown in FIG. 4, the data transmission method includes the following steps.

Step 201: A transmit end generates a PPDU, where the PPDU includes at least one modulated field STF, the modulated field STF includes a plurality of zero elements and a plurality of non-zero elements, m1 zero elements are included before a first non-zero element, m2 zero elements are included after a last non-zero element, m1+m2 zero elements are included between any two adjacent non-zero elements, m1 and m2 both are positive integers, and the modulated field STF is mapped to a plurality of consecutive subcarriers for transmission.

Optionally, when the transmit end and a receive end support a MIMO transmission technology, the PPDU may include a plurality of modulated field STFs, a quantity of modulated field STFs included in the PPDU is the same as a quantity of transmit antennas of the transmit end and/or a quantity of receive antennas of the receive end, and each modulated field STF is transmitted on a spatial flow corresponding to one antenna. Any two modulated field STFs in the plurality of modulated field STFs included in the PPDU are orthogonal to each other.

Step 202: The transmit end sends the PPDU to the receive end.

Optionally, as shown in FIG. 1, the PPDU further includes a data field.

In this embodiment of this application, the transmit end sends the modulated field STF to the receive end in an OFDM transmission mode, and sends a data field to the receive end in a DFT-S-OFDM transmission mode. In other words, a process in which the transmit end sends the modulated field STF in the PPDU to the receive end includes: performing subcarrier mapping on the modulated field STF; performing P-point inverse fast Fourier transform (inverse fast Fourier transform, IFFT) on the modulated field STF; and sending, to the receive end, the modulated field STF on which P-point IFFT is performed. A process in which the transmit end sends the data field in the PPDU to the receive end includes: performing Q-point discrete Fourier transform (discrete fourier transformation, DFT) on the data field; performing subcarrier mapping on the data field; performing P-point IFFT on the data field; and sending, to the receive end, the data field on which Q-point DTF and P-point IFFT are performed. P and Q are positive integers, and P>Q.

Step 203: The receive end receives and parses the PPDU.

Optionally, after receiving the modulated field STF in the PPDU, the receive end sequentially performs P-point fast Fourier transform (fast Fourier transform, FFT) and inverse subcarrier mapping on the modulated field STF, and then performs AGC adjustment, signal synchronization, frequency offset estimation compensation, and the like based on the modulated field STF. After receiving the data field in the PPDU, the receive end sequentially performs P-point FFT, inverse subcarrier mapping, and Q-point inverse discrete Fourier transform (inverse discrete Fourier transform, IDFT) on the data field.

Optionally, in step 201, the transmit end may insert m1 zero elements before each non-zero element based on a non-zero sequence including non-zero elements, and insert m2 non-zero elements after each non-zero element, to generate the modulated field STF, and generate the PPDU based on to-be-transmitted data and the modulated field STF.

Optionally, the non-zero elements in the modulated field STF form a Golay sequence. Because a transmission waveform of the Golay sequence is characterized by a low PAPR, when the non-zero elements in the modulated field STF is able to form a Golay sequence, it is ensured that a PAPR of the modulated field STF is relatively low.

It should be noted that the modulated field STF in the PPDU is transmitted on a spectrum resource. The spectrum resource is divided into a plurality of subcarriers. The plurality of subcarriers are in a one-to-one correspondence with a plurality of elements in the modulated field STF, and each element is transmitted on one subcarrier corresponding to the element. The modulated field STF is mapped to a plurality of consecutive subcarriers for transmission, in other words, there is no vacant subcarrier at a center of a spectrum resource used for transmitting the modulated field STF. This ensures that the modulated field STF sent by the transmit end has a relatively low PAPR.

Figure 5:
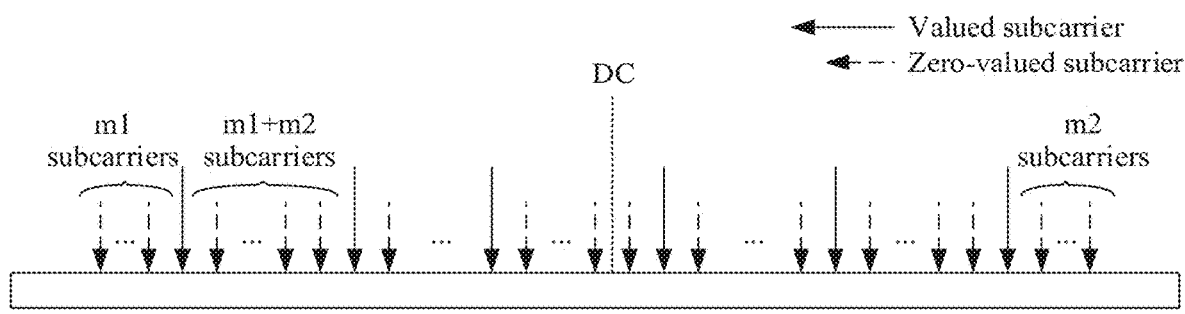
FIG. 5 is a schematic diagram of a subcarrier mapping manner according to an embodiment of this application.

FIG. 5 is a schematic diagram of a subcarrier mapping manner according to an embodiment of this application. As shown in FIG. 5, there are m1 zero-valued subcarriers before a first valued subcarrier in a spectrum resource, there are m1+m2 zero-valued subcarriers between two adjacent valued subcarriers, and there are m2 zero-valued subcarriers after a last valued subcarrier. The valued subcarrier is a subcarrier used to transmit the non-zero element in the modulated field STF, and the zero-valued subcarrier is a subcarrier used to transmit the zero element in the modulated field STF.

Before performing step 202, the transmit end may adjust a 0-frequency position of the modulated field STF, so that the 0-frequency position is located between two subcarriers at the center of the spectrum resource used for transmitting the modulated field STF. The 0-frequency position is a position of the direct current component at the receive end. As shown in FIG. 5, the direct current component DC at the receive end is located between two subcarriers at the center of the spectrum resource. Optionally, when the two subcarriers at the center of the spectrum resource are both zero-valued subcarriers, the transmit end adjusts the 0-frequency position of the modulated field STF to a position between the two zero-valued subcarriers, and the direct current component at the receive end has little to no affect data carried on the valued subcarrier, thereby ensuring data transmission reliability.

It should be noted that a minimum unit that is allocated to the receive end and that is in the spectrum resource used for transmitting the modulated field STF is a resource block (Resource block, RB). When the spectrum resource includes one or more resource blocks, the modulated field STF may include one or more sequences whose lengths are N, and each sequence whose length is N is mapped to a subcarrier on one RB for transmission, where N is a quantity of subcarriers on one RB, and N is a positive integer. Optionally, when the spectrum resource includes a plurality of resource blocks, the plurality of resource blocks are allocated to different users, thereby implementing multi-user frequency division multiplexing.

In this embodiment of this application, a spectrum resource of a single basic channel may include four RBs. Available bandwidth of the single basic channel is 2.16 gigahertz (GHz). In a possible implementation, each RB includes 128 subcarriers. In another possible implementation, each RB includes 88 subcarriers. The subcarrier on the RB may also be referred to as a data subcarrier. Subcarrier mapping manners and modulated field STFs that are corresponding to the two implementations are separately described in the following embodiments of this application.

Figure 6:
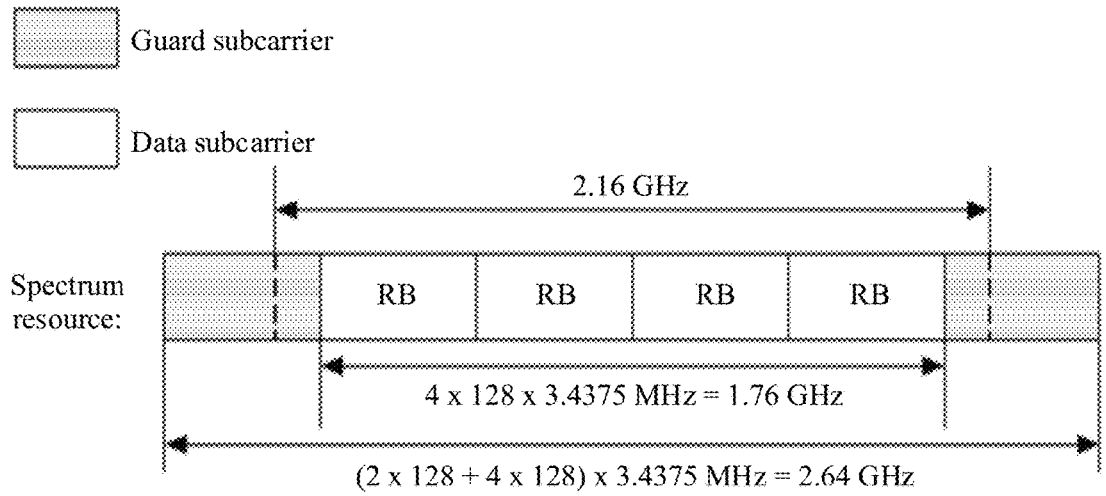
FIG. 6 is a schematic structural diagram of a spectrum resource of a single basic channel according to an embodiment of this application.

For example, FIG. 6 is a schematic structural diagram of a spectrum resource of a single basic channel according to an embodiment of this application. As shown in FIG. 6, a spectrum resource of a single basic channel includes four RBs and two guard subcarriers, and each RB includes 128 subcarriers. Optionally, a quantity of subcarriers in each guard subcarrier is 128, and bandwidth of each subcarrier is 3.4375 MHz. Therefore, total bandwidth of the four RBs is 1.76 GHz, and total bandwidth of the spectrum resource is 2.64 GHz.

Optionally, two subcarrier mapping manners are provided for the spectrum resource shown in FIG. 6 in this embodiment of this application.

Figure 7:
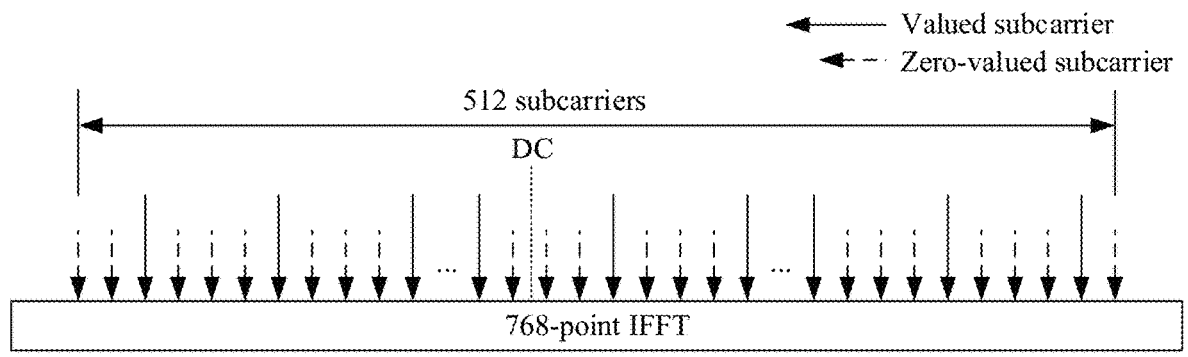
FIG. 7 is a schematic diagram of another subcarrier mapping manner according to an embodiment of this application.

FIG. 7 is a schematic diagram of a subcarrier mapping manner corresponding to the spectrum resource shown in FIG. 6. As shown in FIG. 7, in the spectrum resource, there are two zero-valued subcarriers before a first valued subcarrier, there are three zero-valued subcarriers between two adjacent valued subcarriers, and there is one zero-valued subcarrier after a last valued subcarrier. In this case, the direct current component DC at the receive end is located between two zero-valued subcarriers at a center of the spectrum resource.

Figure 8:
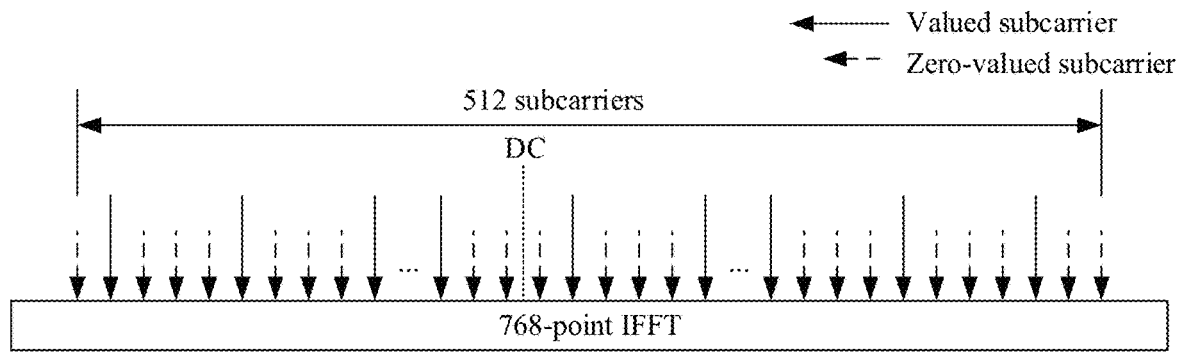
FIG. 8 is a schematic diagram of still another subcarrier mapping manner according to an embodiment of this application.

FIG. 8 is a schematic diagram of another subcarrier mapping manner corresponding to the spectrum resource shown in FIG. 6. As shown in FIG. 8, in the spectrum resource, there is one zero-valued subcarrier before a first valued subcarrier, there are three zero-valued subcarriers between two adjacent valued subcarriers, and there are two zero-valued subcarriers after a last valued subcarrier. In this case, the direct current component DC at the receive end is located between two zero-valued subcarriers at a center of the spectrum resource.

It should be noted that when one valued subcarrier is placed with three zero-valued subcarriers on the RB, it is ensured that one OFDM symbol includes four time-domain periods.

Optionally, when channel bonding used to transmit the modulated field STF is CB=1, the modulated field STF includes four sequences for which N=128, in other words, a length of the modulated field STF is 512. A process in which the transmit end sends the modulated field STF to the receive end in the subcarrier mapping manner shown in FIG. 7 or FIG. 8 includes: The transmit end maps a modulated field STF whose length is 512 to 512 subcarriers on four RBs in the spectrum resource; adjusts a 0-frequency position of the modulated field STF, so that the 0-frequency position (corresponding to the direct current component DC at the receive end) is located at a center of the 512 subcarriers, in other words, the 0-frequency position is located between two zero-valued subcarriers at the center; and performs 768-point IFFT on the modulated field STF, and sends, to the receive end, the modulated field STF on which 768-point IFFT is performed.

Optionally, a length, in time domain, of the modulated field STF provided in this embodiment of this application is approximately equal to a length (1.3818 microseconds), in time domain, of an EDGM-STF in a single-carrier transmission mode or a length (1.4544 microseconds), in time domain, of an EDGM-STF in an OFDM transmission mode in an existing 60 GHz WLAN standard.

Optionally, the length of the modulated field STF in time domain is equal to a length, in time domain, of five OFDM symbols carrying no cyclic prefix, in other words, the modulated field STF is transmitted in time domain by using five OFDM symbols carrying no cyclic prefix. Because each OFDM symbol includes four time-domain periods, and a length of each time-domain period is 72.73 nanoseconds (ns), the length of the modulated field STF in time domain is 1.4545 microseconds, and is consistent with the length, in time domain, of the EDGM-STF in the OFDM transmission mode in the existing 60 GHz WLAN standard.

Because quantities of RBs in the spectrum resource are different when CBs of the spectrum resource are different, cases in which the spectrum resource is allocated to users are also different, and corresponding modulated field STFs are also different. In the following embodiments of this application, sequence design of the modulated field STF is described separately for cases of different CBs of the spectrum resource.

In a first case, when CB=1, for a structure of the spectrum resource, refer to FIG. 6. Four RBs include 512 subcarriers in total, and available bandwidth of the spectrum resource is 2.16 GHz.

FIG. 9 is a schematic diagram of allocation of the spectrum resource shown in FIG. 6 according to an embodiment of this application. As shown in FIG. 9, there are six allocation cases for the spectrum resource shown in FIG. 6. In a first allocation case, the four RBs in the spectrum resource is allocated to a maximum of four users, for example, a first RB is allocated to a user 1, a second RB is allocated to a user 2, a third RB is allocated to a user 3, and a fourth RB is allocated to a user 4. In a second allocation case, the four RBs in the spectrum resource is allocated to a maximum of two users, for example, both a first RB and a second RB are allocated to a user 1, and both a third RB and a fourth RB are allocated to a user 2. In a third allocation case, the four RBs in the spectrum resource is allocated to a maximum of three users, for example, a first RB is allocated to a user 1, both a second RB and a third RB are allocated to a user 2, and a fourth RB is allocated to a user 3. In a fourth allocation case, the four RBs in the spectrum resource is allocated to a maximum of two users, for example, a first RB, a second RB, and a third RB are allocated to a user 1, and a fourth RB is allocated to a user 2. In a fifth allocation case, the four RBs in the spectrum resource is allocated to a maximum of two users, for example, a first RB is allocated to a user 1, and a second RB, a third RB, and a fourth RB are allocated to a user 2. In a sixth allocation case, the four RBs in the spectrum resource is allocated to a maximum of one user, for example, a first RB, a second RB, a third RB, and a fourth RB are allocated to a user 1.

In this embodiment of this application, based on the spectrum structure shown in FIG. 6 and the plurality of allocation cases of the spectrum resource shown in FIG. 9, a modulated field STF whose total length is 512 is designed.

Optionally, the modulated field STF is generated based on two binary Golay sequences whose lengths each are 32, and the two binary Golay sequences are orthogonal to each other. For example, the two binary Golay sequences are respectively:

R1=[1, 1, −1, 1, 1, 1, 1, −1, 1, 1, −1, 1, −1, −1, −1, 1, 1, 1, −1, 1, 1, 1, 1, −1, −1, −1, 1, −1, 1, 1, 1, −1]; and R2=[1, 1, −1, 1, 1, 1, 1, −1, 1, 1, −1, 1, −1, −1, −1, 1, −1, −1, 1, −1, −1, −1, −1, 1, 1, 1, −1, 1, −1, −1, −1, 1].

Optionally, the modulated field STF is obtained by inserting a zero element before and after each non-zero element in G128 (v, :) based on a specified rule, where v is a positive integer and a value range meets 1≤v≤8.

G128 (1, :)=[R1, R2, R1, −R2];
G128 (2, :)=[R1, R2, −R1, R2];
G128 (3, :)=[R2, R1, R2, −R1];
G128 (4, :)=[R2, R1, −R2, R1];
G128 (5, :)=[R1, −R2, R1, R2];
G128 (6, :)=[−R1, R2, R1, R2];
G128 (7, :)=[R2, −R1, R2, R1]; and
G128 (8, :)=[−R2, R1, R2, R1].

In this embodiment of this application, when CB=1, the modulated field STF generated by the transmit end is denoted as G512 (v, :). That the modulated field STF is obtained by inserting a zero element before and after each non-zero element in G128 (v, :) based on a specified rule includes: inserting one zero element before each non-zero element in G128 (v, :) and inserting two zero elements after each non-zero element in G128 (v, :), to obtain G512 (v, :), in other words, corresponding to the subcarrier mapping manner shown in FIG. 8; or inserting two zero elements before each non-zero element in G128 (v, :) and inserting one zero element after each non-zero element in G128 (v, :), to obtain G512 (v, :), in other words, corresponding to the subcarrier mapping manner shown in FIG. 7. In other words, when CB=1, one modulated field STF generated by the transmit end may have eight possible choices. Because in the foregoing generated modulated field STF, non-zero elements in each RB form a Golay sequence, a PAPR of a sequence transmitted on each RB is relatively low. When different RBs are allocated to different users, multi-user frequency division multiplexing is implemented with a low PAPR.

It should be noted that 44 Golay sequences whose lengths are 128 is designed by using R1 and R2, and at least one sequence with a relatively low PAPR is selected from the 44 Golay sequences whose lengths are 128 to generate the modulated field STF.

FIG. 10 shows PAPRs of eight modulated field STFs in the plurality of allocation cases of the spectrum resource shown in FIG. 9. As shown in FIG. 10, in the different allocation cases of the spectrum resource, PAPRs of parts that are of the modulated field STFs and that are transmitted to users are relatively low, especially in the first allocation case, the second allocation case, and the third allocation case, and PAPRs of parts that are of the modulated field STFs and that are transmitted to different users each are approximately 3 decibels (dB), thereby ensuring data transmission performance.

It should be noted that any two modulated field STFs in the eight modulated field STFs obtained in the foregoing manner are orthogonal to each other. When the transmit end sends the PPDU to the receive end by using a plurality of spatial flows, a plurality of modulated field STFs that are orthogonal to each other is generated, and each modulated field STF is transmitted on one spatial flow, so that interference between different spatial flows is avoided while a data transmission rate is improved. For example, when the transmit end sends the PPDU to the receive end by using eight spatial flows, the foregoing eight modulated field STFs that are orthogonal to each other is generated.

In a second case, FIG. 11 is a schematic structural diagram of a spectrum resource when CB=2 according to an embodiment of this application. As shown in FIG. 11, the spectrum resource includes eight RBs. Each RB includes 128 subcarriers, total bandwidth of the eight RBs is 3.52 GHz, and available bandwidth of the spectrum resource is 4.32 GHz.

FIG. 12 is a schematic diagram of allocation of the spectrum resource shown in FIG. 11 according to an embodiment of this application. As shown in FIG. 12, there is sixteen allocation cases for the spectrum resource shown in FIG. 11. In a first allocation case, the eight RBs in the spectrum resource is allocated to a maximum of eight users, for example, a first RB is allocated to a user 1, a second RB is allocated to a user 2, a third RB is allocated to a user 3, a fourth RB is allocated to a user 4, a fifth RB is allocated to a user 5, a sixth RB is allocated to a user 6, a seventh RB is allocated to a user 7, and an eighth RB is allocated to a user 8. In a second allocation case, the eight RBs in the spectrum resource is allocated to a maximum of four users, for example, both a first RB and a second RB are allocated to a user 1, both a third RB and a fourth RB are allocated to a user 2, both a fifth RB and a sixth RB are allocated to a user 3, and both a seventh RB and an eighth RB are allocated to a user 4. In a third allocation case, the eight RBs in the spectrum resource is allocated to a maximum of two users, for example, a first RB to a fourth RB are allocated to a user 1, and a fifth RB and an eighth RB are allocated to a user 2. In a fourth allocation case, the eight RBs in the spectrum resource is allocated to a maximum of two users, for example, both a first RB and a second RB are allocated to a user 1, and a third RB to an eighth RB are allocated to a user 2. In a fifth allocation case, the eight RBs in the spectrum resource is allocated to a maximum of two users, for example, a first RB to a sixth RB are allocated to a user 1, and both a seventh RB and an eighth RB are allocated to a user 2. In a sixth allocation case, the eight RBs in the spectrum resource is allocated to a maximum of five users, for example, a first RB is allocated to a user 1, a second RB and a third RB are allocated to a user 2, a fourth RB and a fifth RB are allocated to a user 3, a sixth RB and a seventh RB are allocated a user 4, and an eighth RB is allocated to a user 5. In a seventh allocation case, the eight RBs in the spectrum resource is allocated to a maximum of three users, for example, a first RB to a third RB are allocated to a user 1, a fourth RB to a sixth RB are allocated to a user 2, and a seventh RB and an eighth RB are allocated to a user 3. In an eighth allocation case, the eight RBs in the spectrum resource is allocated to a maximum of four users, for example, a first RB is allocated to a user 1, a second RB to a fourth RB are allocated to a user 2, a fifth RB to a seventh RB are allocated to a user 3, and an eighth RB is allocated to a user 4. In a ninth allocation case, the eight RBs in the spectrum resource is allocated to a maximum of three users, for example, a first RB and a second RB are allocated to a user 1, a third RB to a fifth RB are allocated to a user 2, and a sixth RB to an eighth RB are allocated to a user 3. In a tenth allocation case, the eight RBs in the spectrum resource is allocated to a maximum of three users, for example, a first RB is allocated to a user 1, a second RB to a fifth RB are allocated to a user 2, and a sixth RB to an eighth RB are allocated to a user 3. In an eleventh allocation case, the eight RBs in the spectrum resource is allocated to a maximum of three users, for example, a first RB and a second RB are allocated to a user 1, a third RB to a sixth RB are allocated to a user 2, and a seventh RB and an eighth RB are allocated to a user 3. In a twelfth allocation case, the eight RBs in the spectrum resource is allocated to a maximum of three users, for example, a first RB to a third RB are allocated to a user 1, a fourth RB to a seventh RB are allocated to a user 2, and an eighth RB is allocated to a user 3. In a thirteenth allocation case, the eight RBs in the spectrum resource is allocated to a maximum of two users, for example, a first RB to a fifth RB are allocated to a user 1, and a sixth RB to an eighth RB are allocated to a user 2. In a fourteenth allocation case, the eight RBs in the spectrum resource is allocated to a maximum of two users, for example, a first RB to a seventh RB are allocated to a user 1, and an eighth RB is allocated to a user 2. In a fifteenth allocation case, the eight RBs in the spectrum resource is allocated to a maximum of two users, for example, a first RB is allocated to a user 1, and a second RB to an eighth RB are allocated to a user 2. In a sixteenth allocation case, the eight RBs in the spectrum resource is allocated to a maximum of one user, for example, a first RB to an eighth RB are allocated to a user 1.

In this embodiment of this application, based on the spectrum structure shown in FIG. 11 and the plurality of allocation cases of the spectrum resource shown in FIG. 12, a modulated field STF whose total length is 1024 is designed.

When CB=2, the modulated field STF is denoted as G1024 (v, :), and G1024 (v, :) is determined based on two different modulated field STFs when CB=1.

G1024 (1, :)=[G512 (1, :), G512 (2, :)];
G1024 (2, :)=[G512 (1, :), −G512 (2, :)]
G1024 (3, :)=[G512 (3, :), G512 (4, :)];
G1024 (4, :)=[G512 (3, :), −G512 (4, :)];
G1024 (5, :)=[G512 (5, :), G512 (6, :)];
G1024 (6, :)=[G512 (5, :), −G512 (6, :)];
G1024 (7, :)=[G512 (7, :), G512 (8, :)]; and
G1024 (8, :)=[G512 (7, :), −G512 (8, :)].

It should be noted that any two modulated field STFs in the foregoing eight modulated field STFs are orthogonal to each other. When the transmit end sends the PPDU to the receive end by using a plurality of spatial flows, a plurality of modulated field STFs that are orthogonal to each other is generated, and each modulated field STF is transmitted on one spatial flow, so that interference between different spatial flows is avoided while a data transmission rate is improved. For example, when the transmit end sends the PPDU to the receive end by using eight spatial flows, the foregoing eight modulated field STFs that are orthogonal to each other is generated.

For example, FIG. 13 shows PAPRs of a first modulated field STF and a second modulated field STF in the plurality of allocation cases of the spectrum resource shown in FIG. 12. As shown in FIG. 13, in the plurality of allocation cases of the spectrum resource, PAPRs of parts that are of the modulated field STFs and that are transmitted to users are relatively low.

Figure 14:
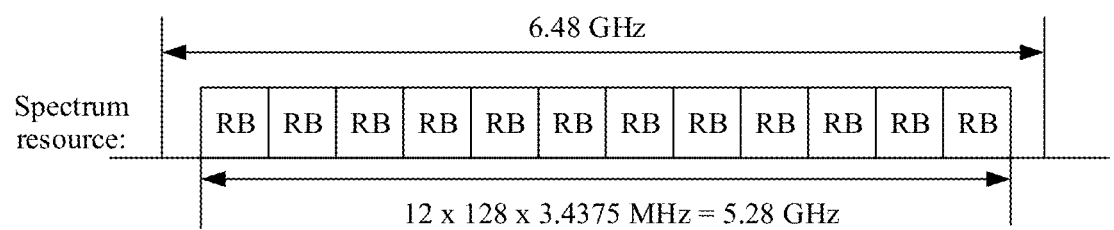
FIG. 14 is a schematic structural diagram of another spectrum resource according to an embodiment of this application.

In a third case, FIG. 14 is a schematic structural diagram of a spectrum resource when CB=3 according to an embodiment of this application. As shown in FIG. 14, the spectrum resource includes 12 RBs. Each RB includes 128 subcarriers, total bandwidth of the 12 RBs is 5.28 GHz, and available bandwidth of the spectrum resource is 6.48 GHz.

FIG. 15 is a schematic diagram of allocation of the spectrum resource shown in FIG. 14 according to an embodiment of this application. As shown in FIG. 15, there is eight allocation cases for the spectrum resource shown in FIG. 14. In a first allocation case, the 12 RBs in the spectrum resource is allocated to a maximum of 12 users, for example, a first RB to a twelfth RB are respectively allocated to a user 1 to a user 12. In a second allocation case, the 12 RBs in the spectrum resource is allocated to a maximum of six users, for example, both a first RB and a second RB are allocated to a user 1, both a third RB and a fourth RB are allocated to a user 2, both a fifth RB and a sixth RB are allocated to a user 3, both a seventh RB and an eighth RB are allocated a user 4, both a ninth RB and a tenth RB are allocated to a user 5, and both an eleventh RB and a twelfth RB are allocated to a user 6. In a third allocation case, the 12 RBs in the spectrum resource is allocated to a maximum of four users, for example, a first RB to a third RB are allocated to a user 1, a fourth RB to a sixth RB are allocated to a user 2, a seventh RB to a ninth RB are allocated to a user 3, and a tenth RB to a twelfth RB are allocated to a user 4. In a fourth allocation case, the 12 RBs in the spectrum resource is allocated to a maximum of three users, for example, a first RB to a fourth RB are allocated to a user 1, a fifth RB to an eighth RB are allocated to a user 2, and a ninth RB to a twelfth RB are allocated to a user 3. In a fifth allocation case, the 12 RBs in the spectrum resource is allocated to a maximum of two users, for example, a first RB to a sixth RB are allocated to a user 1, and a seventh RB to a twelfth RB are allocated to a user 2. In a sixth allocation case, the 12 RBs in the spectrum resource is allocated to a maximum of two users, for example, a first RB to an eighth RB are allocated to a user 1, and a ninth RB to a twelfth RB are allocated to a user 2. In a seventh allocation case, the 12 RBs in the spectrum resource is allocated to a maximum of two users, for example, a first RB to a fourth RB are allocated to a user 1, and a fifth RB to a twelfth RB are allocated to a user 2. In an eighth allocation case, the 12 RBs in the spectrum resource is allocated to a maximum of one user, for example, a first RB to a twelfth RB are allocated to a user 1.

In this embodiment of this application, based on the spectrum structure shown in FIG. 14 and the plurality of allocation cases of the spectrum resource shown in FIG. 15, a modulated field STF whose total length is 1536 is designed.

Optionally, the modulated field STF is generated based on eight binary Golay sequences whose lengths each are 32, and the eight binary Golay sequences are orthogonal to each other. Optionally, the eight binary Golay sequences are respectively:

R1=[1, 1, −1, 1, 1, 1, 1, −1, 1, 1, −1, 1, −1, −1, −1, 1, −1, −1, 1, −1, −1, −1, −1, 1, 1, 1, −1, 1, −1, −1, −1, 1];

R2=[1, −1, −1, −1, 1, −1, 1, 1, 1, −1, −1, −1, −1, 1, −1, −1, −1, 1, 1, 1, −1, 1, −1, −1, 1, −1, −1, −1, −1, 1, −1, −1];

R3=[1, 1, −1, 1, 1, 1, 1, −1, 1, 1, −1, 1, −1, −1, −1, 1, 1, −1, 1, 1, 1, 1, −1, −1, −1, 1, −1, 1, 1, 1, −1];

R4=[1, −1, −1, −1, 1, −1, 1, 1, 1, −1, −1, −1, −1, 1, −1, −1, 1, −1, −1, −1, 1, −1, 1, 1, −1, 1, 1, 1, 1, −1, 1, 1];

R5=[1, 1, −1, 1, 1, 1, 1, −1, 1, 1, −1, 1, −1, −1, −1, 1, 1, −1, 1, 1, 1, 1, −1, −1, −1, 1, −1, 1, 1, 1, 1, −1];

R6=[1, −1, −1, −1, 1, −1, 1, 1, 1, −1, −1, −1, −1, 1, −1, −1, 1, −1, −1, −1, 1, −1, 1, 1, −1, 1, 1, 1, 1, −1, 1, 1];

R7=[1, 1, −1, 1, 1, 1, 1, −1, 1, 1, −1, 1, −1, −1, −1, 1, −1, 1, −1, −1, −1, −1, 1, 1, 1, −1, 1, −1, −1, −1, 1]; and R8=[1, −1, −1, −1, 1, −1, 1, 1, 1, −1, −1, −1, −1, 1, −1, −1, −1, 1, 1, 1, −1, 1, −1, −1, 1, −1, −1, −1, −1, 1, −1, −1].

For each binary Golay sequence, a zero element is inserted before and after each non-zero element based on a specified rule to obtain eight sequences whose lengths are 128, and the eight sequences whose lengths are 128 are respectively denoted as G128_1 (1, :), G128_1 (2, :), G128_2 (1, :), G128_2 (2, :), G128_3 (1, :), G128_3 (2, :), G128_4 (1, :), and G128_4 (2, :); and the modulated field STF is denoted as G1536 (v, :), where v is a positive integer and a value range meets 1≤v≤8.

G1536 (1, :)=[G128_1 (1, :), −G128_2 (1, :), −G128_1 (1, :), −G128_2 (1, :), −G128_1 (1, :), G128_2 (1, :), −G128_1 (1, :), −G128_2 (1, :), G128_1 (1, :), G128_2 (1, :), −G128_1 (1, :), G128_2 (1, :)];

G1536 (2, :)=[G128_1 (2, :), −G128_2 (2, :), −G128_1 (2, :), −G128_2 (2, :), −G128_1 (2, :), G128_2 (2, :), −G128_1 (2, :), −G128_2 (2, :), G128_1 (2, :), G128_2 (2, :), −G128_1 (2, :), G128_2 (2, :)];

G1536 (3, :)=[G128_1 (3, :), −G128_2 (3, :), −G128_1 (3, :), −G128_2 (3, :), −G128_1 (3, :), −G128_2 (3, :), G128_1 (3, :), G128_2 (3, :), G128_1 (3, :), −G128_2 (3, :), G128_1 (3, :), G128_2 (3, :)];

G1536 (4, :)=[G128_1 (4, :), −G128_2 (4, :), −G128_1 (4, :), −G128_2 (4, :), −G128_1 (4, :), −G128_2 (4, :), G128_1 (4, :), G128_2 (4, :), G128_1 (4, :), −G128_2 (4, :), G128_1 (4, :), G128_2 (4, :)];

G1536 (5, :)=[G128_1 (3, :), −G128_2 (3, :), −G128_1 (3, :), −G128_2 (3, :), G128_1 (3, :), −G128_2 (3, :), −G128_1 (3, :), G128_2 (3, :), −G128_1 (3, :), G128_2 (3, :), −G128_1 (3, :), −G128_2 (3, :)];

G1536 (6, :)=[G128_1 (4, :), −G128_2 (4, :), −G128_1 (4, :), −G128_2 (4, :), G128_1 (4, :), −G128_2 (4, :), −G128_1 (4, :), G128_2 (4, :), −G128_1 (4, :), G128_2 (4, :), −G128_1 (4, :), −G128_2 (4, :)];

G1536 (7, :)=[G128_1 (1, :), −G128_2 (1, :), −G128_1 (1, :), −G128_2 (1, :), G128_1 (1, :), G128_2 (1, :), G128_1 (1, :), G128_2 (1, :), G128_1 (1, :), −G128_2 (1, :), −G128_1 (1, :), −G128_2 (1, :)]; and G1536 (8, :)=[G128_1 (2, :), −G128_2 (2, :), −G128_1 (2, :), −G128_2 (2, :), G128_1 (2, :), G128_2 (2, :), G128_1 (2, :), G128_2 (2, :), G128_1 (2, :), −G128_2 (2, :), −G128_1 (2, :), −G128_2 (2, :)].

It should be noted that any two modulated field STFs in the foregoing eight modulated field STFs are orthogonal to each other. When the transmit end sends the PPDU to the receive end by using a plurality of spatial flows, a plurality of modulated field STFs that are orthogonal to each other is generated, and each modulated field STF is transmitted on one spatial flow, so that interference between different spatial flows is avoided while a data transmission rate is improved. For example, when the transmit end sends the PPDU to the receive end by using eight spatial flows, the foregoing eight modulated field STFs that are orthogonal to each other is generated.

It should be noted that 1612 Golay sequences whose lengths are 1536 is designed by using the foregoing eight Golay sequences, and at least one sequence with a relatively low PAPR is selected from the 1612 Golay sequences whose lengths are 1536 as the modulated field STF.

Figures 16, 17:
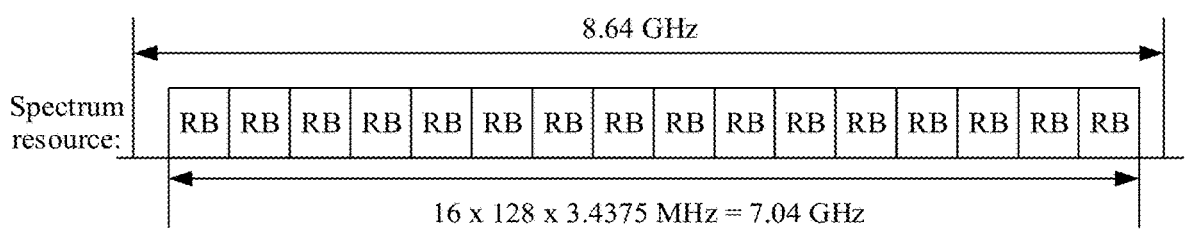
FIG. 16 is a schematic diagram of still another PAPR according to an embodiment of this application.
FIG. 17 is a schematic structural diagram of still another spectrum resource according to an embodiment of this application.

For example, FIG. 16 shows PAPRs of a first modulated field STF and a second modulated field STF in the plurality of allocation cases of the spectrum resource shown in FIG. 15. As shown in FIG. 16, in the plurality of allocation cases of the spectrum resource, PAPRs of parts that are of the modulated field STFs and that are transmitted to users are relatively low.

In a fourth case, FIG. 17 is a schematic structural diagram of a spectrum resource when CB=4 according to an embodiment of this application. As shown in FIG. 17, the spectrum resource includes 16 RBs. Each RB includes 128 subcarriers, total bandwidth of the 16 RBs is 7.04 GHz, and available bandwidth of the spectrum resource is 8.64 GHz.

FIG. 18 is a schematic diagram of allocation of the spectrum resource shown in FIG. 17 according to an embodiment of this application. As shown in FIG. 18, there is five allocation cases for the spectrum resource shown in FIG. 17. In a first allocation case, the 16 RBs in the spectrum resource is allocated to a maximum of 16 users, for example, a first RB to a sixteenth RB are respectively allocated to a user 1 to a user 16. In a second allocation case, the 16 RBs in the spectrum resource is allocated to a maximum of eight users, for example, both a first RB and a second RB are allocated to a user 1, both a third RB and a fourth RB are allocated to a user 2, both a fifth RB and a sixth RB are allocated to a user 3, both a seventh RB and an eighth RB are allocated a user 4, both a ninth RB and a tenth RB are allocated to a user 5, both an eleventh RB and a twelfth RB are allocated to a user 6, both a thirteenth RB and a fourteenth RB are allocated to a user 7, and both a fifteenth RB and a sixteenth RB are allocated to a user 8. In a third allocation case, the 16 RBs in the spectrum resource is allocated to a maximum of four users, for example, a first RB to a fourth RB are allocated to a user 1, a fifth RB to an eighth RB are allocated to a user 2, a ninth RB to a twelfth RB are allocated to a user 3, and a thirteenth RB to a sixteenth RB are allocated to a user 4. In a fourth allocation case, the 16 RBs in the spectrum resource is allocated to a maximum of two users, for example, a first RB to an eighth RB are allocated to a user 1, and a ninth RB to a sixteenth RB are allocated to a user 2. In a fifth allocation case, the 16 RBs in the spectrum resource is allocated to a maximum of one user, for example, a first RB to a sixteenth RB are allocated to a user 1.

In this embodiment of this application, based on the spectrum structure shown in FIG. 17 and the plurality of allocation cases of the spectrum resource shown in FIG. 18, a modulated field STF whose total length is 2048 is designed.

Optionally, G512 (1, :) and G512 (2, :) generated when CB=1 are used as a group of base sequences, G512 (3, :) and G512 (4, :) are used as a group of base sequences, G512 (5, :) and G512 (6, :) are used as a group of base sequences, and G512 (7, :) and G512 (8, :) are used as a group of base sequences. For each group of base sequences, a previous sequence is denoted as C1, and a subsequent sequence is denoted as C2. Based on each group of base sequences, eight sequences whose lengths are 2048 is generated based on the following rule:

G1=[C1, C2, C1, −C2];
G2=[C1, C2, −C1, C2];
G3=[C2, C1, C2, −C1];
G4=[C2, C1, −C2, C1];
G5=[C1, −C2, C1, C2];
G6=[−C1, C2, C1, C2];
G7=[C2, −C1, C2, C1]; and
G8=[−C2, C1, C2, C1].

Based on the foregoing four groups of base sequences, 32 sequences whose lengths are 2048 is generated. In this embodiment of this application, eight sequences with a lowest PAPR is selected from the foregoing 32 sequences whose lengths are 2048 as the modulated field STF.

For example, the modulated field STF is denoted as G2048 (v, :).

G2048 (1, :)=[G512 (4, :), −G512 (3, :), G512 (4, :), G512 (3, :)];

G2048 (2, :)=[G512 (1, :), −G512 (2, :), G512 (1, :), G512 (2, :)];

G2048 (3, :)=[G512 (4, :), G512 (3, :), G512 (4, :), −G512 (3, :)];

G2048 (4, :)=[G512 (3, :), −G512 (4, :), G512 (3, :), G512 (4, :)];

G2048 (5, :)=[G512 (6, :), −G512 (5, :), G512 (6, :), G512 (5, :)];

G2048 (6, :)=[−G512 (6, :), G512 (5, :), G512 (6, :), G512 (5, :)];

G2048 (7, :)=[G512 (5, :), G512 (6, :), G512 (5, :), −G512 (6, :)]; and

G2048 (8, :)=[−G512 (5, :), G512 (6, :), G512 (5, :), G512 (6, :)].

It should be noted that any two modulated field STFs in the foregoing eight modulated field STFs are orthogonal to each other. When the transmit end sends the PPDU to the receive end by using a plurality of spatial flows, a plurality of modulated field STFs that are orthogonal to each other is generated, and each modulated field STF is transmitted on one spatial flow, so that interference between different spatial flows is avoided while a data transmission rate is improved. For example, when the transmit end sends the PPDU to the receive end by using eight spatial flows, the foregoing eight modulated field STFs that are orthogonal to each other is generated.

For example, FIG. 19 shows PAPRs of a first modulated field STF and a second modulated field STF in the plurality of allocation cases of the spectrum resource shown in FIG. 18. As shown in FIG. 19, in the plurality of allocation cases of the spectrum resource, PAPRs of parts that are of the modulated field STFs and that are transmitted to users are relatively low.

In this embodiment of this application, when a spectrum structure of a single basic channel is shown in FIG. 6, the modulated field STF may also be generated based on an EDMG-STF sequence in a single-carrier mode in the existing 60 GHz WLAN standard.

Figure 20:
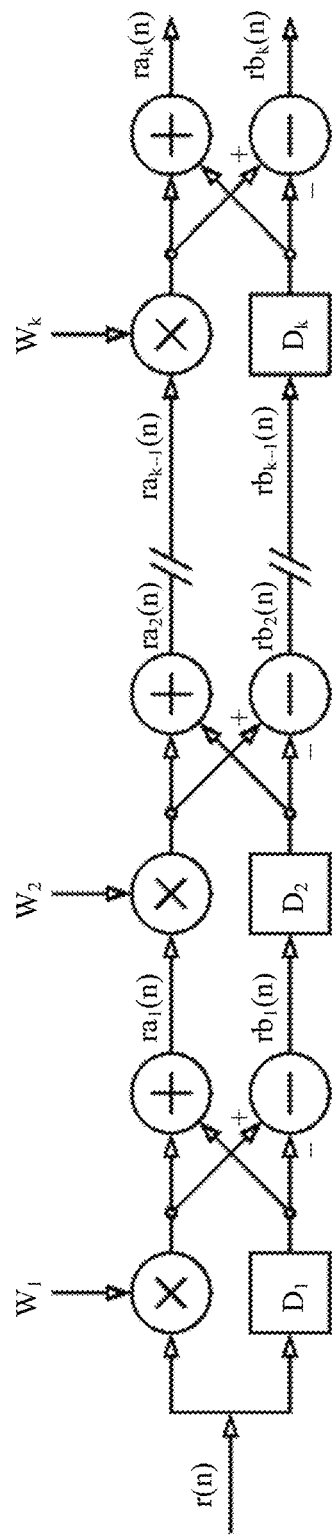
FIG. 20 is a schematic structural diagram of a sequence generation register according to another embodiment of this application.

FIG. 20 is a schematic structural diagram of a sequence generation register according to an embodiment of this application. As shown in FIG. 20, the sequence generation register is a k-level sequence register, r(n) is an input sequence of the sequence generation register, rak(n) and rbk(n) are separately two sequences generated by the sequence generation register, Wk represents an input coefficient of a multiplication module, and Dk represents a delay value at a $k^{th}$ level. Lengths of rak(n) and rbk(n) are L×2 k, where L is a length of the input sequence r(n), and k is a positive integer. The output sequences of the sequence generation register shown in FIG. 20 is represented as follows:

rak(n)=Wkrak−1(n)+rbk−1(n−Dk) and rbk(n)=Wkrak−1(n)−rbk−1(n−Dk), where ra0(n)=r(n) and rb0(n)=r(n).

When CB=1, k=7, D1 to D7 are respectively [1, 8, 2, 4, 16, 32, 64], and r(n)=1. In this embodiment of this application, 16 sequences whose lengths are 128 are generated based on eight groups of Wk, and the eight groups of Wk are as follows:

Group 1: [−1, −1, −1, −1, +1, −1, −1]; Group 2: [+1, −1, −1, −1, +1, −1, −1];

Group 3: [−1, −1, −1, +1, −1, −1 , +1]; Group 4: [+1, −1, −1, −1 , +1];

Group 5: [−1, −1, −1, +1, −1 , +1, +1]; Group 6: [+1, −1, −1, +1, −1, +1, +1];

Group 7: [−1, −1, −1, +1, +1, +1, −1]; Group 8: [+1, −1, −1, +1, +1, −1].

One group of rak(n) and rbk(n) is correspondingly generated for each group of Wk. It is learned based on the IEEE802.11ay that eight rak(n) or eight rbk(n) generated based on the foregoing eight groups of Wk are eight EDMG-STFs in the single-carrier mode when CB=1 in IEEE802.11ay, in other words, the eight rak(n) are orthogonal to each other, and the eight rbk(n) are also orthogonal to each other. Therefore, in this embodiment of this application, based on the sequence whose length is 128 and that is generated by the sequence generation register, a zero element is inserted before and after each element based on a specified rule, to obtain the modulated field STF. For example, one zero element is inserted before each element in the sequence whose length is 128, and two zero elements are inserted after each element, to obtain the modulated field STF, in other words, corresponding to the subcarrier mapping manner shown in FIG. 8; or two zero elements are inserted before each element in the sequence whose length is 128, and one zero element is inserted after each element, to obtain the modulated field STF, in other words, corresponding to the subcarrier mapping manner shown in FIG. 7.

For example, FIG. 21 shows PAPRs of eight modulated field STFs generated based on eight rak(n) when CB=1 in a plurality of allocation cases of a spectrum resource. As shown in FIG. 21, in different allocation cases of the spectrum resource, PAPRs of parts that are of the modulated field STFs and that are transmitted to users are relatively low.

When CB=2, k=8, D1 to D7 are respectively [1, 8, 2, 4, 16, 32, 64, 128], and r(n)=1. In this embodiment of this application, 16 sequences whose lengths are 256 are generated based on eight groups of Wk, and the eight groups of Wk are as follows:

Group 1: [−1, −1, −1, −1, +1, −1, −1 , +1];
Group 2: [+1, −1, −1, −1, +1, −1, −1 , +1];
Group 3: [−1, −1, −1, +1, −1, −1, +1, −1];
Group 4: [+1, −1, −1, +1, −1, −1, +1, −1];
Group 5: [−1, −1, −1, +1, −1, +1, +1, −1];
Group 6: [+1, −1, −1, +1, −1, +1, +1, −1];
Group 7: [−1, −1, −1, +1, +1, +1, −1, −1];
Group 8: [+1, −1, −1, +1, +1, +1, −1, −1].

One group of rak(n) and rbk(n) is correspondingly generated for each group of Wk. It is learned based on the IEEE802.11ay that eight rak(n) or eight rbk(n) generated based on the foregoing eight groups of Wk are eight EDMG-STFs in the single-carrier mode when CB=2 in IEEE802.11ay, in other words, the eight rak(n) are orthogonal to each other, and the eight rbk(n) are also orthogonal to each other. Therefore, in this embodiment of this application, based on the sequence whose length is 256 and that is generated by the sequence generation register, a zero element is inserted before and after each element based on a specified rule, to obtain the modulated field STF. For example, one zero element is inserted before each element in the sequence whose length is 256, and two zero elements are inserted after each element, to obtain the modulated field STF, in other words, corresponding to the subcarrier mapping manner shown in FIG. 8; or two zero elements are inserted before each element in the sequence whose length is 256, and one zero element is inserted after each element, to obtain the modulated field STF, in other words, corresponding to the subcarrier mapping manner shown in FIG. 7.

FIG. 22 shows PAPRs of two modulated field STFs in eight modulated field STFs generated based on eight rak(n) when CB=2 in a plurality of allocation cases of a spectrum resource. As shown in FIG. 22, in different allocation cases of the spectrum resource, PAPRs of parts that are of the modulated field STFs and that are transmitted to users are relatively low.

When CB=3, k=7, D1 to D7 are respectively [3, 24, 6, 12, 48, 96, 192], and r(n)=[+1, +1, −1] or r(n)=[+1, +j, +1]. In this embodiment of this application, 16 sequences whose lengths are 384 are generated based on two groups of r(n) and four groups of Wk, and the four groups of Wk are as follows:

Group 1: [−1, −1, −1, −1, +1, −1, −1]; Group 2: [−1, −1, −1, +1, −1, −1 , +1];
Group 3: [−1, −1, −1, +1, −1 , +1, +1]; Group 4: [−1, −1, −1, +1, +1, +1, −1].

Eight groups of rak(n) and rbk(n) are generated by successively combining each group of Wk with two groups of r(n), in other words, a first group of rak(n) and rbk(n) are generated by combining a first group of Wk with [+1, +1, −1], a second group of rak(n) and rbk(n) are generated by combining the first group of Wk with [+1, +j, +1], a third group of rak(n) and rbk(n) are generated by combining a second group of Wk with [+1, +1, −1], a fourth group of rak(n) and rbk(n) are generated by combining the second group of Wk with [+1, +j, +1], and so on, to generate the eight groups of rak(n) and rbk(n). It is learned based on the IEEE802.11ay that eight rak(n) or eight rbk(n) generated based on the foregoing two groups of r(n) and four groups of Wk are eight EDMG-STFs in the single-carrier mode when CB=3 in IEEE802.11ay, in other words, the eight rak(n) are orthogonal to each other, and the eight rbk(n) are also orthogonal to each other. Therefore, in this embodiment of this application, based on the sequence whose length is 384 and that is generated by the sequence generation register, a zero element is inserted before and after each element based on a specified rule, to obtain the modulated field STF. For example, one zero element is inserted before each element in the sequence whose length is 384, and two zero elements are inserted after each element, to obtain the modulated field STF, in other words, corresponding to the subcarrier mapping manner shown in FIG. 8; or two zero elements are inserted before each element in the sequence whose length is 384, and one zero element is inserted after each element, to obtain the modulated field STF, in other words, corresponding to the subcarrier mapping manner shown in FIG. 7.

FIG. 23 shows PAPRs of one modulated field STF in eight modulated field STFs generated based on eight rak(n) when CB=3 in a plurality of allocation cases of a spectrum resource. As shown in FIG. 23, in different allocation cases of the spectrum resource, PAPRs of parts that are of the modulated field STFs and that are transmitted to users are relatively low.

When CB=4, k=9, D1 to D7 are respectively [1, 8, 2, 4, 16, 32, 64, 128, 256], and r(n)=1. In this embodiment of this application, 16 sequences whose lengths are 512 are generated based on eight groups of Wk, and the eight groups of Wk are as follows:

Group 1: [−1, −1, −1, −1, +1, −1, −1 , +1, +1];
Group 2: [+1, −1, −1, −1, +1, −1, −1 , +1, +1];
Group 3: [−1, −1, −1, −1, −1, −1, −1, −1, −1];
Group 4: [+1, −1, −1, −1, −1, −1, −1, −1, −1];
Group 5: [−1, −1, −1, −1, +1, −1, −1, −1, −1];
Group 6: [+1, −1, −1, −1, −1, +1, −1, −1, −1];
Group 7: [−1, −1, −1, −1, +1, −1, −1, −1 , +1];
Group 8: [+1, −1, −1, −1, +1, −1, −1, −1, +1].

One group of rak(n) and rbk(n) is correspondingly generated for each group of Wk. It is learned based on the IEEE802.11ay that eight rak(n) or eight rbk(n) generated based on the foregoing eight groups of Wk are eight EDMG-STFs in the single-carrier mode when CB=4 in IEEE802.11ay, in other words, the eight rak(n) are orthogonal to each other, and the eight rbk(n) are also orthogonal to each other. Therefore, in this embodiment of this application, based on the sequence whose length is 512 and that is generated by the sequence generation register, a zero element is inserted before and after each element based on a specified rule, to obtain the modulated field STF. For example, one zero element is inserted before each element in the sequence whose length is 512, and two zero elements are inserted after each element, to obtain the modulated field STF, in other words, corresponding to the subcarrier mapping manner shown in FIG. 8; or two zero elements are inserted before each element in the sequence whose length is 512, and one zero element is inserted after each element, to obtain the modulated field STF, in other words, corresponding to the subcarrier mapping manner shown in FIG. 7.

FIG. 24 shows PAPRs of one modulated field STF in eight modulated field STFs generated based on eight rak(n) when CB=4 in a plurality of allocation cases of a spectrum resource. As shown in FIG. 24, in different allocation cases of the spectrum resource, PAPRs of parts that are of the modulated field STFs and that are transmitted to users are relatively low.

Figure 25:
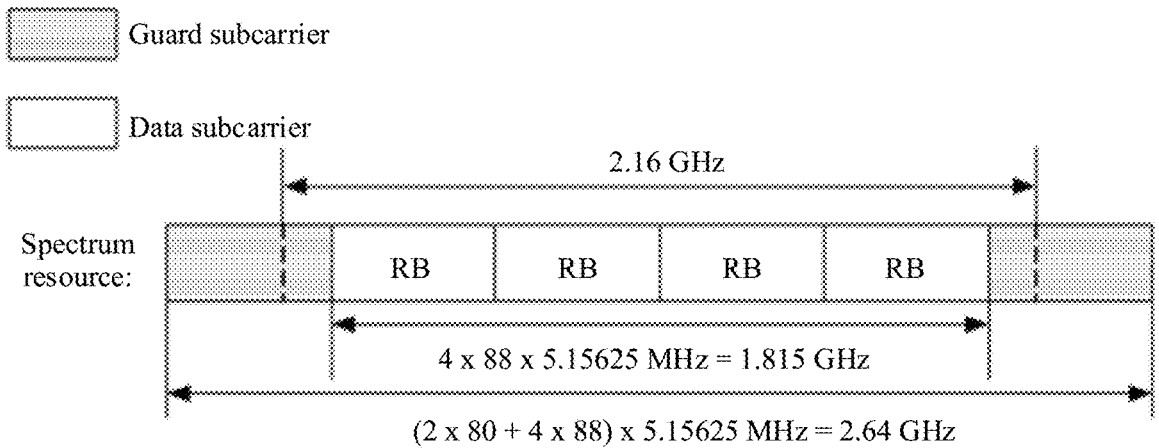
FIG. 25 is a schematic structural diagram of a spectrum resource of a single basic channel according to still another embodiment of this application.

For another example, FIG. 25 is a schematic structural diagram of a spectrum resource of another single basic channel according to an embodiment of this application. As shown in FIG. 25, a spectrum resource of a single basic channel includes four RBs and two guard subcarriers, and each RB includes 88 subcarriers. Optionally, a quantity of subcarriers in each guard subcarrier is 80, and bandwidth of each subcarrier is 5.15625 MHz. Therefore, total bandwidth of the four RBs is 1.815 GHz, and total bandwidth of the spectrum resource is 2.64 GHz.

Optionally, two subcarrier mapping manners are provided for the spectrum resource shown in FIG. 25 in this embodiment of this application.

Figure 26:
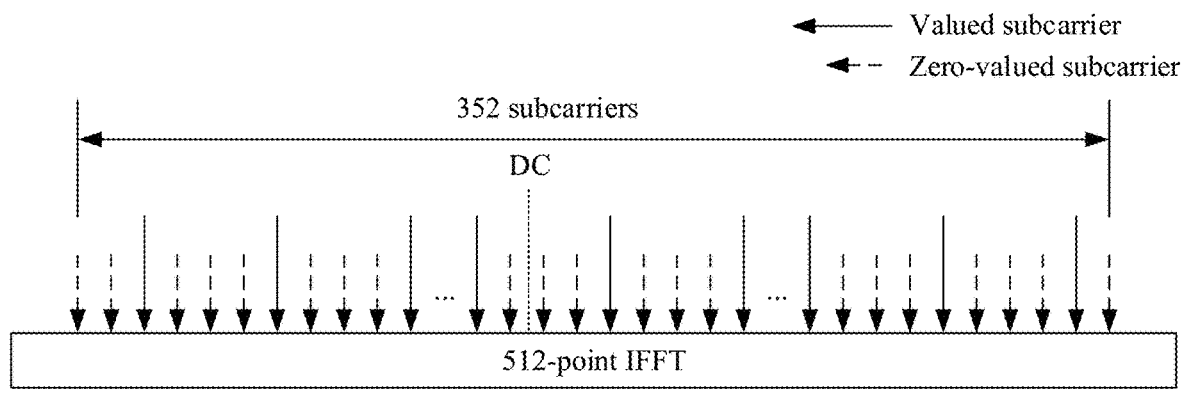
FIG. 26 is a schematic diagram of a subcarrier mapping manner according to still another embodiment of this application.

FIG. 26 is a schematic diagram of a subcarrier mapping manner corresponding to the spectrum resource shown in FIG. 25. As shown in FIG. 26, in the spectrum resource, there are two zero-valued subcarriers before a first valued subcarrier, there are three zero-valued subcarriers between two adjacent valued subcarriers, and there is one zero-valued subcarrier after a last valued subcarrier. In this case, the direct current component DC at the receive end is located between two zero-valued subcarriers at a center of the spectrum resource.

Figure 27:
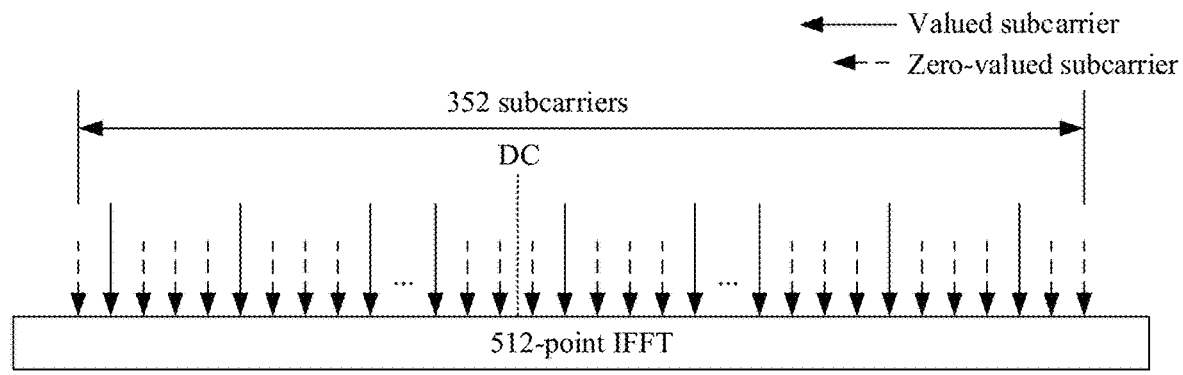
FIG. 27 is a schematic diagram of another subcarrier mapping manner according to still another embodiment of this application.

FIG. 27 is a schematic diagram of another subcarrier mapping manner corresponding to the spectrum resource shown in FIG. 25. As shown in FIG. 27, in the spectrum resource, there is one zero-valued subcarrier before a first valued subcarrier, there are three zero-valued subcarriers between two adjacent valued subcarriers, and there are two zero-valued subcarriers after a last valued subcarrier. In this case, the direct current component DC at the receive end is located between two zero-valued subcarriers at a center of the spectrum resource.

It should be noted that when one valued subcarrier is placed with three zero-valued subcarriers on the RB, it is ensured that one OFDM symbol includes four time-domain periods.

Optionally, when channel bonding used to transmit the modulated field STF is CB=1, the modulated field STF includes four sequences for which N=88, in other words, a length of the modulated field STF is 352. A process in which the transmit end sends the modulated field STF to the receive end in the subcarrier mapping manner shown in FIG. 26 or FIG. 27 includes: The transmit end maps a modulated field STF whose length is 352 to 352 subcarriers on four RBs in the spectrum resource; adjusts a 0-frequency position of the modulated field STF, so that the 0-frequency position (corresponding to the direct current component DC at the receive end) is located at a center of the 352 subcarriers, in other words, the 0-frequency position is located between two zero-valued subcarriers at the center; and performs 512-point IFFT on the modulated field STF, and sends, to the receive end, the modulated field STF on which 512-point IFFT is performed.

Optionally, a length, in time domain, of the modulated field STF provided in this embodiment of this application is approximately equal to a length (1.3818 microseconds), in time domain, of an EDGM-STF in a single-carrier transmission mode or a length (1.4544 microseconds), in time domain, of an EDGM-STF in an OFDM transmission mode in an existing 60 GHz WLAN standard.

Optionally, the length of the modulated field STF in time domain is equal to a length, in time domain, of 7.5 OFDM symbols carrying no cyclic prefix, in other words, the modulated field STF is transmitted in time domain by using 7.5 OFDM symbols carrying no cyclic prefix. Because each OFDM symbol includes four time-domain periods, and a length of each time-domain period is 48.48 ns, the length of the modulated field STF in time domain is 1.4544 microseconds, and is consistent with the length, in time domain, of the EDGM-STF in the OFDM transmission mode in the existing 60 GHz WLAN standard.

Because quantities of RBs in the spectrum resource are different when CBs of the spectrum resource are different, cases in which the spectrum resource is allocated to users are also different, and corresponding modulated field STFs are also different. In the following embodiments of this application, sequence design of the modulated field STF is described separately for cases of different CBs of the spectrum resource.

In a first case, when CB=1, for a structure of the spectrum resource, refer to FIG. 25. Four RBs include 352 subcarriers in total, and available bandwidth of the spectrum resource is 2.16 GHz.

Optionally, for an allocation case of the spectrum resource shown in FIG. 25, refer to FIG. 9. Details are not described in this embodiment of this application.

In this embodiment of this application, based on the spectrum structure shown in FIG. 25 and the plurality of allocation cases of the spectrum resource shown in FIG. 9, a modulated field STF whose total length is 352 is designed.

Optionally, the modulated field STF is generated based on two quaternary Golay sequences whose lengths each are 22, and the two quaternary Golay sequences are orthogonal to each other. For example, the two quaternary Golay sequences are respectively:

S1=[−1i, 1, 1, −1, 1, 1, 1i, −1i, −1, −1, 1, −1, 1i, 1i, −1i, 1i, 1i, 1i, 1, −1, −1i, −1]; and S2=[−1i, −1, 1, 1, 1, −1, 1i, 1i, −1, 1, 1, 1, 1i, −1i, −1i, −1i, 1i, −1i, 1, 1, −1i, 1].

Optionally, the modulated field STF is obtained by inserting a zero element before and after each non-zero element in G88 (v, :) based on a specified rule, where v is a positive integer and a value range meets 1≤v≤8.

G88 (1, :)=[S1, S2, 51, −S2];
G88 (2, :)=[S1, S2, −51, S2];
G88 (3, :)=[S2, 51, S2, −S1];
G88 (4, :)=[S2, S1, −S2, S1];
G88 (5, :)=[S1, −S2, S1, S2];
G88 (6, :)=[−S1, S2, S1, S2];
G88 (7, :)=[S2, −S1, S2, S1]; and
G88 (8, :)=[−S2, S1, S2, S1].

In this embodiment of this application, when CB=1, the modulated field STF generated by the transmit end is denoted as G352 (v, :). That the modulated field STF is obtained by inserting a zero element before and after each non-zero element in G88 (v, :) based on a specified rule includes: inserting one zero element before each non-zero element in G88 (v, :) and inserting two zero elements after each non-zero element in G88 (v, :), to obtain G352 (v, :), in other words, corresponding to the subcarrier mapping manner shown in FIG. 27; or inserting two zero elements before each non-zero element in G128 (v, :) and inserting one zero element after each non-zero element in G128 (v, :), to obtain G352 (v, :), in other words, corresponding to the subcarrier mapping manner shown in FIG. 26. In other words, when CB=1, one modulated field STF generated by the transmit end may have eight possible choices. Because in the foregoing generated modulated field STF, non-zero elements in each RB form a Golay sequence, a PAPR of a sequence transmitted on each RB is relatively low. When different RBs are allocated to different users, multi-user frequency division multiplexing is implemented with a low PAPR.

It should be noted that 44 Golay sequences whose lengths are 88 is designed by using S1 and S2, and at least one sequence with a relatively low PAPR is selected from the 44 Golay sequences whose lengths are 88 to generate the modulated field STF.

FIG. 28 shows PAPRs of eight modulated field STFs in the plurality of allocation cases of the spectrum resource shown in FIG. 9. As shown in FIG. 28, in different allocation cases of the spectrum resource, PAPRs of parts that are of the modulated field STFs and that are transmitted to users are relatively low.

It should be noted that any two modulated field STFs in the eight modulated field STFs obtained in the foregoing manner are orthogonal to each other. When the transmit end sends the PPDU to the receive end by using a plurality of spatial flows, a plurality of modulated field STFs that are orthogonal to each other is generated, and each modulated field STF is transmitted on one spatial flow, so that interference between different spatial flows is avoided while a data transmission rate is improved. For example, when the transmit end sends the PPDU to the receive end by using eight spatial flows, the foregoing eight modulated field STFs that are orthogonal to each other is generated.

Figure 29:
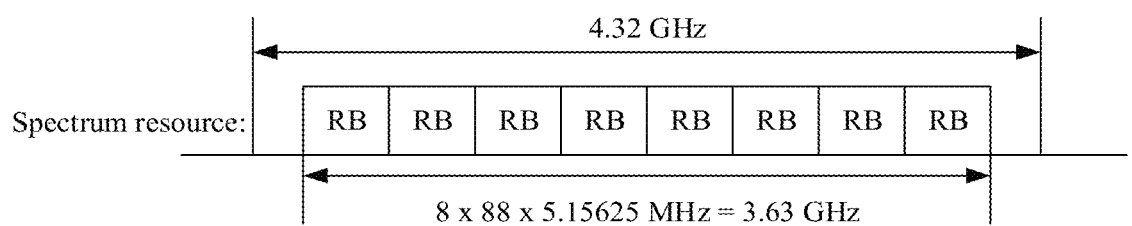
FIG. 29 is a schematic structural diagram of a spectrum resource according to still another embodiment of this application.

In a second case, FIG. 29 is a schematic structural diagram of a spectrum resource when CB=2 according to an embodiment of this application. As shown in FIG. 29, the spectrum resource includes eight RBs. Each RB includes 88 subcarriers, total bandwidth of the eight RBs is 3.63 GHz, and available bandwidth of the spectrum resource is 4.32 GHz.

Optionally, for an allocation case of the spectrum resource shown in FIG. 29, refer to FIG. 12. Details are not described in this embodiment of this application.

In this embodiment of this application, based on the spectrum structure shown in FIG. 29 and the plurality of allocation cases of the spectrum resource shown in FIG. 12, a modulated field STF whose total length is 704 is designed.

When CB=2, the modulated field STF is denoted as G704 (v, :), and G704 (v, :) is determined based on two different modulated field STFs when CB=1.

G704 (1, :)=[G352 (1, :), G352 (2, :)];
G704 (2, :)=[G352 (1, :), −G352 (2, :)];
G704 (3, :)=[G352 (3, :), G352 (4, :)];
G704 (4, :)=[G352 (3, :), −G352 (4, :)];
G704 (5, :)=[G352 (5, :), G352 (6, :)];
G704 (6, :)=[G352 (5, :), −G352 (6, :)];
G704 (7, :)=[G352 (7, :), G352 (8, :)]; and
G704 (8, :)=[G352 (7, :), −G352 (8, :)].

It should be noted that any two modulated field STFs in the foregoing eight modulated field STFs are orthogonal to each other. When the transmit end sends the PPDU to the receive end by using a plurality of spatial flows, a plurality of modulated field STFs that are orthogonal to each other is generated, and each modulated field STF is transmitted on one spatial flow, so that interference between different spatial flows is avoided while a data transmission rate is improved. For example, when the transmit end sends the PPDU to the receive end by using eight spatial flows, the foregoing eight modulated field STFs that are orthogonal to each other is generated.

For example, FIG. 30 shows PAPRs of a first modulated field STF and a second modulated field STF in the plurality of allocation cases of the spectrum resource shown in FIG. 12. As shown in FIG. 30, in the plurality of allocation cases of the spectrum resource, PAPRs of parts that are of the modulated field STFs and that are transmitted to users are relatively low.

Figures 31, 32:
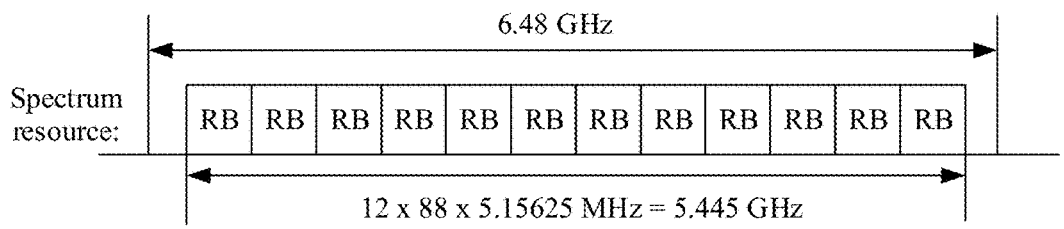
FIG. 31 is a schematic structural diagram of another spectrum resource according to still another embodiment of this application.
FIG. 32 is a schematic diagram of still another PAPR according to still another embodiment of this application.

In a third case, FIG. 31 is a schematic structural diagram of a spectrum resource when CB=3 according to an embodiment of this application. As shown in FIG. 31, the spectrum resource includes 12 RBs. Each RB includes 88 subcarriers, total bandwidth of the 12 RBs is 5.445 GHz, and available bandwidth of the spectrum resource is 6.48 GHz.

Optionally, for an allocation case of the spectrum resource shown in FIG. 29, refer to FIG. 15. Details are not described in this embodiment of this application.

In this embodiment of this application, based on the spectrum structure shown in FIG. 29 and the plurality of allocation cases of the spectrum resource shown in FIG. 15, a modulated field STF whose total length is 1056 is designed.

Optionally, for each quaternary Golay sequence in the foregoing two quaternary Golay sequences S1 and S2, a zero element is inserted before and after each non-zero element based on a specified rule to obtain two sequences whose lengths are 88, and the two sequences whose lengths are 88 are respectively denoted as G88_1 and G88_2. The modulated field STF is denoted as G1056 (v, :), where v is a positive integer and a value range meets 1≤v≤8. Two groups of modulated field STFs when CB=3 are provided in this embodiment of this application, and any two modulated field STFs in each group of modulated field STFs are orthogonal to each other.

A first group of modulated field STFs are as follows:
G1056 (1, :)=[G88_1, G88_2, −G88_1, G88_2, −G88_1, −G88_2, G88_1, G88_2, −G88_1, G88_2, G88_1, G88_2];
G1056 (2, :)=[G88_2, G88_1, −G88_2, G88_1, −G88_2, −G88_1, G88_2, G88_1, −G88_2, G88_1, G88_2, G88_1];
G1056 (3, :)=[G88_2, G88_1, G88_2, −G88_1, G88_2, −G88_1, −G88_2, G88_1, G88_2, −G88_1, G88_2, G88_1];
G1056 (4, :)=[G88_1, G88_2, G88_1, −G88_2, G88_1, −G88_2, −G88_1, G88_2, G88_1, −G88_2, G88_1, G88_2];
G1056 (5, :)=[G88_1, G88_2, G88_1, G88_2, −G88_1, G88_2, −G88_1, −G88_2, G88_1, G88_2, −G88_1, G88_2];
G1056 (6, :)=[G88_2, G88_1, G88_2, G88_1, −G88_2, G88_1, −G88_2, −G88_1, G88_2, G88_1, −G88_2, G88_1];
G1056 (7, :)=[G88_2, G88_1, G88_2, G88_1, G88_2, −G88_1, G88_2, −G88_1, −G88_2, G88_1, G88_2, −G88_1]; and
G1056 (8, :)=[G88_1, G88_2, G88_1, G88_2, G88_1, −G88_2, G88_1, −G88_2, −G88_1, G88_2, G88_1, −G88_2].

G1056 (3, :) and G1056 (4, :) are respectively obtained by cyclically shifting G1056 (1, :) and G1056 (2, :) by one bit to the right. G1056 (5, :) and G1056 (6, :) are respectively obtained by cyclically shifting G1056 (1, :) and G1056 (2, :) by two bits to the right. G1056 (7, :) and G1056 (8, :) are respectively obtained by cyclically shifting G1056 (1, :) and G1056 (2, :) by three bits to the right. Therefore, PAPRs of G1056 (1, :), G1056 (3, :), G1056 (5, :), and G1056 (7, :) are the same, and PAPRs of G1056 (2, :), G1056 (4, :), G1056 (6, :), and G1056 (8, :) are the same.

For example, FIG. 32 shows PAPRs of a first modulated field STF and a second modulated field STF in the plurality of allocation cases of the spectrum resource shown in FIG. 15. As shown in FIG. 32, in different allocation cases of the spectrum resource, PAPRs of parts that are of the modulated field STFs and that are transmitted to users are relatively low.

A second group of modulated field STFs are as follows:
G1056 (9, :)=[G88_1, G88_2, −G88_1, G88_2, −G88_1, −G88_2, G88_1, G88_2, −G88_1, G88_2, G88_1, G88_2];
G1056 (10, :)=[G88_2, G88_1, −G88_2, G88_1, −G88_2, −G88_1, G88_2, G88_1, −G88_2, G88_1, G88_2, G88_1];
G1056 (11, :)=[G88_1, G88_2, G88_1, −G88_2, G88_1, G88_2, G88_1, G88_2, −G88_1, −G88_2, G88_1, −G88_2];
G1056 (12, :)=[G88_2, G88_1, G88_2, −G88_1, G88_2, G88_1, G88_2, G88_1, −G88_2, −G88_1, G88_2, −G88_1];
G1056 (13, :)=[G88_1, −G88_2, −G88_1, −G88_2, G88_1, −G88_2, G88_1, −G88_2, −G88_1, G88_2, −G88_1, −G88_2];
G1056 (14, :)=[G88_2, −G88_1, −G88_2, −G88_1, G88_2, −G88_1, G88_2, −G88_1, −G88_2, G88_1, −G88_2, −G88_1];
G1056 (15, :)=[G88_1, −G88_2, G88_1, −G88_2, G88_1, G88_2, −G88_1, −G88_2, G88_1, G88_2, G88_1, G88_2]; and
G1056 (16, :)=[G88_2, −G88_1, G88_2, −G88_1, G88_2, G88_1, −G88_2, −G88_1, G88_2, G88_1, G88_2, G88_1].

For example, FIG. 33 shows PAPRs of a ninth modulated field STF and a tenth modulated field STF in the plurality of allocation cases of the spectrum resource shown in FIG. 15. As shown in FIG. 32, in different allocation cases of the spectrum resource, PAPRs of parts that are of the modulated field STFs and that are transmitted to users are relatively low.

Figure 34:
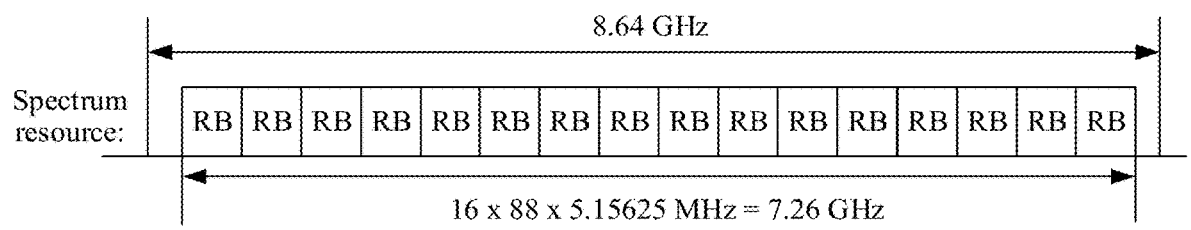
FIG. 34 is a schematic structural diagram of still another spectrum resource according to still another embodiment of this application.

In a fourth case, FIG. 34 is a schematic structural diagram of a spectrum resource when CB=4 according to an embodiment of this application. As shown in FIG. 34, the spectrum resource includes 16 RBs. Each RB includes 88 subcarriers, total bandwidth of the 16 RBs is 7.26 GHz, and available bandwidth of the spectrum resource is 8.64 GHz.

Optionally, for an allocation case of the spectrum resource shown in FIG. 29, refer to FIG. 18. Details are not described in this embodiment of this application.

In this embodiment of this application, based on the spectrum structure shown in FIG. 29 and the plurality of allocation cases of the spectrum resource shown in FIG. 18, a modulated field STF whose total length is 1408 is designed.

Optionally, when CB=4, the modulated field STF is denoted as G1408 (v, :), and G1408 (v, :) is determined based on two different modulated field STFs when CB=2.

G1408 (1, :)=[G704 (1, :), G704 (2, :)];
G1408 (2, :)=[G704 (1, :), −G704 (2, :)];
G1408 (3, :)=[G704 (3, :), G704 (4, :)];
G1408 (4, :)=[G704 (3, :), −G704 (4, :)];
G1408 (5, :)=[G704 (5, :), G704 (6, :)];
G1408 (6, :)=[G704 (5, :), −G704 (6, :)];
G1408 (7, :)=[G704 (7, :), G704 (8, :)]; and
G1408 (8, :)=[G704 (7, :), −G704 (8, :)].

It should be noted that any two modulated field STFs in the foregoing eight modulated field STFs are orthogonal to each other. When the transmit end sends the PPDU to the receive end by using a plurality of spatial flows, a plurality of modulated field STFs that are orthogonal to each other is generated, and each modulated field STF is transmitted on one spatial flow, so that interference between different spatial flows is avoided while a data transmission rate is improved. For example, when the transmit end sends the PPDU to the receive end by using eight spatial flows, the foregoing eight modulated field STFs that are orthogonal to each other is generated.

For example, FIG. 35 shows PAPRs of a first modulated field STF and a second modulated field STF in the plurality of allocation cases of the spectrum resource shown in FIG. 18. As shown in FIG. 35, in different allocation cases of the spectrum resource, PAPRs of parts that are of the modulated field STFs and that are transmitted to users are relatively low.

It should be noted that, in this embodiment of this application, for example, a quantity of subcarriers on an RB is 128 and 88, to describe the modulated field STF in the PPDU in step 201. Optionally, there is another quantity of subcarriers on the RB. This is not limited in this embodiment of this application. The modulated field STF provided in this embodiment of this application is merely used as an example for description, and a sequence obtained after the modulated field STF is simply transformed is also within the protection scope of this application. For example, a sequence obtained after the modulated field STF is inverted may also be used as the modulated field STF. This is not limited in this embodiment of this application.

In this embodiment of this application, when a STA transmits the PPDU to an AP, in other words, in an uplink transmission process, the STA needs to transmit the PPDU on an RB allocated to the STA.

In conclusion, in this embodiment of this application, the modulated field STF generated by the transmit end includes a plurality of zero elements and a plurality of non-zero elements, m1 zero elements are included before a first non-zero element, m2 zero elements are included after a last non-zero element, and m1+m2 zero elements are included between any two adjacent non-zero elements. In a process of generating the PPDU, based on a non-zero sequence including non-zero elements, the transmit end may insert m1 zero elements before each non-zero element, and insert m2 non-zero elements after each non-zero element, to generate the modulated field STF. In this application, a manner of generating the modulated field STF is enriched, so that a manner of generating the PPDU is enriched; and the transmit end sends a PPDU that includes a new modulated field STF, so that data transmission flexibility is improved.

Optionally, the non-zero elements in the modulated field STF in this embodiment of this application may form a Golay sequence. Because a transmission waveform of the Golay sequence is characterized by a low PAPR, when the non-zero elements in the modulated field STF is able to form a Golay sequence, it is ensured that a PAPR of the modulated field STF is relatively low. Further, when the modulated field STF is transmitted on a plurality of RBs, non-zero elements of a part that is of the modulated field STF and that is transmitted on each RB may form a Golay sequence. When a plurality of RBs are allocated to different users, multi-user frequency division multiplexing at a low PAPR is implemented.

In addition, the transmit end transmits the modulated field STF in a conventional OFDM transmission manner. After mapping the modulated field STF to a plurality of subcarriers, the transmit end may adjust a 0-frequency position of the modulated field STF, so that the 0-frequency position is between two zero-valued subcarriers, and interference caused by the direct current component at the receive end to data transmitted on the valued subcarrier is avoided.

Figure 36:
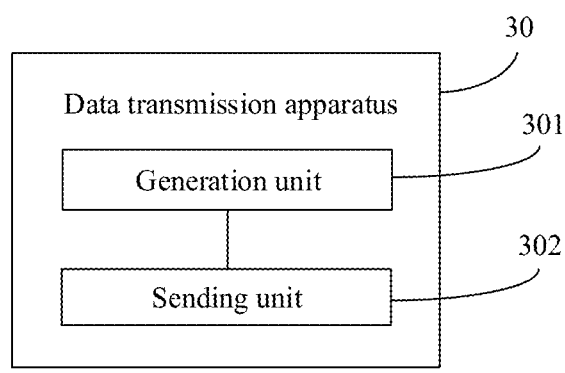
FIG. 36 is a schematic structural diagram of a data transmission apparatus according to an embodiment of this application.

FIG. 36 is a schematic structural diagram of a data transmission apparatus according to an embodiment of this application. The data transmission apparatus is used at the transmit end in FIG. 2 or FIG. 3. The data transmission apparatus may include units configured to perform the method performed by the transmit end in FIG. 4. As shown in FIG. 36, the data transmission apparatus 30 may include:

a generation unit 301, configured to generate a physical layer protocol data unit PPDU; and a sending unit 302, configured to send the PPDU to at least one receive end.

The PPDU includes at least one modulated field short training field STF, the modulated field STF includes a plurality of zero elements and a plurality of non-zero elements, m1 zero elements are included before a first non-zero element, m2 zero elements are included after a last non-zero element, m1+m2 zero elements are included between any two adjacent non-zero elements, m1 and m2 both are positive integers, and the modulated field STF is mapped to a plurality of consecutive subcarriers for transmission.

In this embodiment of this application, the data transmission apparatus shown in FIG. 36 is used as an example to describe units in the data transmission apparatus used at the transmit end. It should be understood that the data transmission apparatus used at the transmit end in this embodiment of this application has any function of the transmit end in the data transmission method shown in FIG. 4.

Figure 37:
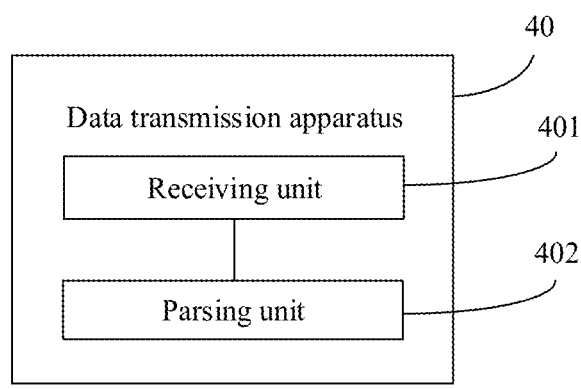
FIG. 37 is a schematic structural diagram of another data transmission apparatus according to an embodiment of this application.

FIG. 37 is a schematic structural diagram of another data transmission apparatus according to an embodiment of this application. The data transmission apparatus is used at the receive end in FIG. 2 or FIG. 3. The data transmission apparatus may include units configured to perform the method performed by the receive end in FIG. 4. As shown in FIG. 37, the data transmission apparatus 40 may include:

a receiving unit 401, configured to receive a physical layer protocol data unit PPDU sent by a transmit end; and a parsing unit 402, configured to parse the PPDU. The PPDU includes at least one modulated field short training field STF, the modulated field STF includes a plurality of zero elements and a plurality of non-zero elements, m1 zero elements are included before a first non-zero element, m2 zero elements are included after a last non-zero element, m1+m2 zero elements are included between any two adjacent non-zero elements, m1 and m2 both are positive integers, and the modulated field STF is mapped to a plurality of consecutive subcarriers for transmission.

In this embodiment of this application, the data transmission apparatus shown in FIG. 37 is used as an example to describe units in the data transmission apparatus used at the receive end. It should be understood that the data transmission apparatus used at the receive end in this embodiment of this application has any function of the receive end in the data transmission method shown in FIG. 4.

The foregoing data transmission apparatus (used at the transmit end or the receive end) provided in the embodiments of this application is implemented in a plurality of product forms. For example, the data transmission apparatus is configured as a general-purpose processing system. For example, the data transmission apparatus is implemented by a general bus architecture. For example, the data transmission apparatus is implemented by an application-specific integrated circuit (Application-Specific Integrated Circuit, ASIC). Several possible product forms of the data transmission apparatus in the embodiments of this application are provided below. It should be understood that the following is merely an example, and a possible product form in the embodiments of this application is not limited thereto.

Figure 38:
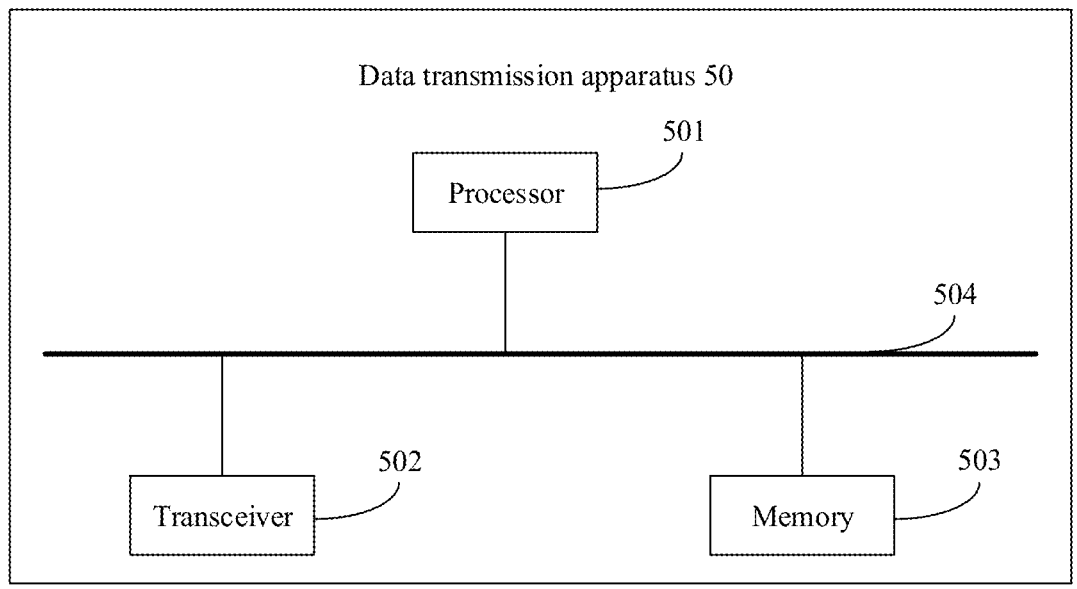
FIG. 38 is a schematic structural diagram of still another data transmission apparatus according to an embodiment of this application.

In a possible product form, a data transmission apparatus 50 is a device (for example, a base station, UE, and an AP) configured to transmit data. As shown in FIG. 38, the data transmission apparatus 50 may include a processor 501 and a transceiver 502. Optionally, the data transmission apparatus may further include a memory 503. The processor 501, the transceiver 502, and the memory 503 communicate with each other by using an internal connection. For example, the data transmission apparatus 50 may further include a bus 504. The processor 501, the transceiver 502, and the memory 503 communicate with each other by using the bus 504. The processor 501 is configured to perform a processing step in the method performed by the data transmission apparatus in the method shown in FIG. 4. For example, when the data transmission apparatus is used at a transmit end, the processing step is step 201 in FIG. 4, and when the data transmission apparatus is used at a receive end, the processing step is step 203 in FIG. 4. The transceiver 502 is configured to perform, under control of the processor 501, a step of transmitting or receiving a PPDU in the method performed by the data transmission apparatus in the method shown in FIG. 4. For example, when the data transmission apparatus is used at a transmit end, the transmitting/receiving step is step 202 in FIG. 4, and when the data transmission apparatus is used at a receive end, the transmitting/receiving step is a step in which the receive end receives a PPDU. The memory 503 is configured to store instructions, and the instructions are invoked by the processor 501, to perform the processing step in the method performed by the data transmission apparatus in the method shown in FIG. 4.

Figure 39:
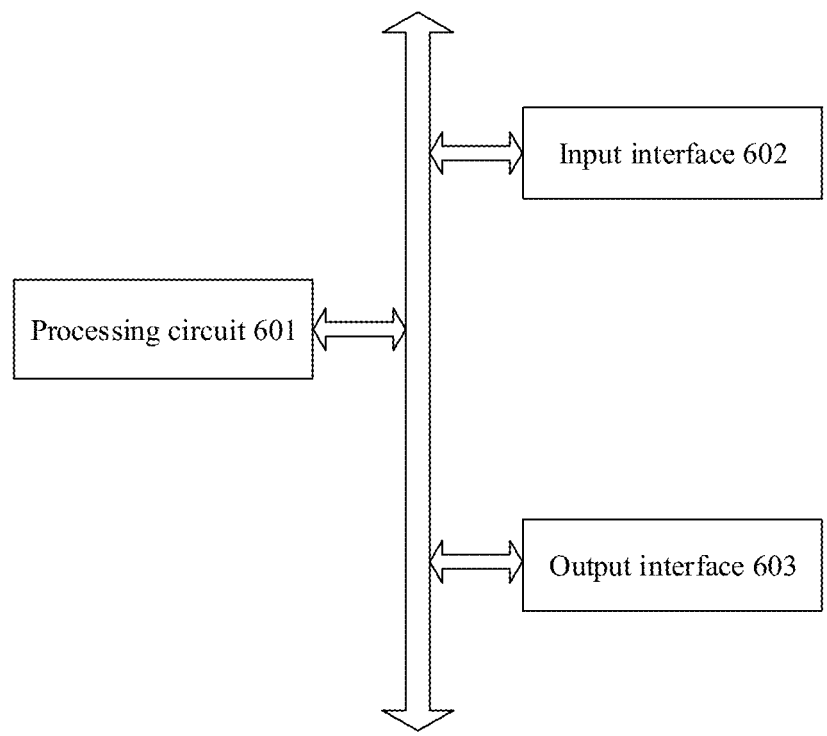
FIG. 39 is a schematic structural diagram of yet another data transmission apparatus according to an embodiment of this application.

In another possible product form, the data transmission apparatus is alternatively implemented by a general-purpose processor, in other words, a chip. As shown in FIG. 39, the data transmission apparatus may include a processing circuit 601, an input interface 602, and an output interface 603. The processing circuit 601, the input interface 602, and the output interface 603 communicate with each other by using an internal connection. The input interface 602 is configured to obtain information (for example, to-be-sent data in step 201) to be processed by the processing circuit 601, the processing circuit 601 is configured to perform the processing step (for example, step 201) performed by the transmit end in FIG. 2, to process the to-be-processed information, and the output interface 603 is configured to output the information processed by the processing circuit 601. Alternatively, the input interface 602 is configured to obtain information (the PPDU received by the receive end in the embodiment shown in FIG. 2) to be processed by the processing circuit 601, the processing circuit 601 is configured to perform the processing step (for example, step 203) performed by the receive end in FIG. 2, to process the to-be-processed information, and the output interface 603 is configured to output the information processed by the processing circuit.

Optionally, the data transmission apparatus may further include a transceiver (not shown in FIG. 39). When the processing circuit 601 is configured to perform the processing step performed by the transmit end in FIG. 2, to process the to-be-processed information, the output interface 603 is configured to output the information processed by the processing circuit 601 to the transceiver, and the transceiver is configured to send the information processed by the processing circuit 601. When the processing circuit 601 is configured to perform the processing step performed by the receive end in FIG. 2, to process the to-be-processed information, the transceiver is configured to receive the information to be processed by the processing circuit 601, and send the information to be processed by the processing circuit 601 to the input interface 602.

In still another possible product form, the data transmission apparatus is alternatively implemented by using the following: a field programmable gate array (field-programmable gate array, FPGA), a programmable logic device (programmable logic device, PLD), a controller, a state machine, gate logic, a discrete hardware component, any other suitable circuit, or any combination of circuits that are able to execute various functions described in this application.

It should be noted that mutual reference is made to the method embodiments provided in the embodiments of this application and the corresponding apparatus embodiments. This is not limited in the embodiments of this application. A chronological order of steps of the method embodiments provided in the embodiments of this application is properly adjusted, and the steps may also be correspondingly added or deleted according to a situation. Any variation readily figured out by persons skilled in the art within the technical scope disclosed in this application shall fall within the protection scope of this application, and details are not described herein again.

The term "and/or" in this application describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

In addition, function units in the embodiments of this application is integrated into one processing unit, or each of the units may exist alone physically, or two or more units are integrated into one unit. The integrated unit is implemented in a form of hardware, or is implemented in a form of a software functional unit.

When the integrated unit is implemented in the form of a software functional unit and sold or used as an independent product, the integrated unit is stored in a computer-readable storage medium. Based on such an understanding, the technical solutions of this application essentially, or the part contributing to the prior art, or all or some of the technical solutions is implemented in the form of a software product.

The computer software product is stored in a storage medium and includes several instructions for instructing a computer device (which is a personal computer, a server, a network device, or the like) to perform all or some of the steps of the methods described in the embodiments of this application. The foregoing storage medium includes any medium that are able to store program code, such as a USB flash drive, a removable hard disk, a read-only memory (read-only memory, ROM), a random access memory (random access memory, RAM), a magnetic disk, or an optical disc.

The foregoing descriptions are merely optional embodiments of this application, but are not intended to limit this application. Any modification, equivalent replacement, or improvement made without departing from the concept and principle of this application should fall within the protection scope of this application.

What is claimed is:

1. A transmit end, comprising;
a processor configured to generate a physical layer protocol data unit (PPDU); and
a transceiver configured to send the PPDU to at least one receive end; wherein the PPDU comprises:
  at least one modulated field short training field (STF) that comprises:
    a plurality of zero elements; and
    a plurality of non-zero elements;
    wherein (1) m1 zero elements are included before a first non-zero element, (2) m2 zero elements are included after a last non-zero element, (3) a sum of m1 and m2 zero elements are included between any two adjacent non-zero elements, m1 and m2 both are positive integers, and the at least one modulated field STF is mapped to a plurality of consecutive subcarriers for transmission;
  wherein the at least one modulated field STF includes one or more sequences whose lengths are N, each sequence whose length is N is mapped to a subcarrier on one resource block (RB) for transmission, and N is a positive integer;
  wherein in response to channel bonding being CB=1, the at least one modulated field STF includes four sequences for which N=88 or four sequences for which N=128, and m1+m2=3, wherein when the at least one modulated field STF includes four sequences for which N=88, a length of the at least one modulated field STF in time domain is equal to 7.5 OFDM symbols carrying no cyclic prefix, and wherein when the at least one modulated field STF includes four sequences for which N=128, a length of the at least one modulated field STF in time domain is equal to five orthogonal frequency division multiplexing (OFDM) symbols carrying no cyclic prefix.

2. The transmit end according to claim 1, wherein the non-zero elements in the at least one modulated field STF form a Golay sequence.

3. The transmit end according to claim 1, wherein when the at least one modulated field STF includes four sequences for which N=128, the at least one modulated field STF is generated based on two binary Golay sequences whose lengths each are 32, and the two binary Golay sequences are respectively:
R1=[1, 1, −1, 1, 1, 1, 1, −1, 1, 1, −1, 1, −1, −1, −1, 1, 1, 1, −1, 1, 1, 1, 1, −1, −1, −1, 1, −1, 1, 1, 1, −1]; and
R2=[1, 1, −1, 1, 1, 1, 1, −1, 1, 1, −1, 1, −1, −1, −1, 1, −1, 1, −1, −1, −1, −1, 1, 1, 1, −1, 1, −1, 1, 1, −1, 1].

4. The transmit end according to claim 3, wherein the at least one modulated field STF is obtained by inserting a zero element before and after each non-zero element in G128 (v, :) based on a specified rule, wherein v is a positive integer and a value range meets 1≤v≤8; and
G128 (1, :)=[R1, R2, R1, −R2];
G128 (2, :)=[R1, R2, −R1, R2];
G128 (3, :)=[R2, R1, R2, −R1];
G128 (4, :)=[R2, R1, −R2, R1];
G128 (5, :)=[R1, −R2, R1, R2];
G128 (6, :)=[−R1, R2, R1, R2];
G128 (7, :)=[R2, −R1, R2, R1]; and
G128 (8, :)=[−R2, R1, R2, R1].

5. The transmit end according to claim 1, wherein when the at least one modulated field STF includes four sequences for which N=88, the at least one modulated field STF is generated based on two quaternary Golay sequences whose lengths each are 22, and the two quaternary Golay sequences are respectively:
S1=[−1i, 1, 1, −1, 1, 1, 1i, −1i, −1, −1, 1, −1, 1i, 1i, −1i, 1i, 1i, 1i, 1, −1, −1i, −1]; and
S2=[−1i, −1, 1, 1, 1, −1, 1i, 1i, −1, 1, 1, 1, 1i, −1i, −1i, −1i, 1i, −1i, 1, 1, −1i, 1].

6. The transmit end according to claim 5, wherein the at least one modulated field STF is obtained by inserting a zero element before and after each non-zero element in G88 (v, :) based on a specified rule, wherein v is a positive integer and a value range meets 1≤v≤8; and
G88 (1, :)=[S1, S2, S1, −S2];
G88 (2, :)=[S1, S2, −S1, S2];
G88 (3, :)=[S2, S1, S2, −S1];
G88 (4, :)=[S2, S1, −S2, S1];
G88 (5, :)=[S1, −S2, S1, S2];
G88 (6, :)=[−S1, S2, S1, S2];
G88 (7, :)=[S2, −S1, S2, S1]; and
G88 (8, :)=[−S2, S1, S2, S1].

7. A receive end, comprising:
a processor configured to parse a protocol data unit (PPDU); and
a transceiver configured to receive the PPDU from a transmit end; wherein the PPDU comprises:
  at least one modulated field short training field (STF) that comprises:
    a plurality of zero elements and a plurality of non-zero elements;
    m1 zero elements are included before a first non-zero element;
    m2 zero elements are included after a last non-zero element;
    a sum of the m1 and m2 zero elements are included between any two adjacent non-zero elements; m1 and m2 both are positive integers, and
    the at least one modulated field STF is mapped to a plurality of consecutive subcarriers;
  wherein the at least one modulated field STF comprises one or more sequences whose lengths are N, each sequence whose length is N is mapped to a subcarrier on one resource block (RB) for transmission, and N is a positive integer; and
  wherein in response to channel bonding being CB=1, the at least one modulated field STF includes four sequences for which N=88 or four sequences for which N=128, and m1+m2=3, wherein when the at least one modulated field STF includes four sequences for which N=88, a length of the at least one modulated field STF in time domain is equal to 7.5 OFDM symbols carrying no cyclic prefix, and wherein when the at least one modulated field STF includes four sequences for which N=128, a length of the at least one modulated field STF in time domain is equal to five orthogonal frequency division multiplexing (OFDM) symbols carrying no cyclic prefix.

8. The receive end according to claim 7, wherein the non-zero elements in at least one a Golay sequence.

9. The receive end according to claim 7, wherein when the at least one modulated field STF includes four sequences for which N=128, the at least one modulated field STF is generated based on two binary Golay sequences whose lengths each are 32, and the two binary Golay sequences are respectively:

R1=[1, 1, −1, 1, 1, 1, 1, −1, 1, 1, −1, 1, −1, −1, −1, 1, 1, 1, −1, 1, 1, 1, 1, −1, −1, −1, 1, −1, 1, 1, 1, −1]; and
R2=[1, 1, −1, 1, 1, 1, 1, −1, 1, 1, −1, 1, −1, −1, −1, 1, −1, −1, 1, −1, −1, −1, −1, 1, 1, 1, −1, 1, −1, −1, −1, 1].

10. The receive end according to claim 9, wherein the at least one modulated field STF is obtained by inserting a zero element before and after each non-zero element in G128 (v, :) based on a specified rule, wherein v is a positive integer and a value range meets 1≤v≤8; and G128 (1, :)=[R1, R2, R1, −R2];
G128 (2, :)=[R1, R2, −R1, R2];
G128 (3, :)=[R2, R1, R2, −R1];
G128 (4, :)=[R2, R1, −R2, R1];
G128 (5, :)=[R1, −R2, R1, R2];
G128 (6, :)=[−R1, R2, R1, R2];
G128 (7, :)=[R2, −R1, R2, R1]; and
G128 (8, :)=[−R2, R1, R2, R1].

11. A data transmission system, comprising;
a transmit end, comprising:
a processor configured to generate a physical layer protocol data unit (PPDU);
a transceiver configured to send the PPDU;
a receive end, comprising:
a processor configured to parse the PPDU;
a transceiver configured to receive the PPDU from the transmit end;
wherein the PPDU comprises:
at least one modulated field short training field (STF) that comprises:
a plurality of zero elements; and
a plurality of non-zero elements;
wherein:
m1 zero elements are included before a first non-zero element;
m2 zero elements are included after a last non-zero element,
a sum of m1 and m2 zero elements are included between any two adjacent non-zero elements;
m1 and m2 both are positive integers;
the modulated field STF is mapped to a plurality of consecutive subcarriers for transmission;
the modulated field STF includes one or more sequences whose lengths are N;
each sequence whose length is N is mapped to a subcarrier on one resource block (RB) for transmission, and N is a positive integer;
in response to channel bonding being CB=1, the at least one modulated field STF includes four sequences for which N=88 or four sequences for which N=128, and m1+m2=3, wherein when the at least one modulated field STF includes four sequences for which N=88, a length of the at least one modulated field STF in time domain is equal to 7.5 OFDM symbols carrying no cyclic prefix, and wherein when the at least one modulated field STF includes four sequences for which N=128, a length of the at least one modulated field STF in time domain is equal to five orthogonal frequency division multiplexing (OFDM) symbols carrying no cyclic prefix.

12. The data transmission system according to claim 11, wherein when the at least one modulated field STF includes four sequences for which N=128, the at least one modulated field STF is generated based on two binary Golay sequences whose lengths each are 32, and the two binary Golay sequences are respectively:

R1=[1, 1, −1, 1, 1, 1, 1, −1, 1, 1, −1, 1, −1, −1, −1, 1, 1, 1, −1, 1, 1, 1, 1, −1, −1, −1, 1, −1, 1, 1, 1, −1]; and
R2=[1, 1, −1, 1, 1, 1, 1, −1, 1, 1, −1, 1, −1, −1, −1, 1, −1, −1, 1, −1, −1, −1, −1, 1, 1, 1, −1, 1, −1, −1, −1, 1].

13. The data transmission according to claim 12, wherein the modulated field STF is obtained by inserting a zero element before and after each non-zero element in G128 (v, :) based on a specified rule, wherein v is a positive integer and a value range meets 1≤v≤8; and G128 (1, :)=[R1, R2, R1, −R2];
G128 (2, :)=[R1, R2, −R1, R2];
G128 (3, :)=[R2, R1, R2, −R1];
G128 (4, :)=[R2, R1, −R2, R1];
G128 (5, :)=[R1, −R2, R1, R2];
G128 (6, :)=[−R1, R2, R1, R2];
G128 (7, :)=[R2, −R1, R2, R1]; and
G128 (8, :)=[−R2, R1, R2, R1].

* * * * *